April 11, 1950     H. A. SILVEN ET AL     2,503,889
CRANKPIN GRINDING MACHINE
Filed Feb. 28, 1947     47 Sheets-Sheet 2

Inventors
HERBERT A. SILVEN
DON R. PERCIVAL

By Harold W. Eaton
Attorney

April 11, 1950   H. A. SILVEN ET AL   2,503,889
CRANKPIN GRINDING MACHINE
Filed Feb. 28, 1947   47 Sheets-Sheet 3

Inventors
HERBERT A. SILVEN
DON R. PERCIVAL
By Harold W. Eaton
Attorney

April 11, 1950   H. A. SILVEN ET AL   2,503,889
CRANKPIN GRINDING MACHINE
Filed Feb. 28, 1947   47 Sheets-Sheet 4
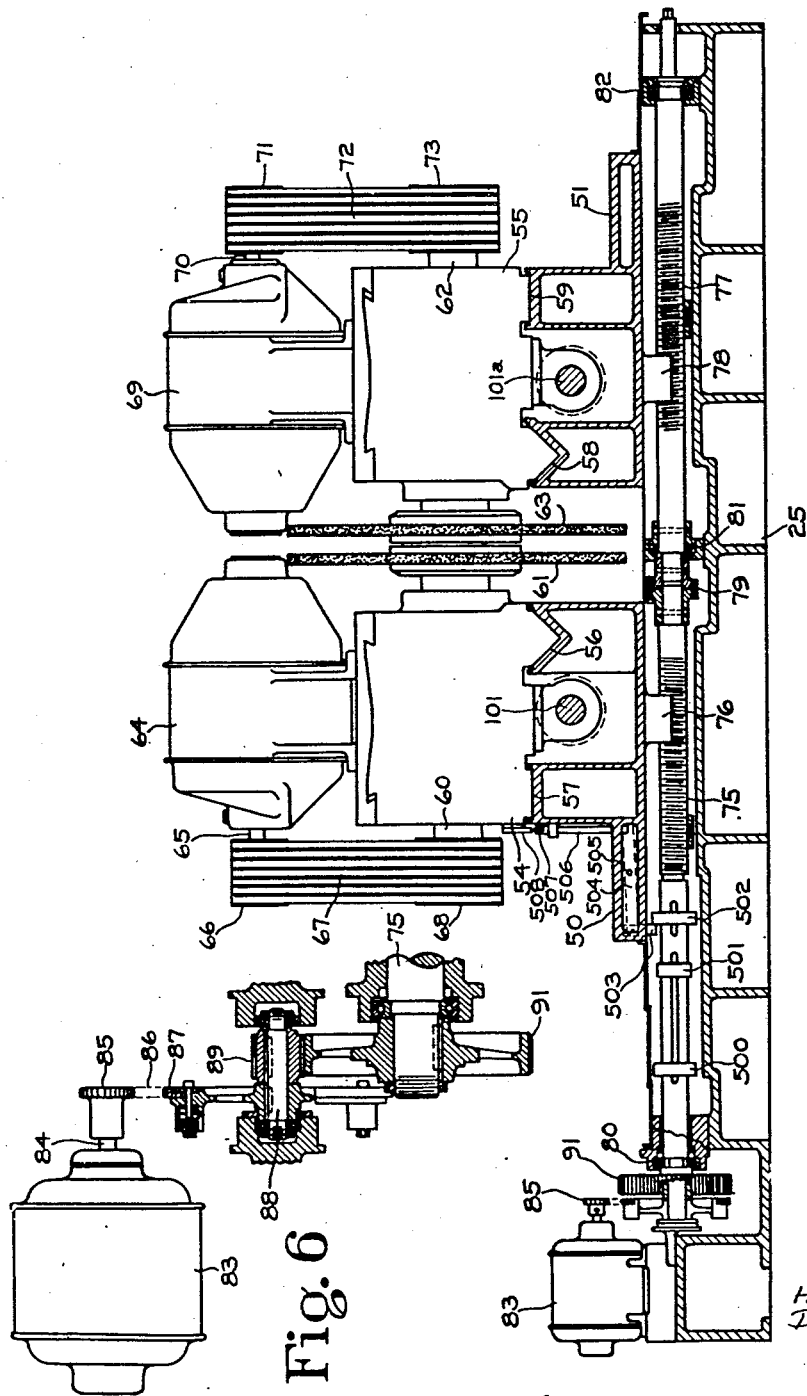

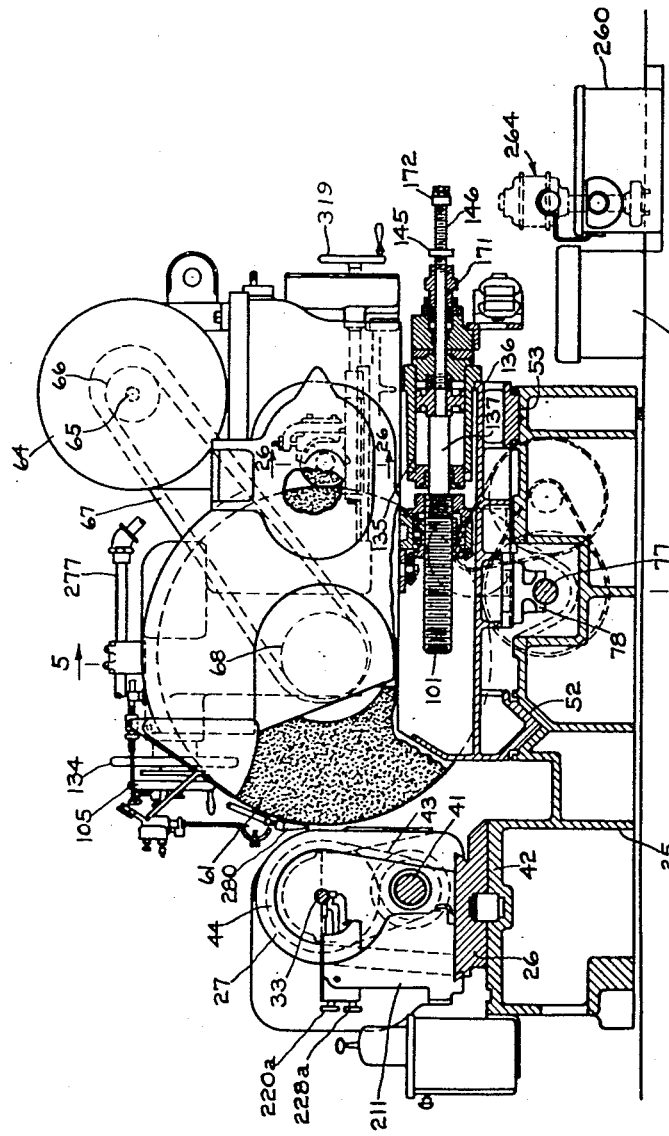

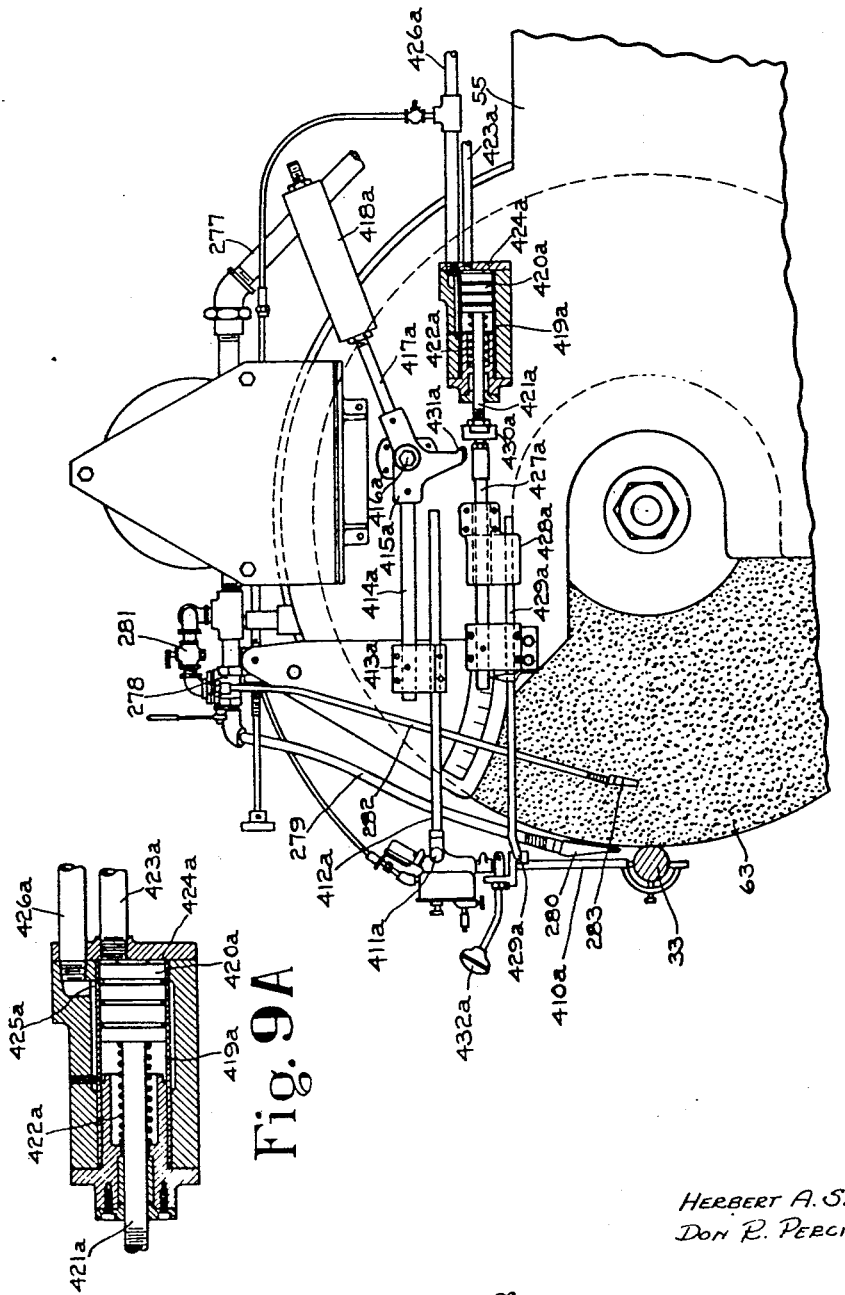

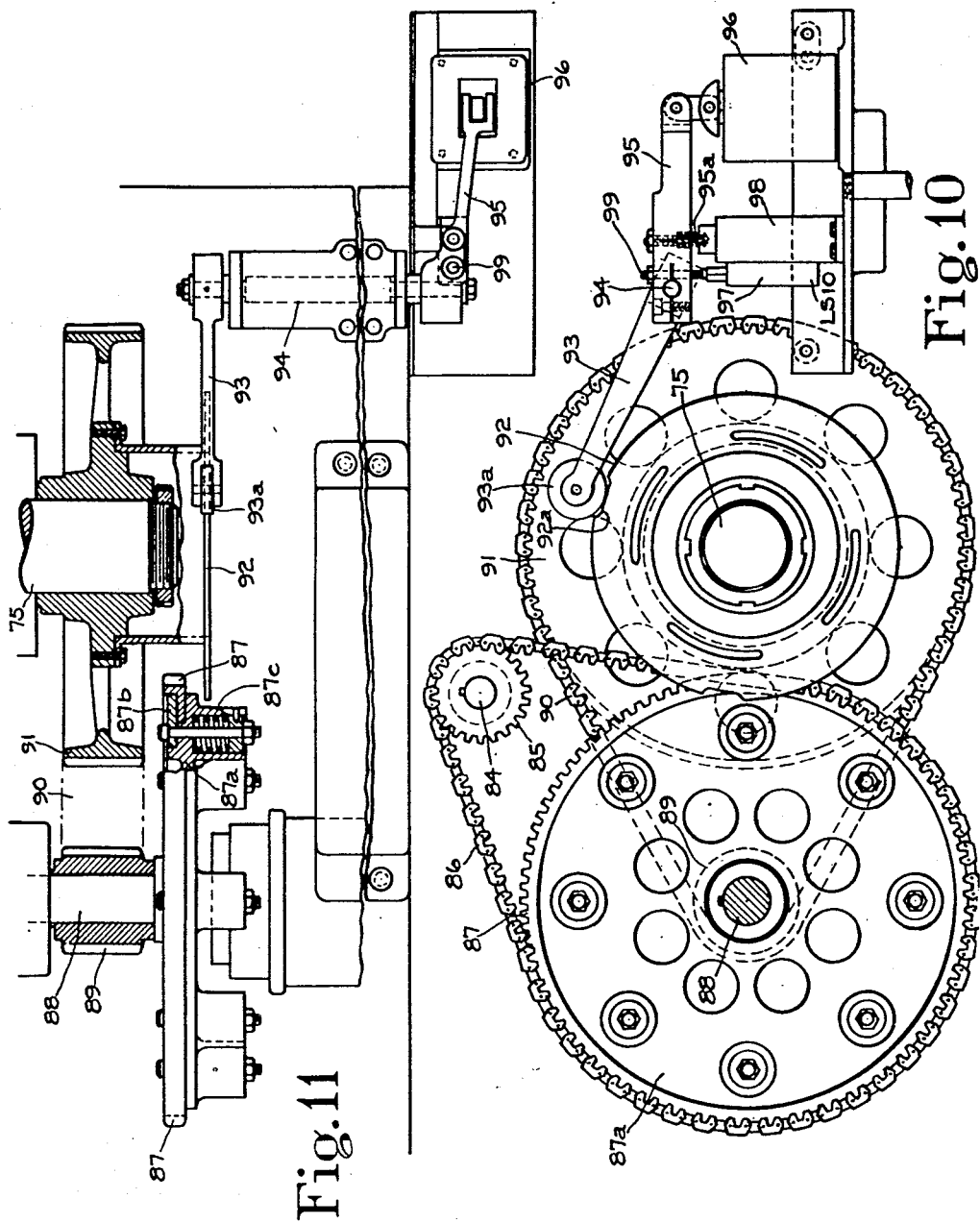

April 11, 1950   H. A. SILVEN ET AL   2,503,889
CRANKPIN GRINDING MACHINE
Filed Feb. 28, 1947   47 Sheets-Sheet 10

Inventors
HERBERT A. SILVEN
DON R. PERCIVAL
By Harold W. Eaton   Attorney

April 11, 1950  H. A. SILVEN ET AL  2,503,889
CRANKPIN GRINDING MACHINE
Filed Feb. 28, 1947  47 Sheets-Sheet 11

Inventors
HERBERT A. SILVEN
DON R. PERCIVAL
By Harold W. Eaton
Attorney

Inventors
HERBERT A. SILVEN
DON R. PERCIVAL
By Harold W Eaton
Attorney

April 11, 1950   H. A. SILVEN ET AL   2,503,889
CRANKPIN GRINDING MACHINE
Filed Feb. 28, 1947   47 Sheets-Sheet 13

Inventors
HERBERT A. SILVEN
DON R. PERCIVAL
By Harold W. Eaton
Attorney

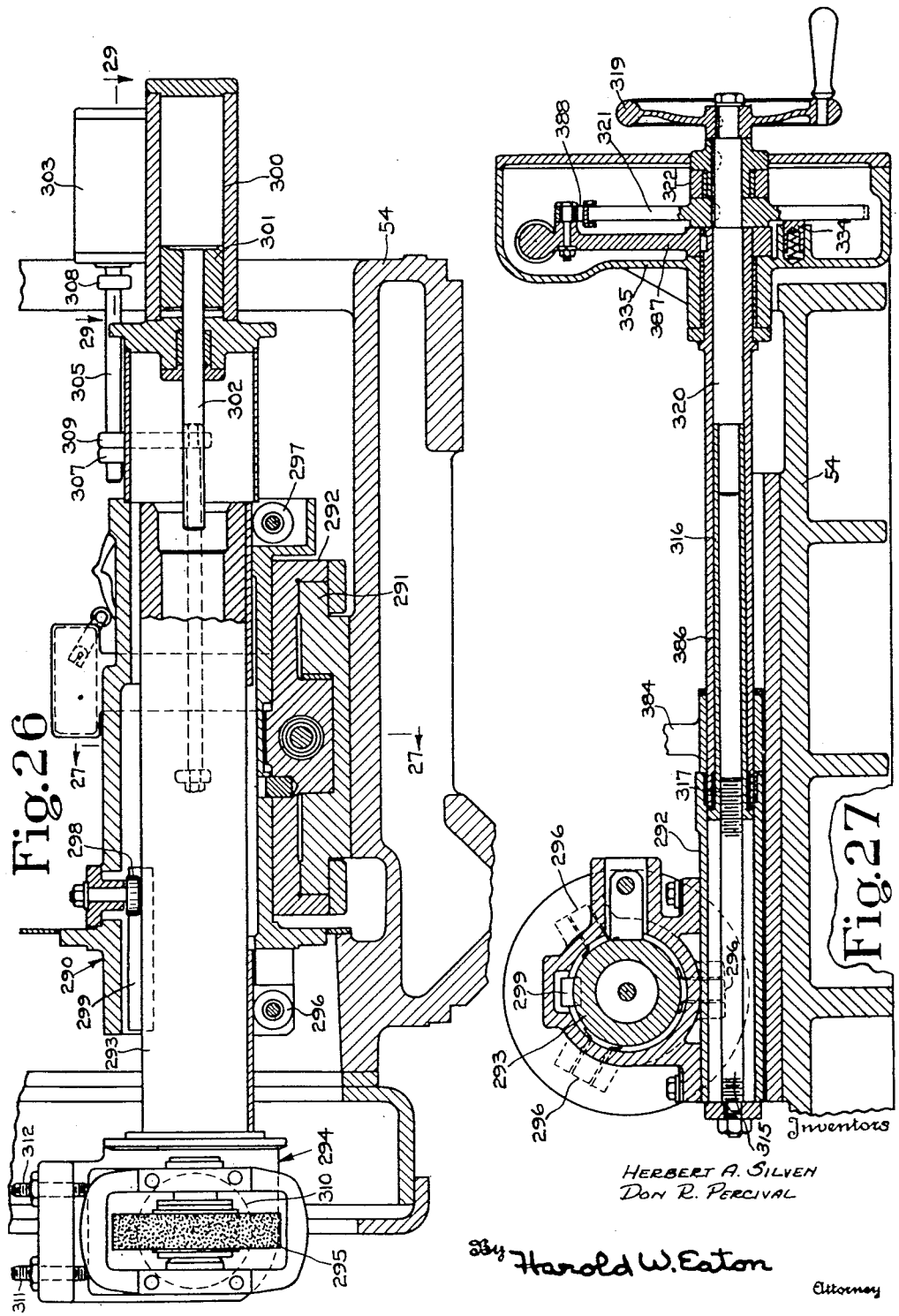

April 11, 1950 H. A. SILVEN ET AL 2,503,889
CRANKPIN GRINDING MACHINE
Filed Feb. 28, 1947 47 Sheets-Sheet 15

Inventors
HERBERT A. SILVEN
DON R. PERCIVAL

By Harold W. Eaton
Attorney

April 11, 1950     H. A. SILVEN ET AL     2,503,889
CRANKPIN GRINDING MACHINE
Filed Feb. 28, 1947                    47 Sheets-Sheet 16
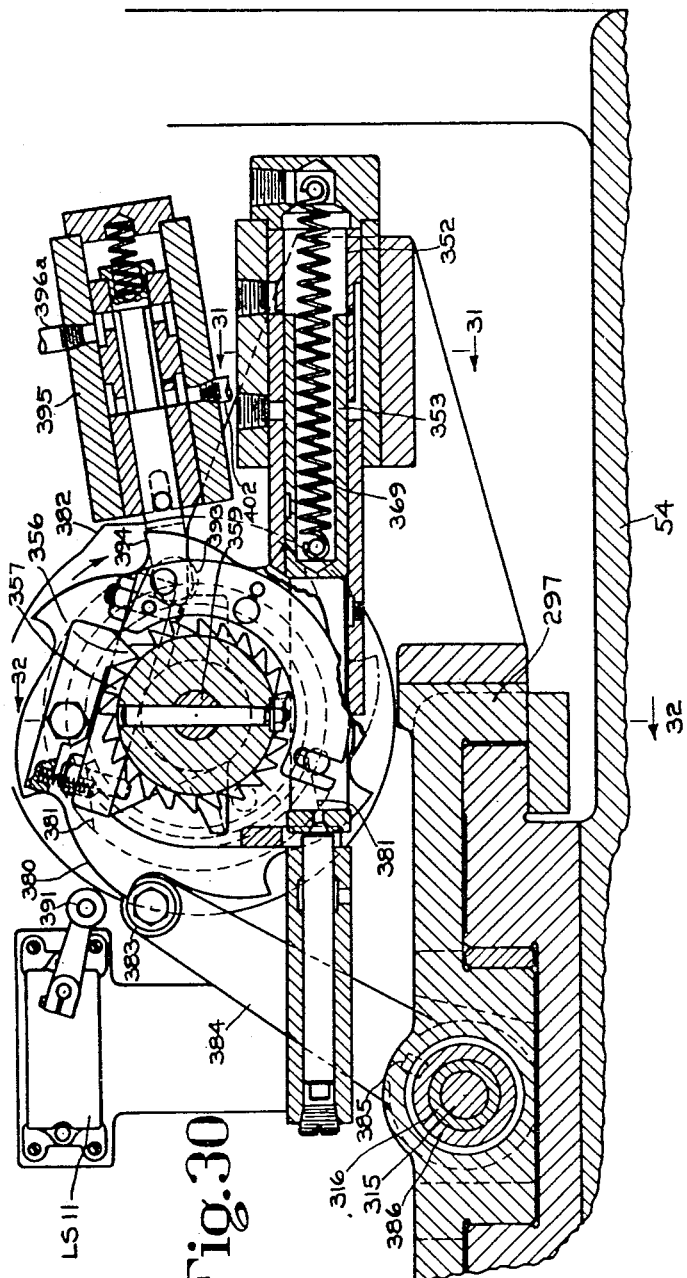
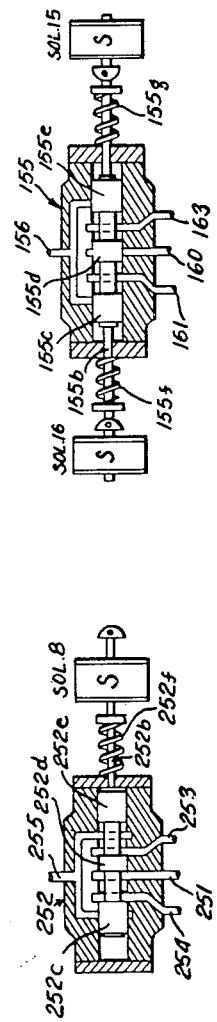
Inventors
HERBERT A. SILVEN
DON R. PERCIVAL
By Harold W. Eaton
Attorney April 11, 1950 H. A. SILVEN ET AL 2,503,889
CRANKPIN GRINDING MACHINE
Filed Feb. 28, 1947 47 Sheets-Sheet 17

Inventors
HERBERT A. SILVEN
DON R. PERCIVAL
By Harold W. Eaton
Attorney

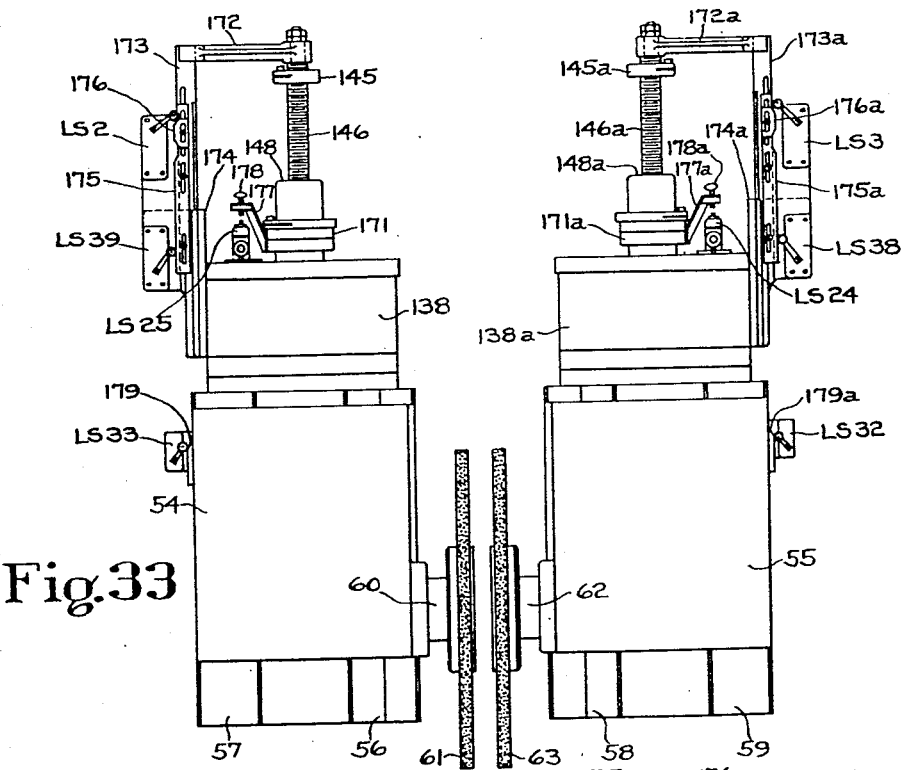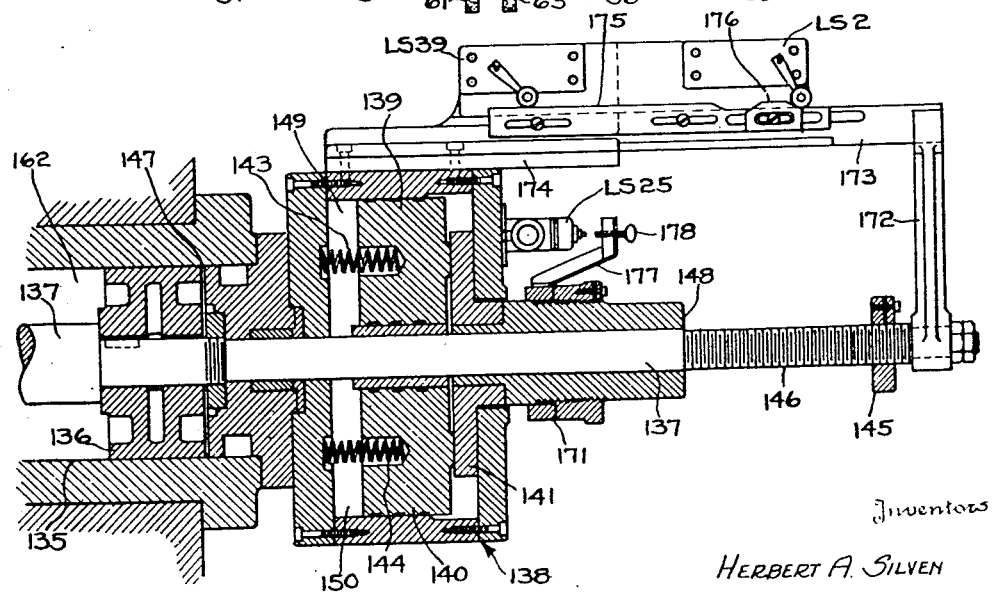

April 11, 1950  H. A. SILVEN ET AL  2,503,889
CRANKPIN GRINDING MACHINE
Filed Feb. 28, 1947  47 Sheets-Sheet 19

INVENTORS
HERBERT A. SILVEN
DON R. PERCIVAL
BY Harold W. Eaton
ATTORNEY

April 11, 1950 H. A. SILVEN ET AL 2,503,889
CRANKPIN GRINDING MACHINE
Filed Feb. 28, 1947 47 Sheets-Sheet 20

INVENTORS
HERBERT A. SILVEN
DON R. PERCIVAL
BY
Harold W. Eaton
ATTORNEY

April 11, 1950    H. A. SILVEN ET AL    2,503,889
CRANKPIN GRINDING MACHINE
Filed Feb. 28, 1947    47 Sheets-Sheet 22

INVENTORS
HERBERT A. SILVEN
DON R. PERCIVAL
BY Harold W. Eaton
ATTORNEY

Fig.45A

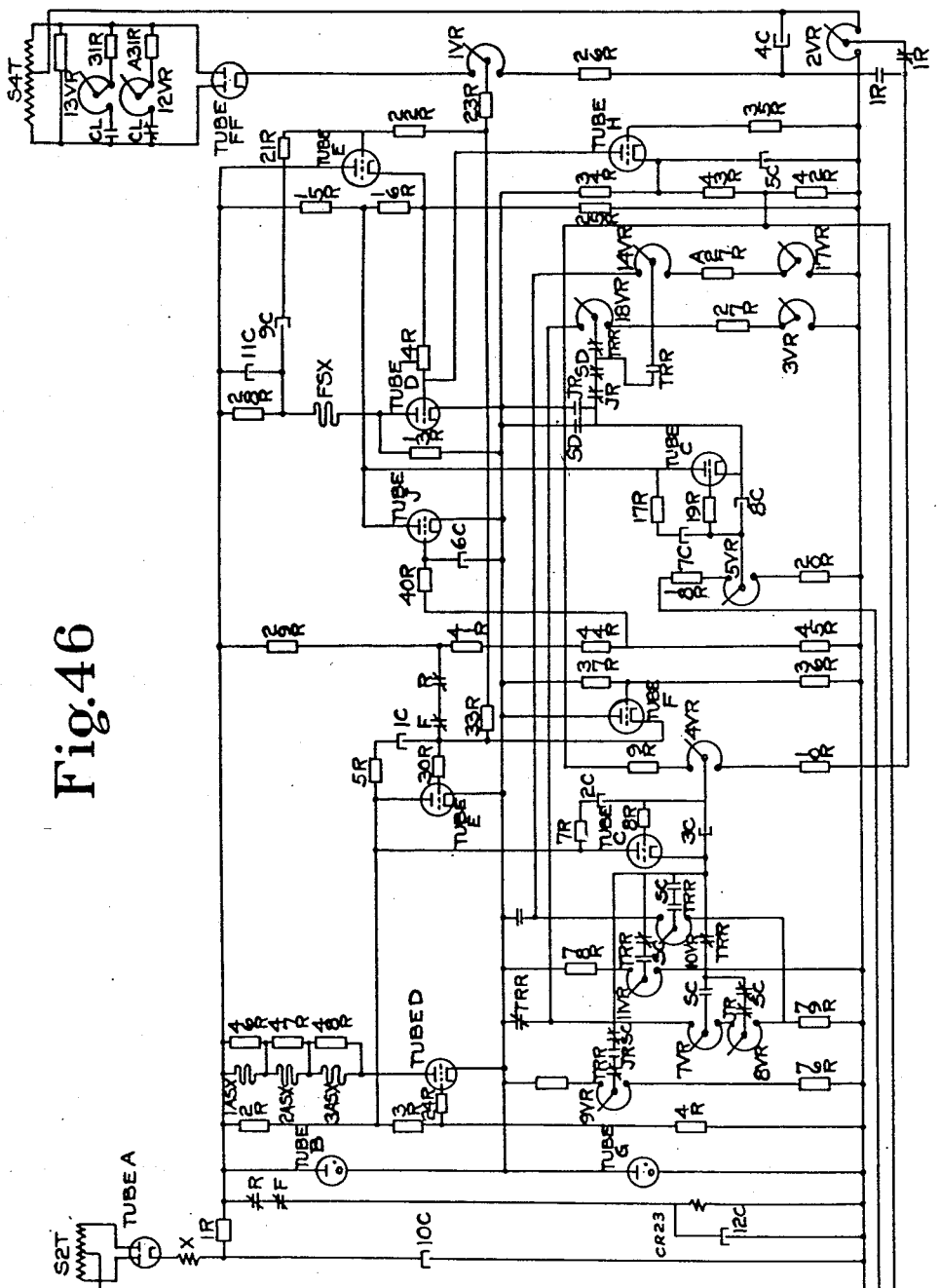

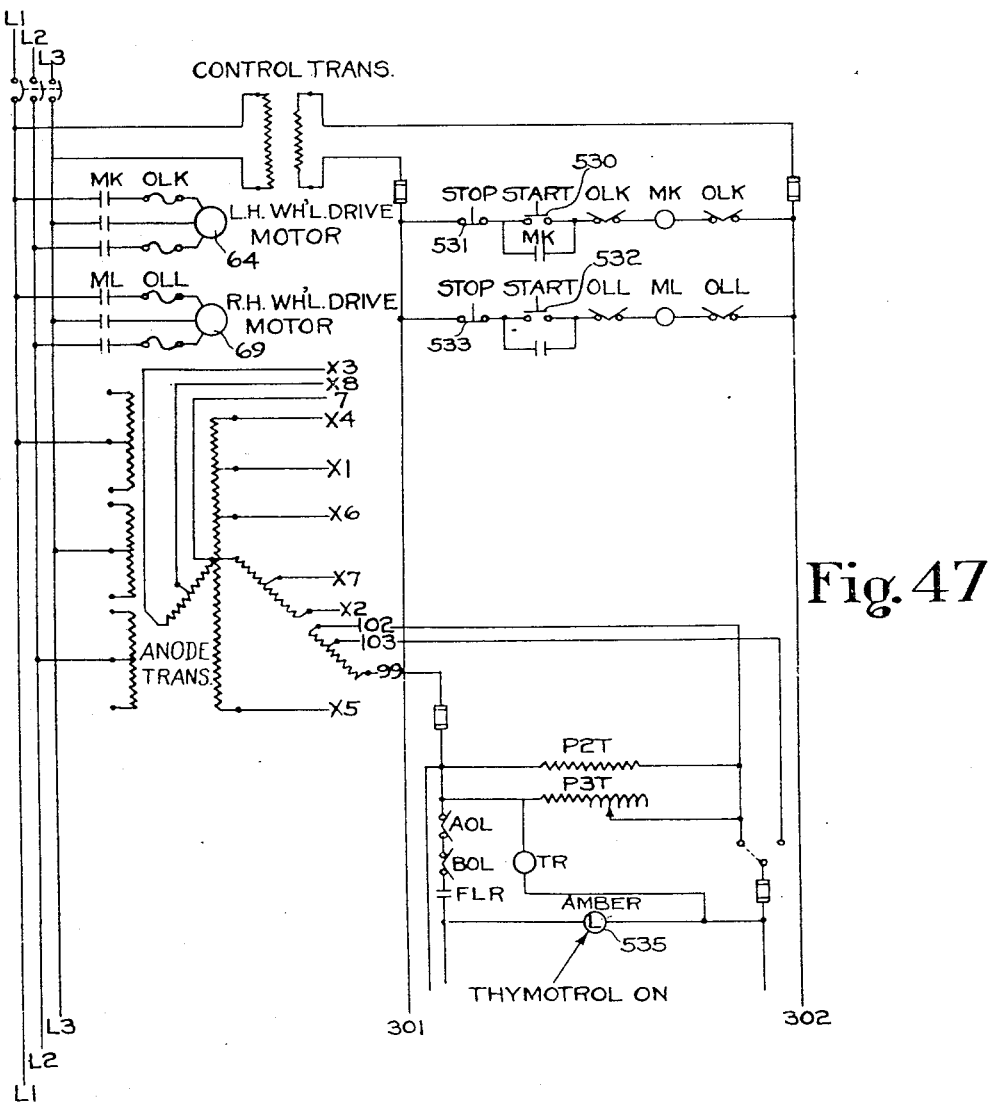

April 11, 1950  H. A. SILVEN ET AL  2,503,889
CRANKPIN GRINDING MACHINE

Filed Feb. 28, 1947  47 Sheets-Sheet 32

Fig. 47B

INVENTOR
HERBERT A. SILVEN
DON R. PERCIVAL

BY Harold W. Eaton
ATTORNEY

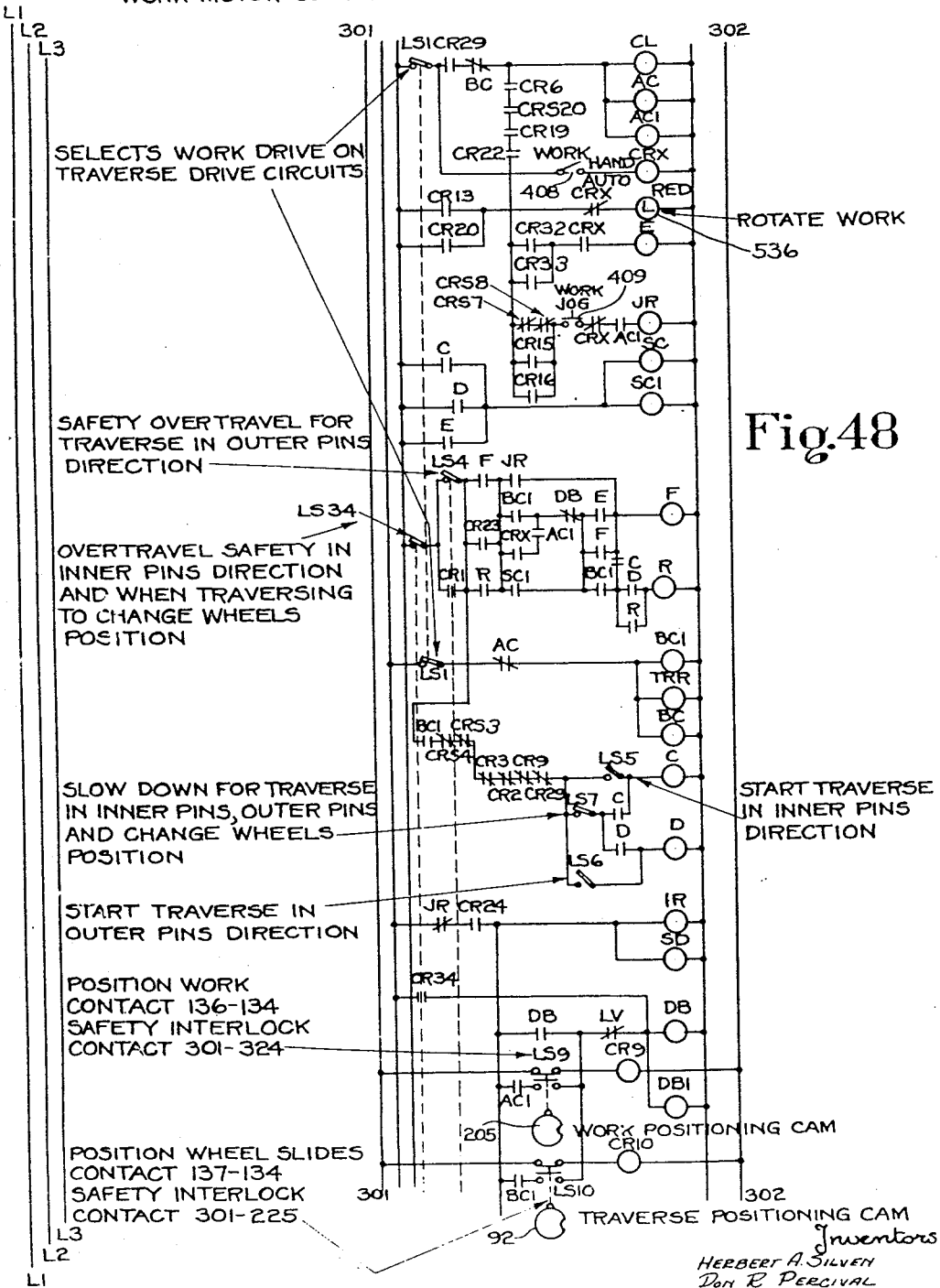

April 11, 1950 H. A. SILVEN ET AL 2,503,889
CRANKPIN GRINDING MACHINE
Filed Feb. 28, 1947 47 Sheets-Sheet 34

INVENTORS
HERBERT A. SILVEN
DON R. PERCIVAL

By Harold W. Eaton
ATTORNEY

April 11, 1950 — H. A. SILVEN ET AL — 2,503,889
CRANKPIN GRINDING MACHINE
Filed Feb. 28, 1947 — 47 Sheets-Sheet 38

INVENTORS
HERBERT A. SILVEN
DON R. PERCIVAL
BY Harold W. Eaton
ATTORNEY

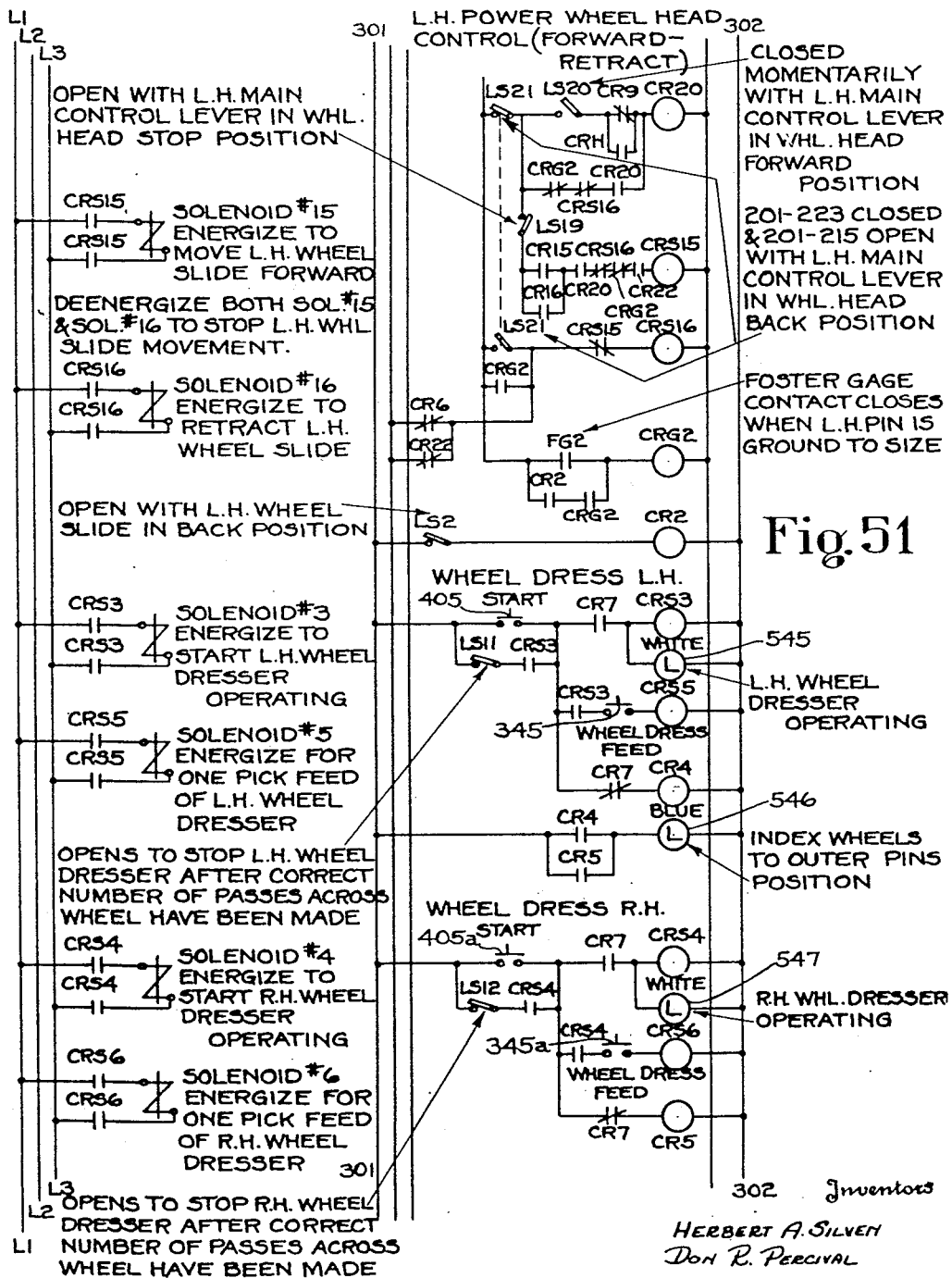

Fig.51A

Patented Apr. 11, 1950

2,503,889

UNITED STATES PATENT OFFICE 2,503,889

CRANKPIN GRINDING MACHINE

Herbert A. Silven and Don R. Percival, Worcester, Mass., assignors to Norton Company, Worcester, Mass., a corporation of Massachusetts Application February 28, 1947, Serial No. 732,644

50 Claims. (Cl. 51—72)

The invention relates to grinding machines, and more particularly to a machine for grinding the crankpins of an automotive crankshaft.

One object of the invention is to provide a simple and thoroughly practical, readily controllable crankpin grinding machine. Another object of the invention is to provide a crankpin grinding machine having a plurality of grinding wheels which are arranged simultaneously to grind spaced aligned crankpins on a crankshaft. Another object of the invention is to provide a multiple wheel crankpin grinding machine with a control mechanism whereby a plurality of grinding wheels may be indexed longitudinally and fed transversely simultaneously to grind a plurality of aligned pins on a crankshaft. A further object of the invention is to provide a multiple wheel crankpin grinding machine with independently controlled transversely movable grinding wheels which are arranged simultaneously to grind aligned pins on a crankshaft.

A further object of the invention is to provide a crankpin grinding machine with independent electric motors, one for simultaneously and synchronously rotating the work supporting pot chucks, and the other for simultaneously indexing the grinding wheel slides longitudinally to position the wheels relative to crankpins on the shaft to be ground. Another object of the invention is to provide such a machine with a single Thy-Mo-Trol electronic control apparatus for controlling both the work driving and the wheel indexing motors. Another object of the invention is to provide a pair of independent main control levers one of which serves to control the forward and rearward movement of one of the wheel slides and the other of which serves to control the work clamping, the movement of the other wheel slide, and the longitudinal indexing movement of both of said wheel slides and their supporting carriages.

A further object of the invention is to provide a crankpin grinding machine with suitable interlocked controls whereby the work supporting pot chucks cannot be rotated if the work holders or pot chucks are open. Another object of the invention is to provide an interlock control whereby the work clamps on the pot chucks cannot be released unless the work holders are in an upright position. Another object of the invention is to provide an interlock to prevent forward feeding movement of the wheel slide unless the steadyrest is in an operative position. Another object of the invention is to provide an interlock whereby the wheel slides are prevented from an infeeding movement until the wheels are properly indexed longitudinally into operative relation with spaced crankpins on the shaft to be ground. Another object of the invention is to provide an interlock to prevent rotation of the work supporting pot chucks except when the wheel slide is moving forward for a grinding operation. Another object of the invention is to provide a side truing apparatus for truing the side faces of the grinding wheels which is interlocked so that the work supporting chucks cannot be rotated during a side truing operation.

Another object of the invention is to provide an electric gauging apparatus which must be automatically removed from operative engagement with the work or crankpin being ground before the wheel slide can be moved rearwardly to an inoperative position. Another object of the invention is to provide electric safety stops to limit the outer and inner positions of the wheel carriages. Other objects will be in part obvious or in part pointed out hereinafter.

The invention accordingly consists in the features of construction, combinations of elements, and arrangements of parts as will be exemplified in the structure to be hereinafter described, and the scope of the application of which will be indicated in the following claims.

In the accompanying drawings, in which is shown one of various possible embodiments of the mechanical features of this invention, Fig. 1 is a front elevation of the improved crankpin grinding machine;

Fig. 5 is a vertical sectional view through the machine, showing the wheel slides in elevation, taken approximately on the line 5—5 of Fig. 7 through grinding wheel traversing and indexing mechanism;

Fig. 6 is a fragmentary sectional view of the driving mechanism for the grinding wheel traversing or indexing mechanism;

Fig. 7 is a fragmentary cross sectional view through the machine, showing the left hand grinding wheel slide and the feeding mechanism therefor;

Fig. 9 is a fragmentary right hand end elevation of the left hand wheel slide, showing the work gauging mechanism and the actuating mechanism therefor;

Fig. 9A is a fragmentary cross sectional view, on an enlarged scale, of the hydraulic mechanism for actuating the gauging mechanism;

Fig. 10 is a fragmentary sectional view, on an enlarged scale, taken approximately on the line 10—10 of Fig. 3, showing the indexing mechanism for the wheel carriages;

Fig. 11 is a fragmentary plan view, partly in section, of the wheel carriage indexing mechanism as shown in Fig. 10;

Fig. 26 is a fragmentary vertical sectional view, on an enlarged scale, taken approximately on the line 26—26 of Fig. 7, through the left hand grinding wheel peripheral truing apparatus;

Fig. 27 is a vertical sectional view, taken approximately on the line 27—27 of Fig. 26;

Fig. 30 is a cross sectional view, on an enlarged scale, through the automatically actuated feed mechanism for the left hand peripheral wheel truing apparatus;

Fig. 33 is a fragmentary plan view of the wheel slide showing the dash pot feed regulators and the limit switches and controls therefor;

Fig. 34 is a fragmentary horizontal sectional view, on an enlarged scale, to the dash pot feed regulator for the left hand wheel slide showing the limit switches associated therewith;

Figure 45:
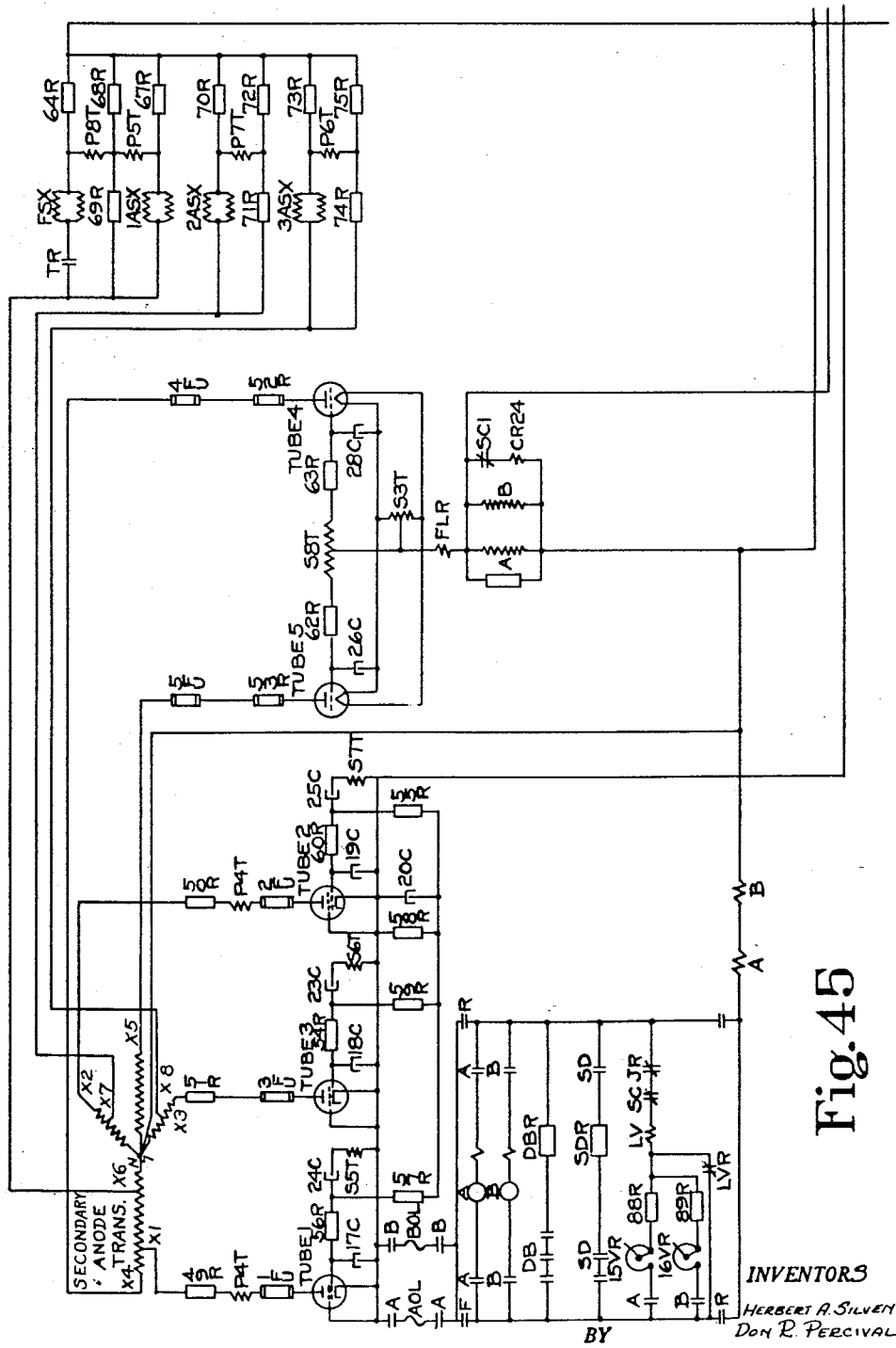
Figure 45A:
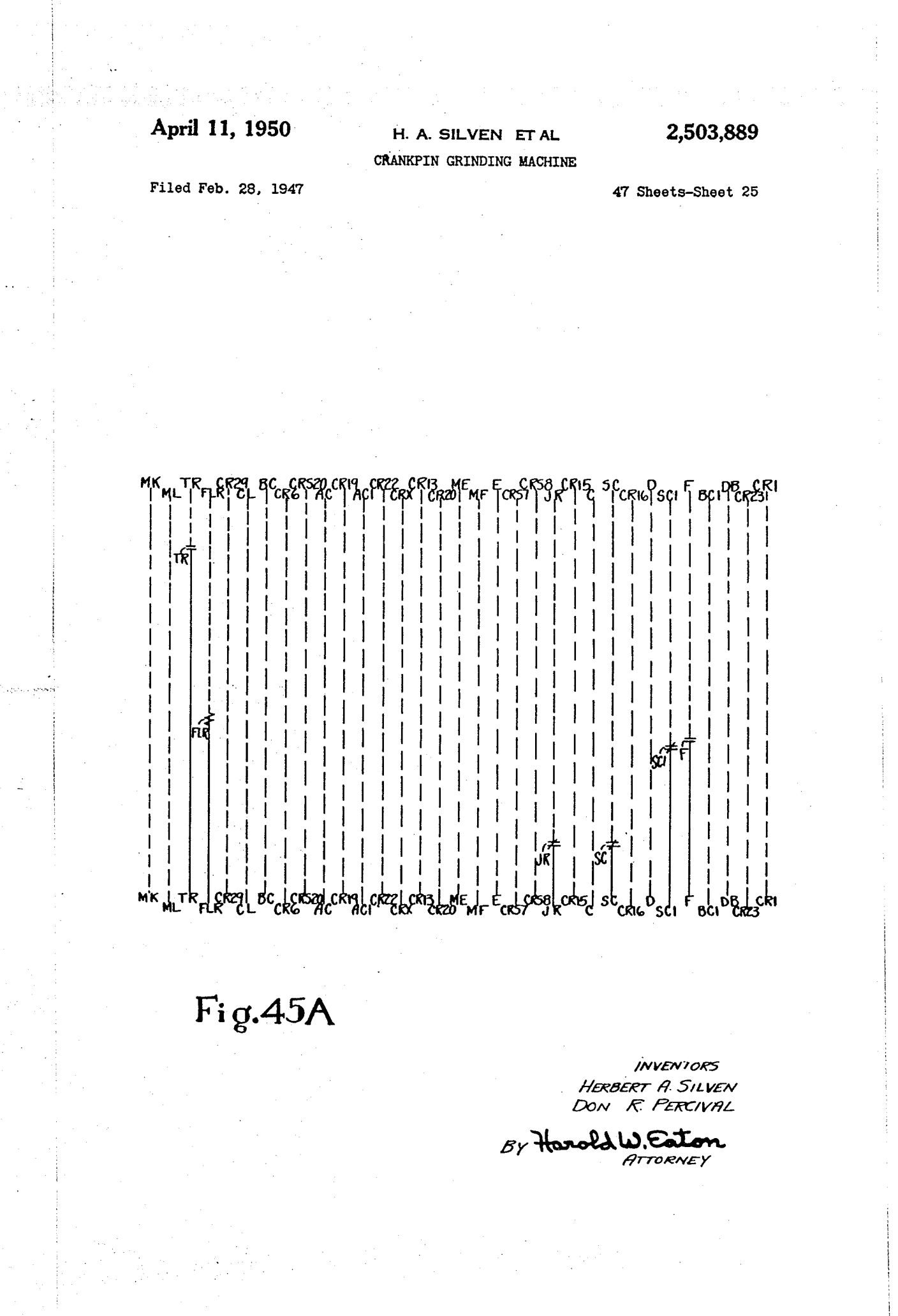
Figure 45B:
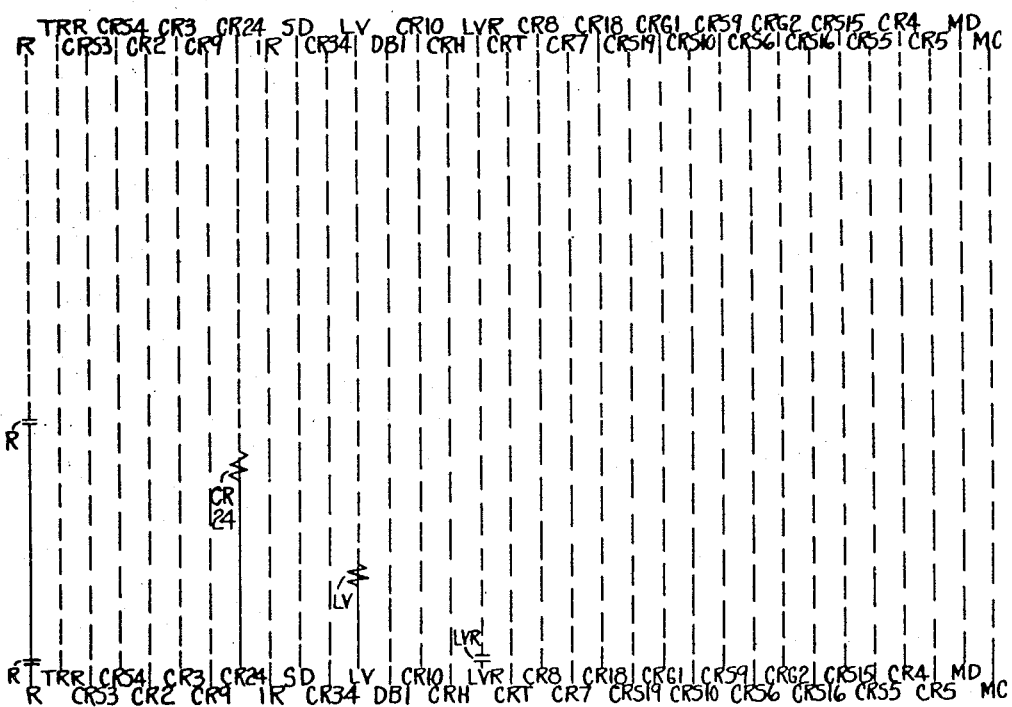
Figure 46A:
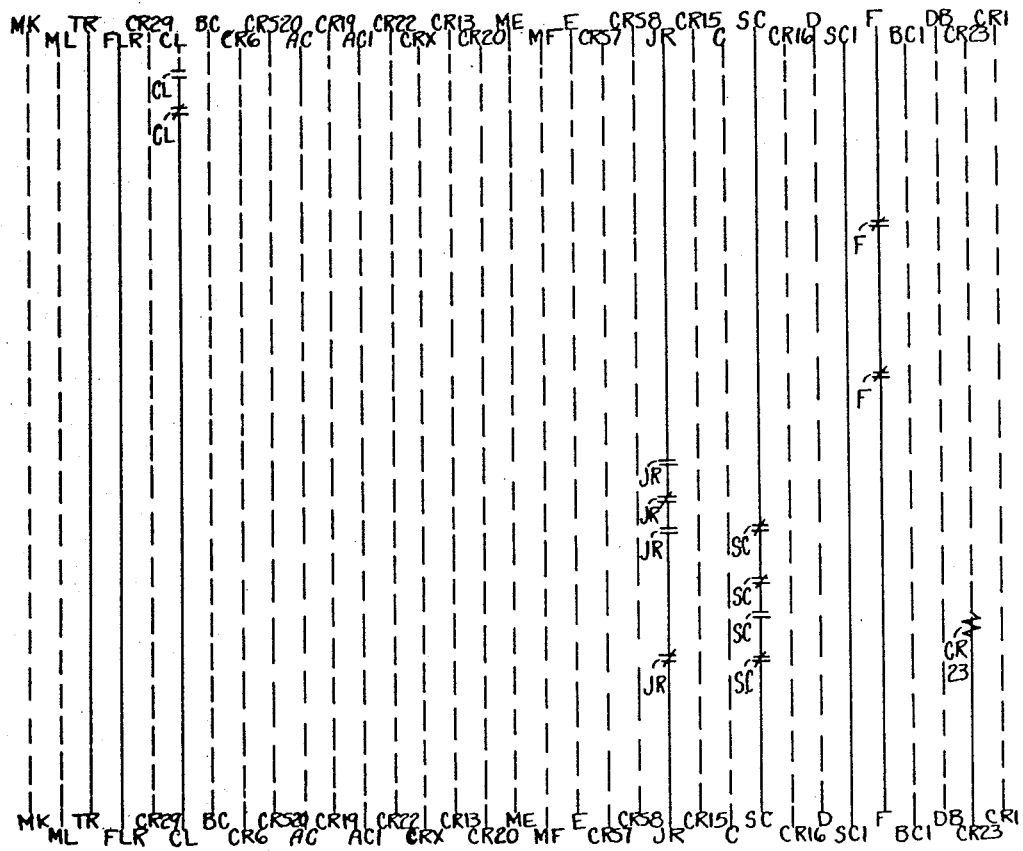
Figure 46B:
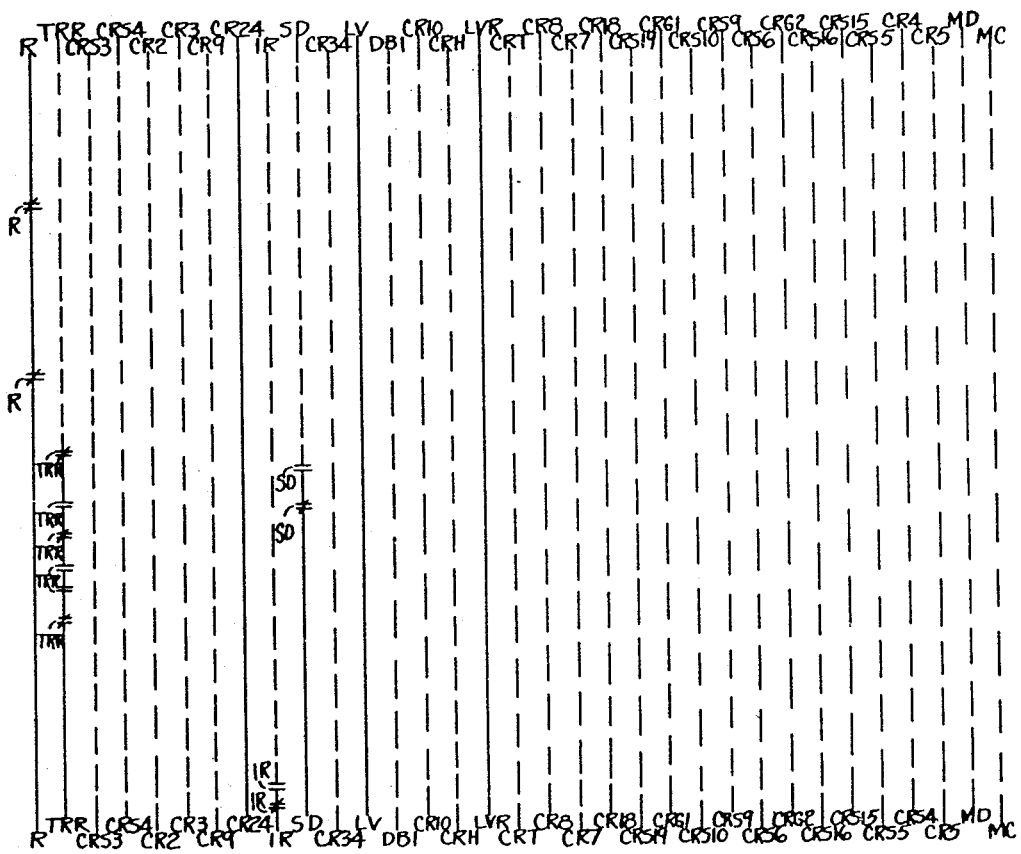
Figure 47A:
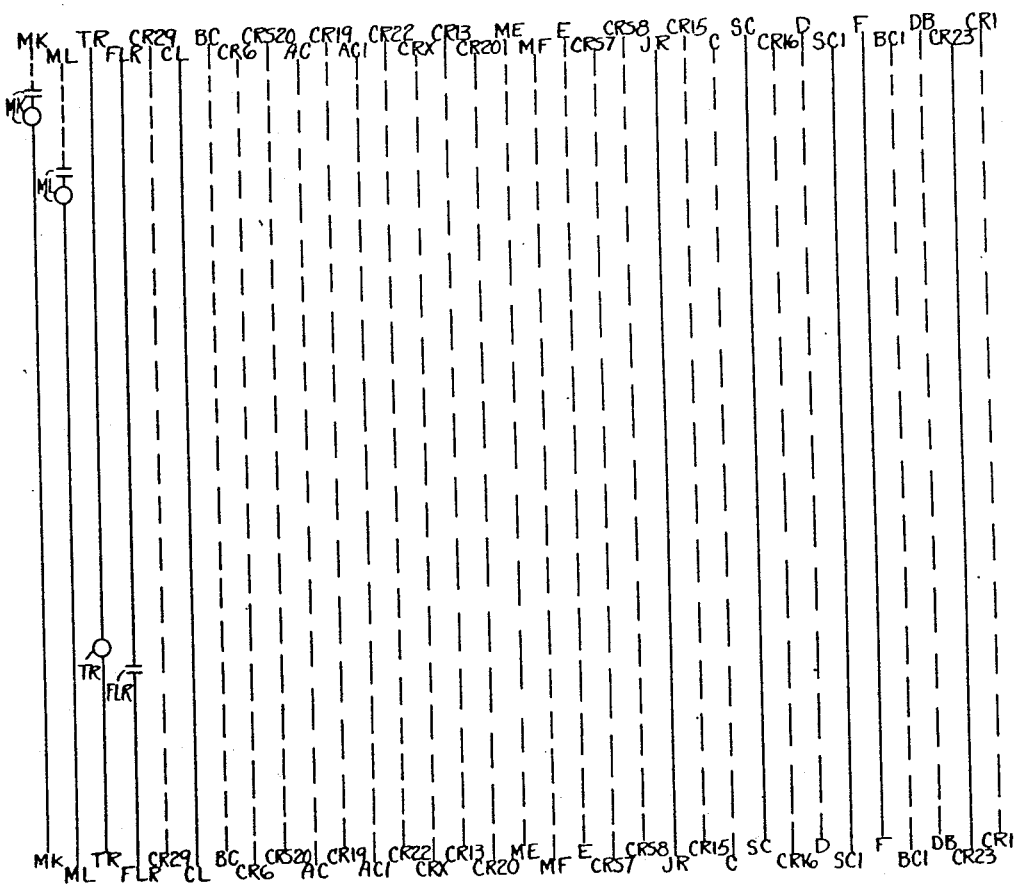
Figure 48A:
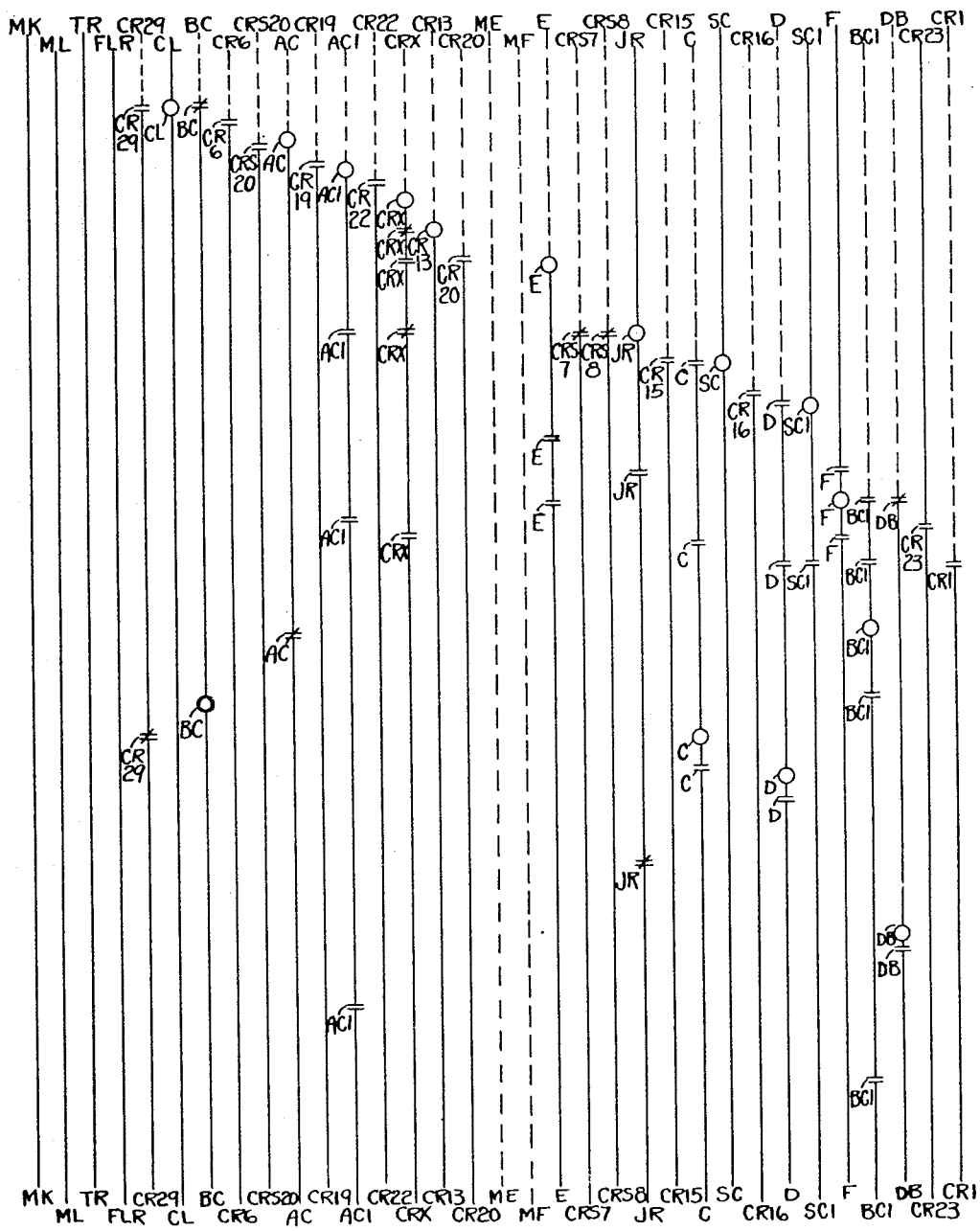
Figure 48B:
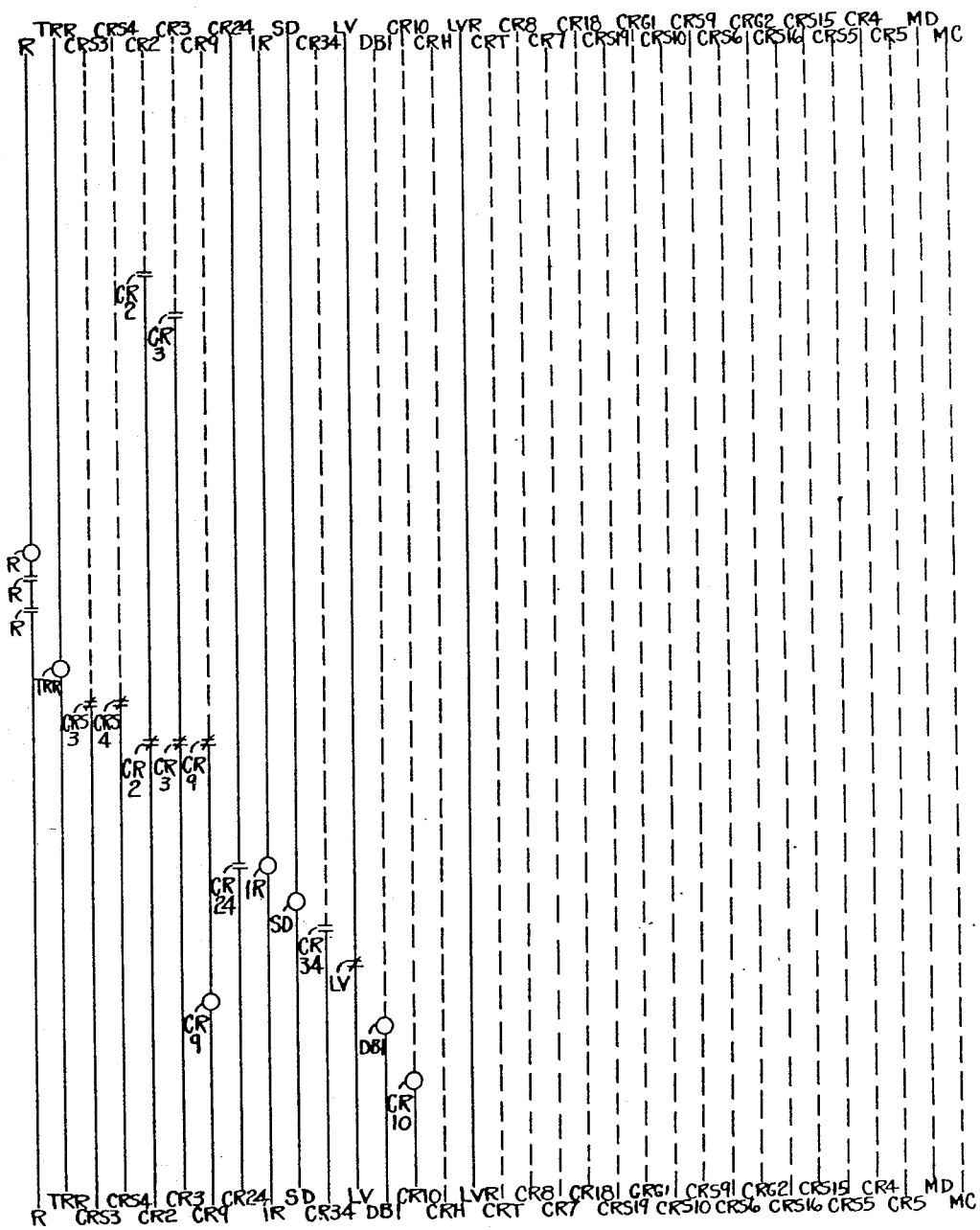
Figure 49:
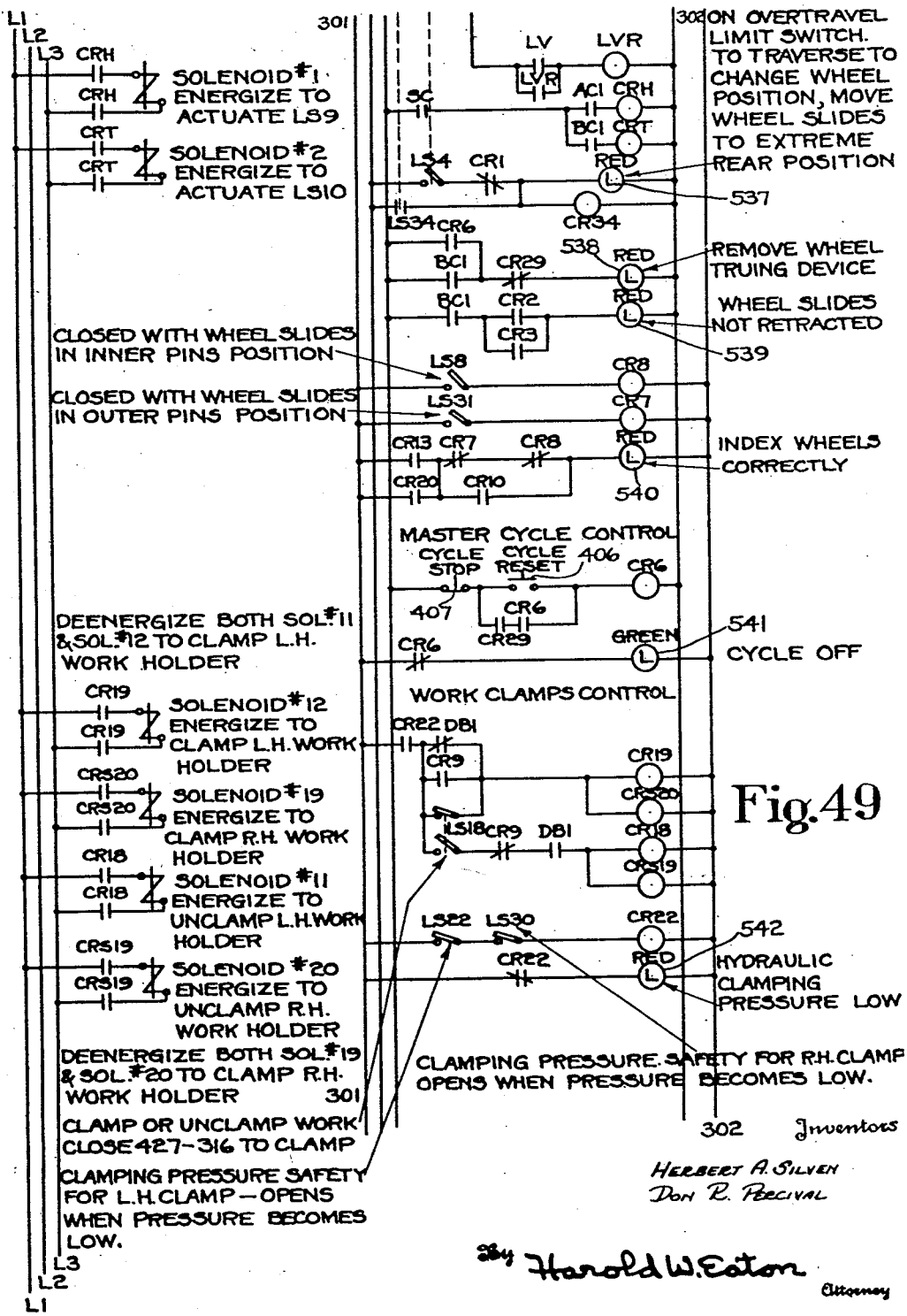
Figure 49A:
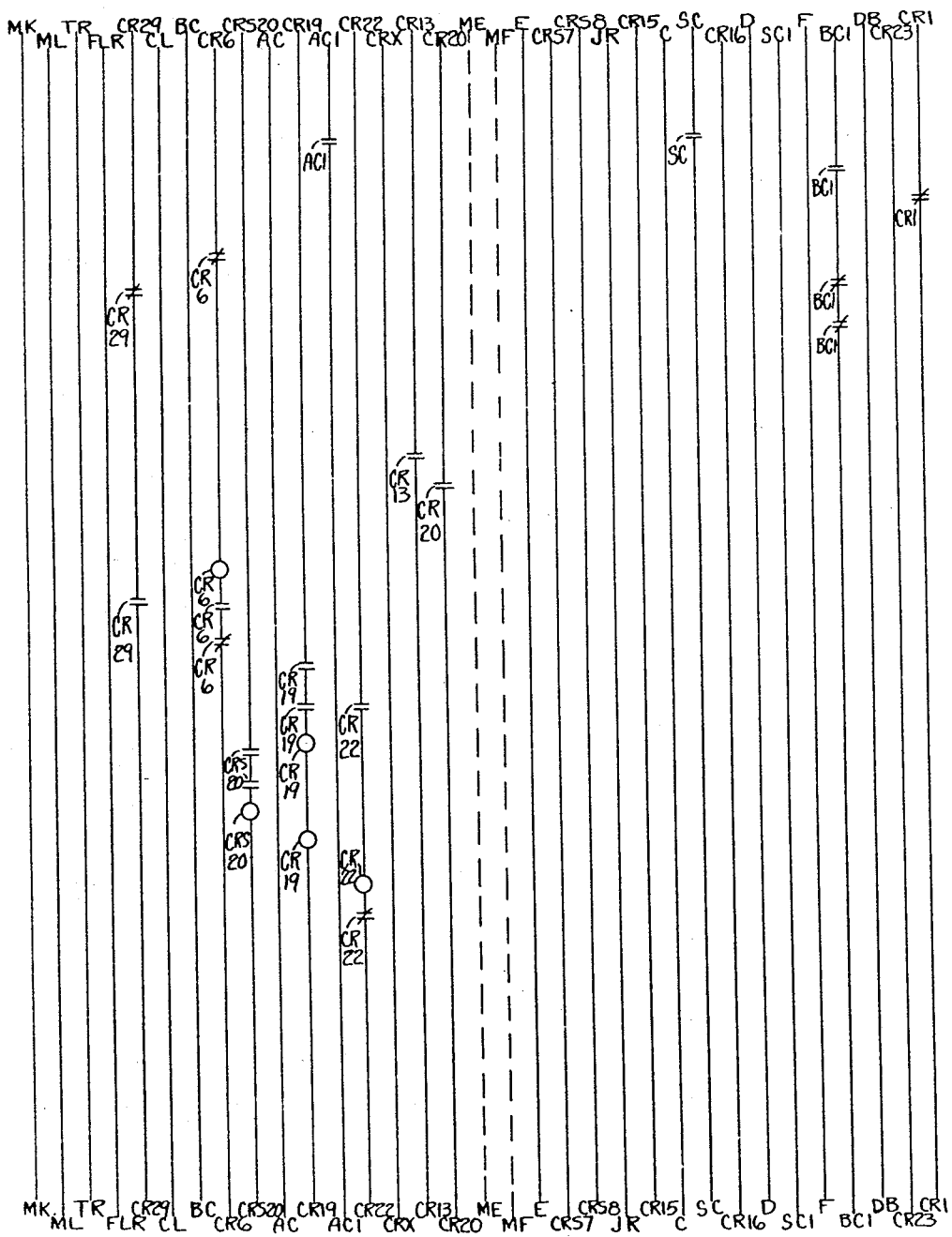
Figure 49B:
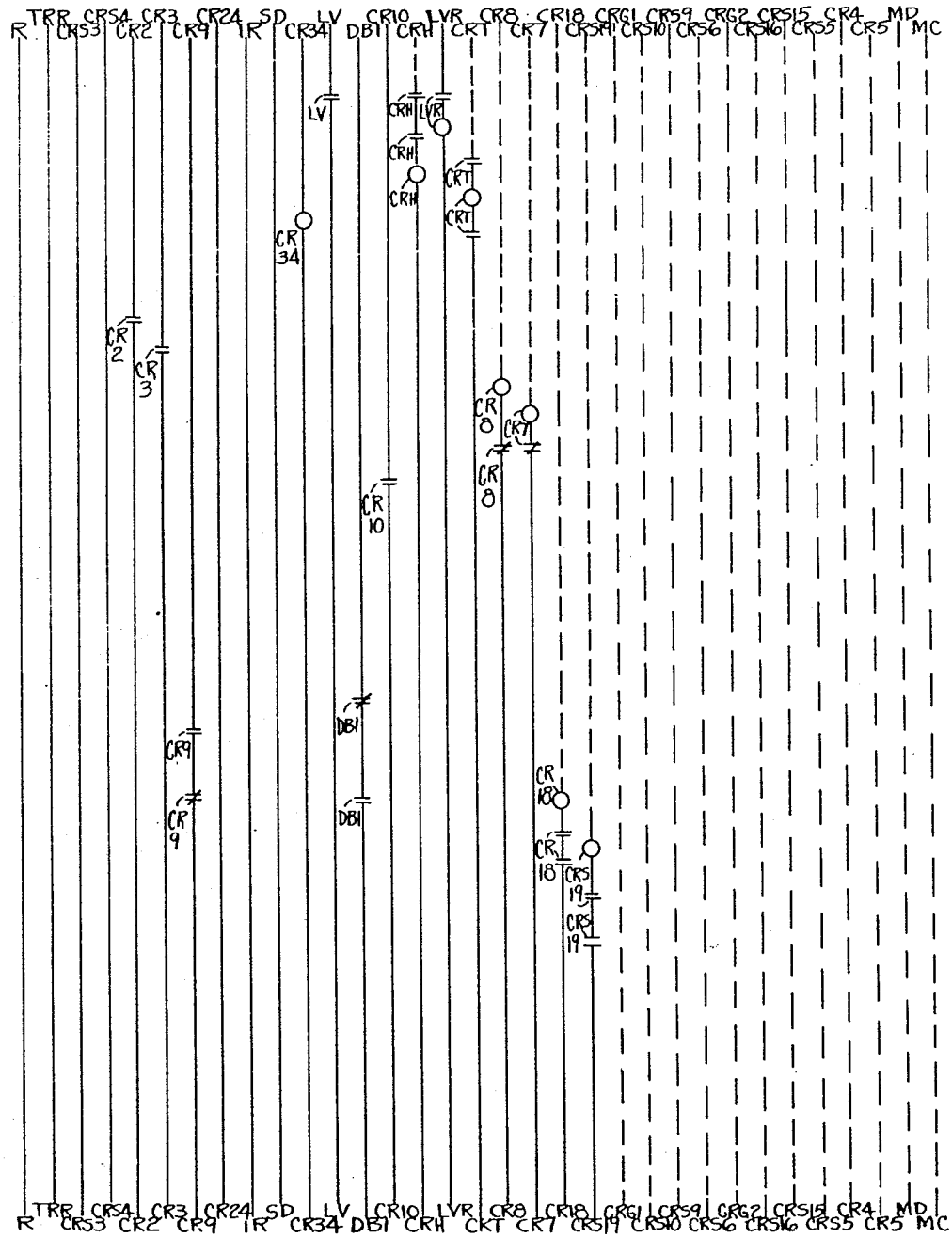

Figs. 45 and 46 constitute an elementary electric diagram of the electronic control unit; and Figs. 47, 48, 49, 50, 51 and 52 when arranged vertically end to end in numerical order illustrate an elementary electric diagram of the electric controls and interlocks of the machine.

Fig. 53 is a cross sectional view, on an enlarged scale, through one of the double solenoid actuated 4-way valves; and Fig. 54 is a similar cross sectional view, on an enlarged scale, through one of the solenoid actuated 4-way valves.

Figures 45A, 46A, 47A, 48A, 49A, 50A, 51A and 52A when arranged vertically end to end in numerical order and placed beside Figures 45, 46, 47, 48, 49, 50, 51, and 52 illustrate a portion of a coordinate key to supplement the elementary electric diagram; and Figures 45B, 46B, 47B, 48B, 49B, 50B, 51B and 52B when arranged vertically end to end in numerical order and placed beside Figures 45A, 46A, 47A, 48A, 49A, 50A, 51A, and 52A illustrate the remainder of the coordinate key to supplement the elementary electric diagram.

A double head crankpin grinding machine has been illustrated in the drawings comprising a base 25 which serves as a support for a swivel table 26. The swivel table 26 supports a pair of spaced work heads 27 and 28. A pair of axially aligned rotatable spindles 29 and 30 are rotatably supported in suitable bearings (not shown) in work heads 27 and 28 respectively. Hot chucks 31 and 32 are mounted respectively on the inner ends of the spindles 29 and 30 and serve as supports for the opposite ends of a crankshaft 33 to be ground.

A driving mechanism is provided for synchronously rotating the work spindles 29 and 30 comprising an electric motor 36 which is mounted on the base 25 of the machine. The motor 36 is provided with a motor shaft 37 carrying a sprocket 38. The sprocket 38 is connected by means of a link chain 39 (Fig. 3) with a sprocket 40 which is mounted on the left hand end of a rotatable drive shaft 41. The drive shaft 41 extends lengthwise of the machine and is journalled in suitable bearings (not shown) in the work heads 27 and 28 respectively. The drive shaft 41 supports a sprocket 42 which is connected by means of a link chain 43 with a sprocket 44 mounted on the spindle 29. Similarly, the shaft 41 supports a sprocket 45 which is connected by means of a link chain 46 with a sprocket 47 mounted on the spindle 30. It will be readily apparent from the foregoing disclosure that starting of the motor 36 will transmit a rotary motion to the shaft 41 which in turn through the link chains 43 and 46 serves synchronously to rotate the spindles 29 and 30 and the pot chucks 31 and 32 respectively.

Figure 2:
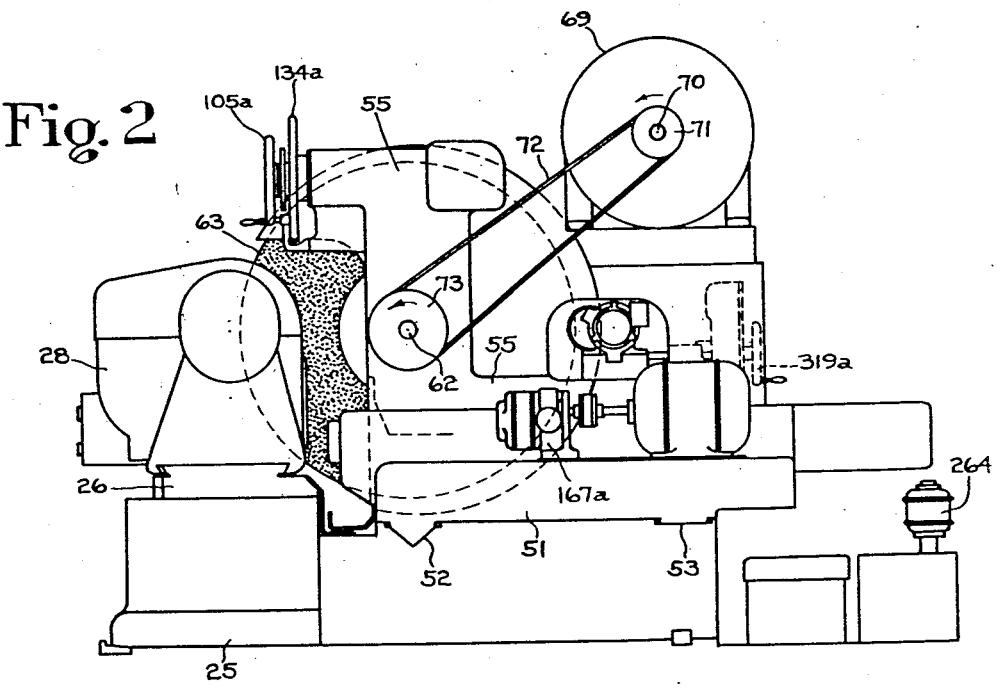
Fig. 2 is a fragmentary right hand end elevation of the crankpin grinding machine.

The base 25 also serves as a support for a pair of spaced longitudinally movable wheel carriages 50 and 51. The carriages 50 and 51 are supported on a V-way 52 and a flat way 53 formed on the upper surface of the base 25 (Fig. 2). The carriages 50 and 51 serve as supports for a pair of transversely movable wheel slides 54 and 55 respectively. The wheel slide 54 is supported by a transversely extending V-way 56 and flat way 57 formed on the carriage 50. The wheel slide 55 is similarly supported on a transversely extending V-way 58 and flat way 59 formed on the carriage 51.

The wheel slide 54 is provided with a rotatable wheel spindle 60 which is mounted in suitable spindle bearings (not shown). Similarly, the wheel slide 55 is provided with a rotatable wheel spindle 62 mounted in suitable spindle bearings (not shown). The spindles 60 and 62 are preferably independently driven by electric motor driving mechanisms. A motor 64 is mounted on the upper surface of the wheel slide 54. The motor 64 is provided with a motor shaft 65 which carries a multi-V-grooved pulley 66 which is connected by multiple V-belts with a multiple-V-grooved pulley 68 which is mounted on the left hand end of the wheel spindle 60 (Fig. 5). Similarly, an electric motor 69 is mounted on the upper surface of the wheel slide 55. The motor 69 is provided with a motor shaft 70 which is in turn provided with a multi-V-grooved pulley 71. The pulley 71 is connected by multiple V-belts 72 with a multi-V-grooved pulley 73 mounted on the right hand end of the wheel spindle 62. It will be readily apparent from the foregoing disclosure that the motors 64 and 69 serve through the driving mechanisms above described independently to rotate the grinding wheels 61 and 63.

It is desirable to provide an indexing or traversing mechanism simultaneously to traverse or index the carriages 50 and 51 so as to position the grinding wheels 61 and 63 into operative relation with aligned pairs of crankpins on the crankshaft 33 to be ground. This mechanism preferably comprises a rotatable traversing screw 75 which is rotatably journalled in the base of the machine. The screw 75 meshes with or engages a depending half nut 76 depending from the underside of the carriage 50. An axially aligned rotatable screw 77 is rotatably journalled in the base 25 of the machine. A depending half nut 78 depends from the underside of the carriage 51 and meshes with or engages the feed screw 77. In order to index the grinding wheels 61 and 63 simultaneously in opposite directions, the feed screws 75 and 77 are formed with right and left hand threads. These two feed screws 75 and 77 are connected by an adjustable coupling 79 which is arranged so as to facilitate adjusting the position of one of the carriages relative to the other in setting up the machine for a given grinding operation. The feed screws 75 and 77 are rotatably journalled in anti-friction bearings 80, 81 and 82 which are carried by the base 25 of the machine. In case it is desired to adjust the position of one of the carriages relative to the other, the bolts connecting the parts of the coupling 79 may be removed and the feed screw 77 rotated by applying a wrench to the squared-off and formed on the right hand end of the feed screw 77. After the desired adjustment has been made, the parts of the coupling 79 may be again bolted rigidly together so as to lock the feed screw 75 relative to the feed screw 77.

A suitable driving or indexing mechanism is provided for supplying power for rotating the feed screws 75 and 77. This mechanism comprises an electric motor 83 mounted on the base 25. The motor 83 is provided with a motor shaft 84 which supports a sprocket 85. The sprocket 85 is connected by means of a link chain 86 (Figs. 6 and 10) with a sprocket 87 which is mounted on a rotatable shaft 88. The shaft 88 is provided with a sprocket 89 which is connected by means of a link chain 90 with a sprocket 91 which is mounted on the left hand end of the feed screw 75. It will be readily apparent from the foregoing disclosure that rotation of the motor shaft 84 will be imparted through the driving mechanism above described to rotate the feed screws 75 and 77 respectively.

It is desirable to provide a friction driving connection in the driving mechanism above described to facilitate slippage in indexing of the carriages 50 and 51 during the stopping and starting of the same. In the preferred construction as shown in Fig. 11, the sprocket 87 is provided with an inwardly extending flanged portion which is frictionally connected with the shaft 88 by means of a friction plate 87b which is yieldingly maintained in engagement with one side of the inwardly projecting flange. The other side of the flange being supported by a central portion 87a which is keyed to the shaft 88. A plurality of compression springs 87c serves to supply the desired frictional engagement between the ring 87b and the inwardly projecting flange of the sprocket 87. It will be readily apparent that by varying the tension of the springs 87 any desired frictional connection may be obtained.

An electrical stop control mechanism is provided to facilitate stopping the rotation of the feed screws 75 and 77 during an indexing movement of the wheel carriages 50 and 51 precisely to position the grinding wheels 61 and 63 respectively relative to aligned pairs of pins to be ground. This mechanism may comprise a cam 92 which is fixedly supported on the sprocket 91 (Figs. 10 and 11). A rock arm 93 is fixedly supported on one end of a rock shaft 94. The arm 93 is provided with a follower roller 93A which is arranged to engage the peripheral face of the cam 92. A rock arm 95 is adjustably supported on the lower end of the rock shaft 94 (Fig. 11) and is arranged so that it may be clamped rigidly thereto so that the rock arms 93 and 95 function as a bell crank lever. A solenoid 96 is provided for actuating the rock arm 95. A compression spring 95a (Fig. 10) serves normally to urge the rock arms 95 and 93 in a counterclockwise direction so as to maintain the follower roller 93a in operative engagement with the peripheral surface of the cam 92. A bracket 98 serves as a support for a limit switch 97 which is arranged to be actuated by an adjustable screw 99 carried by the rock arm 95. The operation of this stop control mechanism will be described in detail in the subsequent description.

Wheel feed

Figure 8:
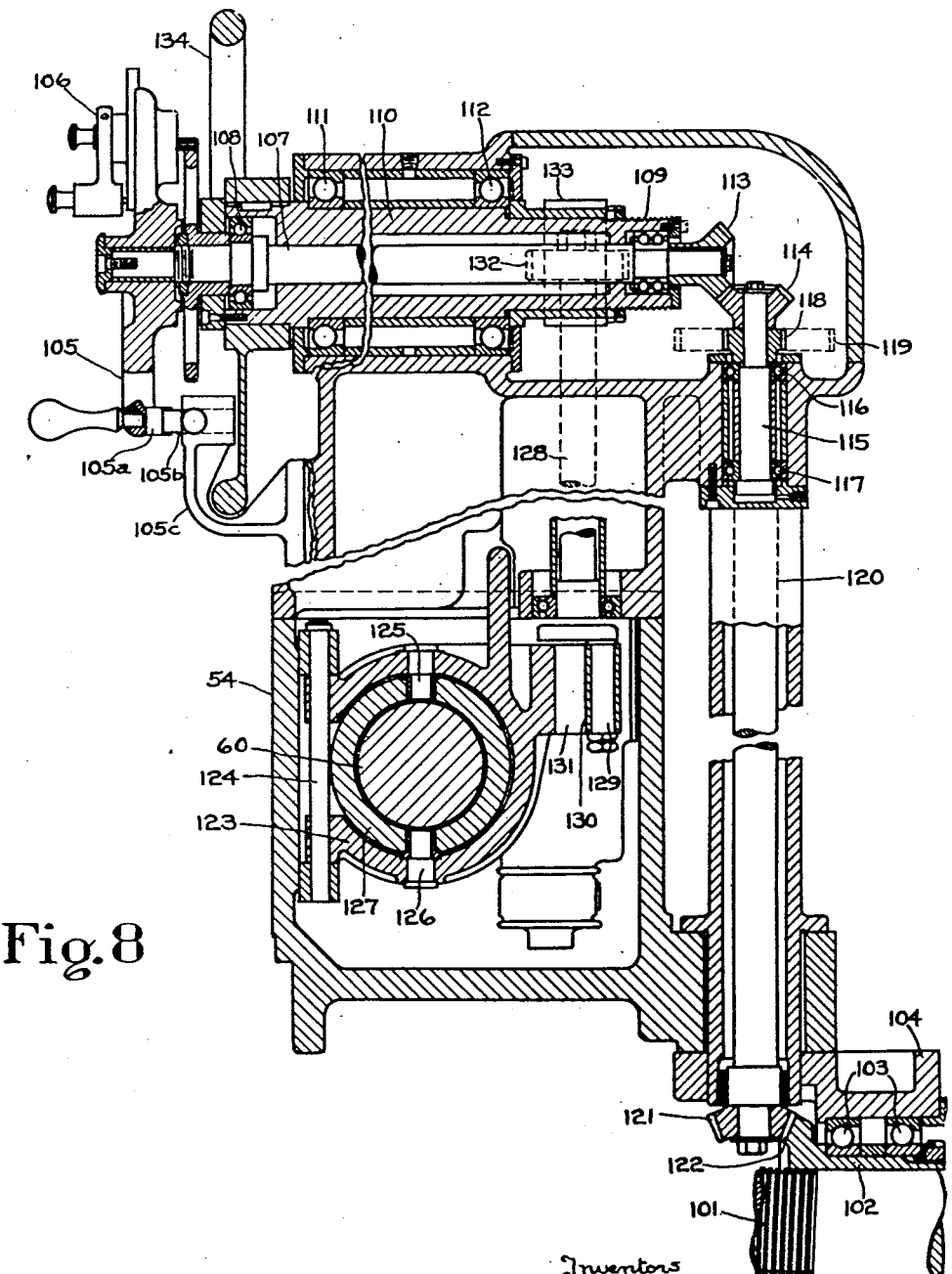
Fig. 8 is a fragmentary vertical sectional view, on an enlarged scale, taken approximately on the line 8—8 of Fig. 1, through manually operable wheel slide feeding mechanism and the wheel spindle adjusting mechanism.
Figure 13:
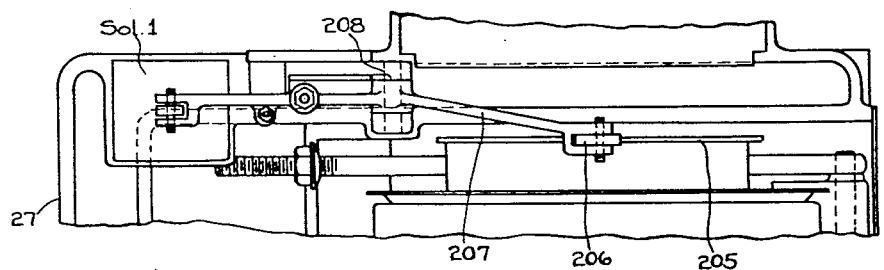
Fig. 13 is a plan view of the work stop control mechanism as shown in Fig. 12.
Figure 12:
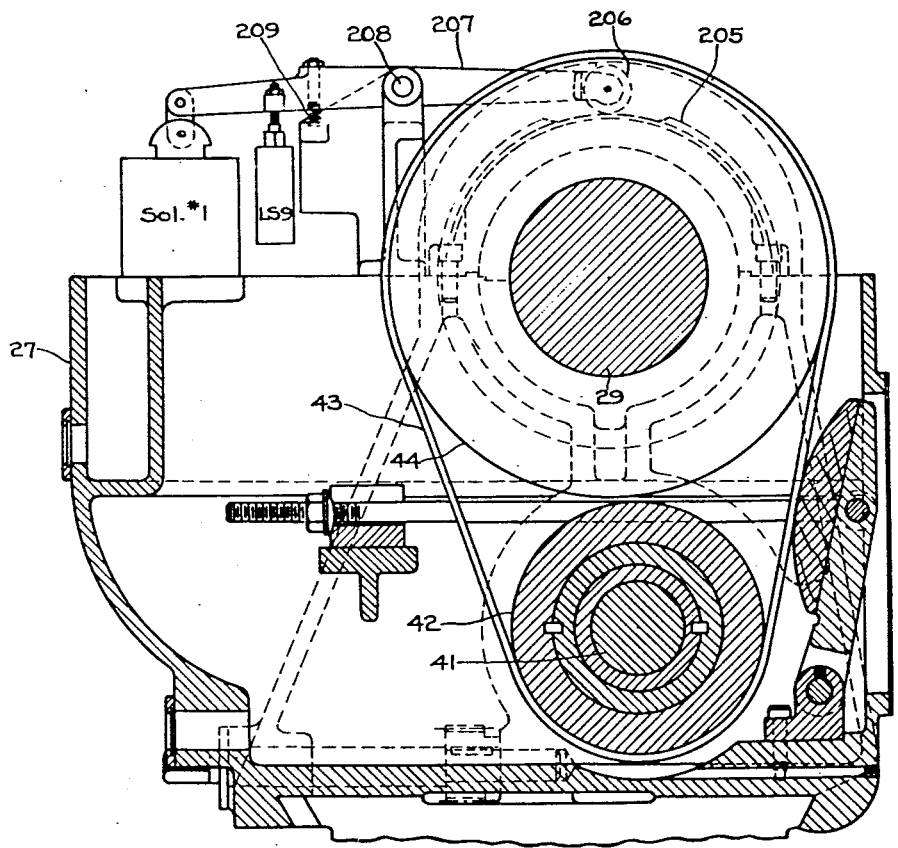
Fig. 12 is a fragmentary cross sectional view, on an enlarged scale, through left hand work head, showing the work stop control mechanism.
Figure 14:
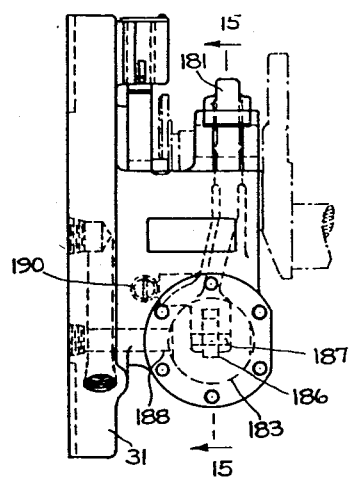
Fig. 14 is a front elevation, on an enlarged scale, of the left hand pot chuck.

Identical wheel feeding mechanisms are provided for feeding wheel slides 54 and 55 transversely to move the grinding wheels 61 and 63 respectively toward and from the crankpins to be ground. Inasmuch as these mechanisms are identical in construction and operation, it is not deemed necessary to illustrate both of the mechanisms. Consequently the feeding mechanism for the left hand grinding wheel slide 54 has been illustrated in Fig. 8. This mechanism comprises a non-rotatable feed screw 101 which meshes with or engages a rotatable nut 102. The nut 102 is journalled in suitable bearings 103 which are in turn supported in a bracket 104 which is fixed relative to the underside of the wheel slide 54. A manually operable feed wheel 105 is provided for transmitting a rotary motion to the nut 102 in a manner to be hereinafter described. A feed wheel 105 is provided with the old and well known micrometer adjusting mechanism 106. The feed wheel 105 is mounted on the forward end of a rotatable shaft 107. The shaft 107 is journalled in anti-friction bearings 108 and 109 which are supported by a rotatable sleeve 110. The sleeve 110 is in turn rotatably supported by anti-friction bearings 111 and 112. A bevel gear 113 is mounted on the right hand end of the shaft 107 and meshes with a bevel gear 114 which is mounted on the upper end of a rotatable vertically arranged shaft 115. The shaft 115 is journalled in anti-friction bearings 116 and 117. The shaft 115 is provided with a gear 118 which meshes with a gear 19 mounted on the upper end of a rotatable vertically arranged shaft 120. The lower end of the shaft 120 is provided with a bevel gear 121 which meshes with a bevel gear 122 which is formed integrally with the rotatable nut 102. It will be readily apparent from the foregoing disclosure that rotation of the feed wheel 105 will be transmitted through the mechanism above described to rotate the nut 102 and thereby transmit a transverse movement to the wheel slide 54. A suitable stop mechanism is provided for limiting the rotary motion of the feed wheel 105 precisely to position the grinding wheel. The feed wheel 105 is provided with a stop abutment 105a which is arranged in the path of a stop 105b which is supported by a bracket 105c fastened to the wheel slide 54 (Fig. 8).

Spark splitter

It is desirable in the grinding of crankpins where it is necessary to grind not only the peripheral body portion of the crankpin but also the shoulder faces adjacent to the ends of the crankpins, that a suitable spark splitting mechanism be provided whereby the wheel spindle will be moved axially within its bearings to equalize the grinding on the shoulders of the crankpin. Illustrated in the drawings a spark splitting mechanism is provided comprising a yoked member 123 which surrounds the wheel spindle 60 and is pivotally supported by means of a stud 124. The yoked member 123 is provided with diametrically opposed studs 125 and 126 which engage apertures formed in a thrust collar 127 which is carried between shoulder portions on the wheel spindle 60.

A manually operable mechanism is provided for rocking the yoked member 123 about its stud 124 comprising a vertically arranged shaft 128 which is provided at its lower end with an eccentric pin 129. The eccentric pin 129 is provided with a sleeve or collar 130 which rides in an elongated slot 131 formed in the yoked member 123. The upper end of the shaft 128 is provided with a spiral gear 132 which meshes with a spiral gear 133 mounted on the rotatable sleeve 110. A manually operable hand wheel 134 is fixedly supported on the left hand end of the rotatable sleeve 110. It will be readily apparent from the foregoing disclosure that a rotary motion of the hand wheel 134 will be transmitted through the mechanism above described to rock the yoked member 123 about its stud 124 and thereby to move the wheel spindle 60 axially within its bearings to position the grinding wheel 61. By manipulating the hand wheel 134 as the grinding wheel 61 is moved into engagement with the shoulders of a crankpin, the spark may be readily split to equalize the side grinding of the wheel 61 on the opposed shoulders of a crankpin being ground.

A similar mechanism is provided for splitting the spark when the grinding wheel 63 is moved into engagement with the shoulders of a crankpin to be ground. A manually operable feed wheel 105a is provided for adjusting the position of the wheel slide 55. This feed wheel is provided with a micrometer feed adjusting mechanism 106a. A manually operable wheel 134a is provided for moving the wheel spindle 62 axially within its bearings so as to position the grinding wheel 63 to equalize the side grinding thereof.

Hydraulic feed

An independent hydraulically operated mechanism is provided for feeding each of the wheel slides 54 and 55 toward and from the crankpin to be ground. These two mechanisms are identical in construction consequently only the left hand feed mechanism has been shown in detail (Figs. 33 and 34). A hydraulic cylinder 135 is fixedly mounted in the left hand grinding wheel carriage 50 in axial alignment with the feed screw 101. A piston 136 is slidably mounted in the cylinder 135 and is connected by means of a piston rod 137 with the feed screw 101. As shown in the diagram in Fig. 38 the piston rod 137 is formed integral with the feed screw 101. The hydraulic cylinder 135 serves to cause a rapid movement of the wheel slide 54 toward and from the crankpin being ground to position the wheel for a grinding operation and also to move the wheel rapidly to an inoperative position.

Hydraulic feed regulator

Figure 38:
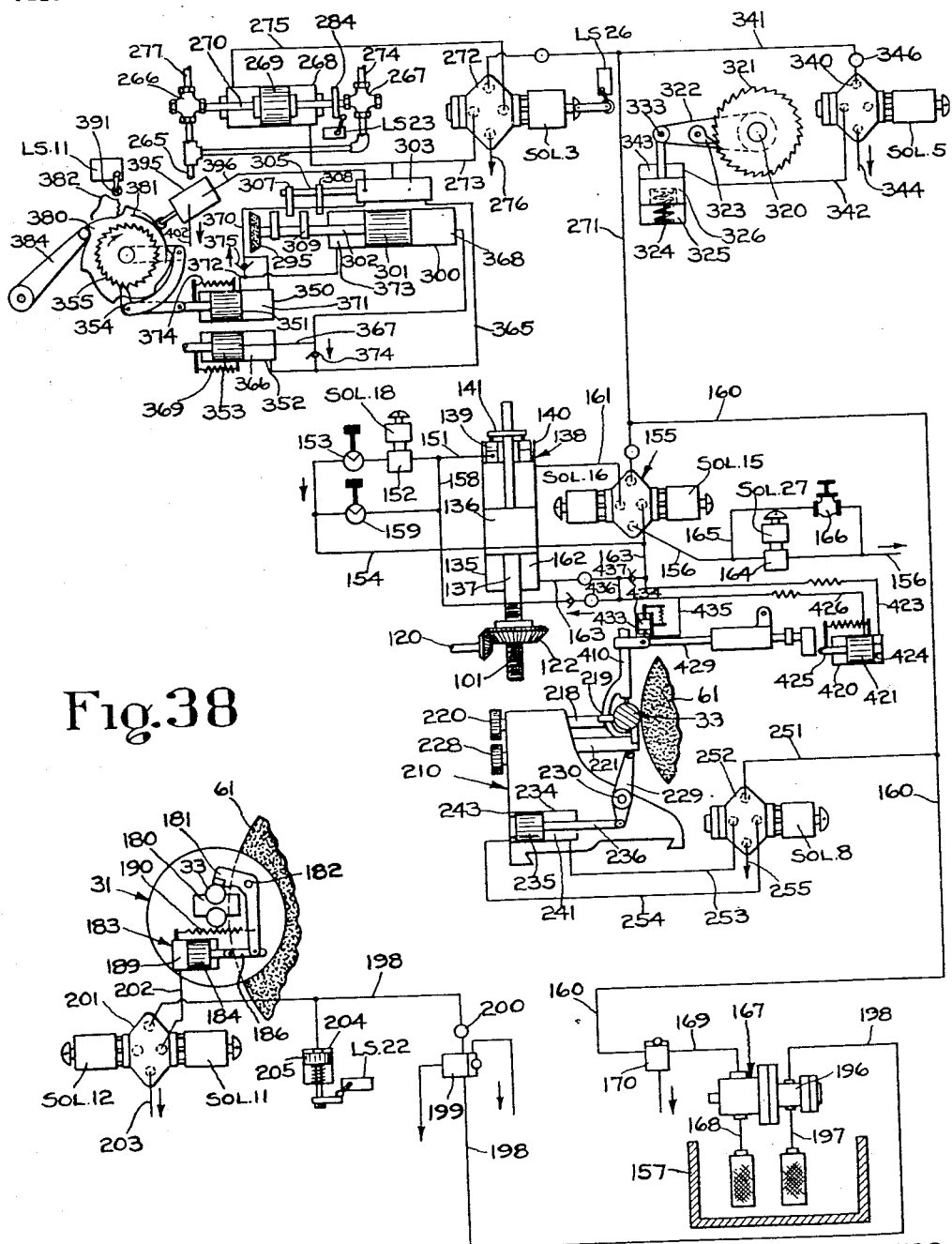
Fig. 38 is a hydraulic diagram of the left hand wheel slide and associated mechanisms.

A hydraulic feed regulator 138 is provided for retarding the rapid approaching movement of the piston 136 and the wheel slide 54. This feed regulator comprises a pair of dash pot pistons 139 and 140 which are arranged on diametrically opposite sides of the piston rod 137. A pair of compression springs 143 and 144 serve normally to maintain the pistons 139 and 140 in a rearward or inoperative position. A flanged member 141 is adjustably mounted on the piston rod 137. An adjustable collar 145 is mounted on a threaded portion 146 of the piston rod 137. When fluid under pressure is admitted to a cylinder chamber 147 to cause a rapid approaching movement of the piston 36, the piston rod will move the collar 145 rapidly toward the left (Fig. 34) until the collar 145 engages the end face 148 of the flanged member 141. Continued movement of the piston 136 will be reduced to a slower feeding movement by controlling the exhaust of fluid from dash pot cylinder chambers 149 and 150 (Fig. 34). As shown in Fig. 38 fluid exhausting from the dash pot cylinder chambers 149 and 150 passes outwardly through a pipe 151 through a normally open solenoid valve 152, through an adjustable throttle valve 153 and through a pipe 154 to a control valve 155 which will be hereinafter described. Fluid exhausting through the pipe 154 and the valve 155 then exhausts through a pipe 156 into a reservoir 157. Fluid exhausting through the pipe 151 also passes through a pipe 158, through an adjustable throttle valve 159 into the pipe 154. When the flanged member 141 engages the pistons 139 and 140 fluid may exhaust from the dash pot cylinder chambers 149 and 150 through both the throttle valve 153 and the throttle valve 154 which serve to produce a slow or shoulder grinding feed to grind the cheeks of the crankpin adjacent to the peripheral body portion of the pin. When the wheel moves into engagement with the peripheral portion of the crankpin being ground, the solenoid 18 is energized to close the solenoid valve 152 after which fluid exhausting through the pipe 151 may exhaust only through the throttle valve 159 which is set to produce the desired body grinding feed.

The control or reversing valve 155 is a solenoid type 4-way valve which is normally held in a central or inoperative position by a pair of balanced springs 155f and 155g (Fig. 53). When it is desired to cause an infeeding movement of the grinding wheel, a solenoid 15 is energized to shift the valve stem 155a toward the right (Fig. 53) so that fluid under pressure in the supply line 160 passes through the valve 155, through a pipe 161 into the cylinder chamber 147 to cause the piston 136 to move toward the left (Fig. 34) so as to cause an approaching movement of the grinding wheel 61. At the same time fluid within a cylinder chamber 162 exhausts through a pipe 163 into the control valve 155 and passes out through the exhaust pipe 156. When the solenoid 15 is deenergized the valve again assumes a neutral position. When it is desired to cause a rearward movement of the grinding wheel 61 to an inoperative position, a solenoid 16 is energized to shift the valve stem 155a toward the left (Fig. 53) so that fluid from the supply line 160 may pass through the pipe 163 into the cylinder chamber 162 to cause a rapid rearward movement of the piston 136. Valves 201 (Fig. 38), 155a and 201a (Fig. 39) are substantially identical to valve 155 and consequently have not been illustrated in detail.

It is desirable to provide a slow controlled movement of the grinding wheel 61 in either direction while truing the side faces of the grinding wheel. In the preferred construction, a solenoid valve 164 is provided in the exhaust pipe line 156. The solenoid valve 164 is a normally open valve which allows unrestricted exhaust of fluid through the pipe 156. When it is desired to provide a slow controlled traversing movement of the grinding wheel 61 during a side truing operation, a solenoid 27 is provided for closing the solenoid valve 164 thus forcing fluid to bypass through a pipe 165 (Fig. 38) through a needle valve 166 and into the exhaust pipe 156 on the other side of the solenoid valve 164. It will be readily apparent from the foregoing disclosure that by manipulation of the throttle valve 166 the traversing speed of the grinding wheel 61 may be readily controlled to produce the desired truing action.

A fluid pressure supply system is provided comprising a motor driven duplex fluid pump 167 which is arranged to draw fluid from the reservoir 157 through a pipe 168 and to force fluid under pressure through a pipe 169 and the pipe 160 to the control valve 155. An adjustable pressure relief valve 170 is interposed between the pipes 169 and 160 to allow excess fluid under pressure to exhaust directly to the reservoir 157. By regulation of the relief valve, any desired operating pressure may be obtained in the hydraulic system.

Figure 39:
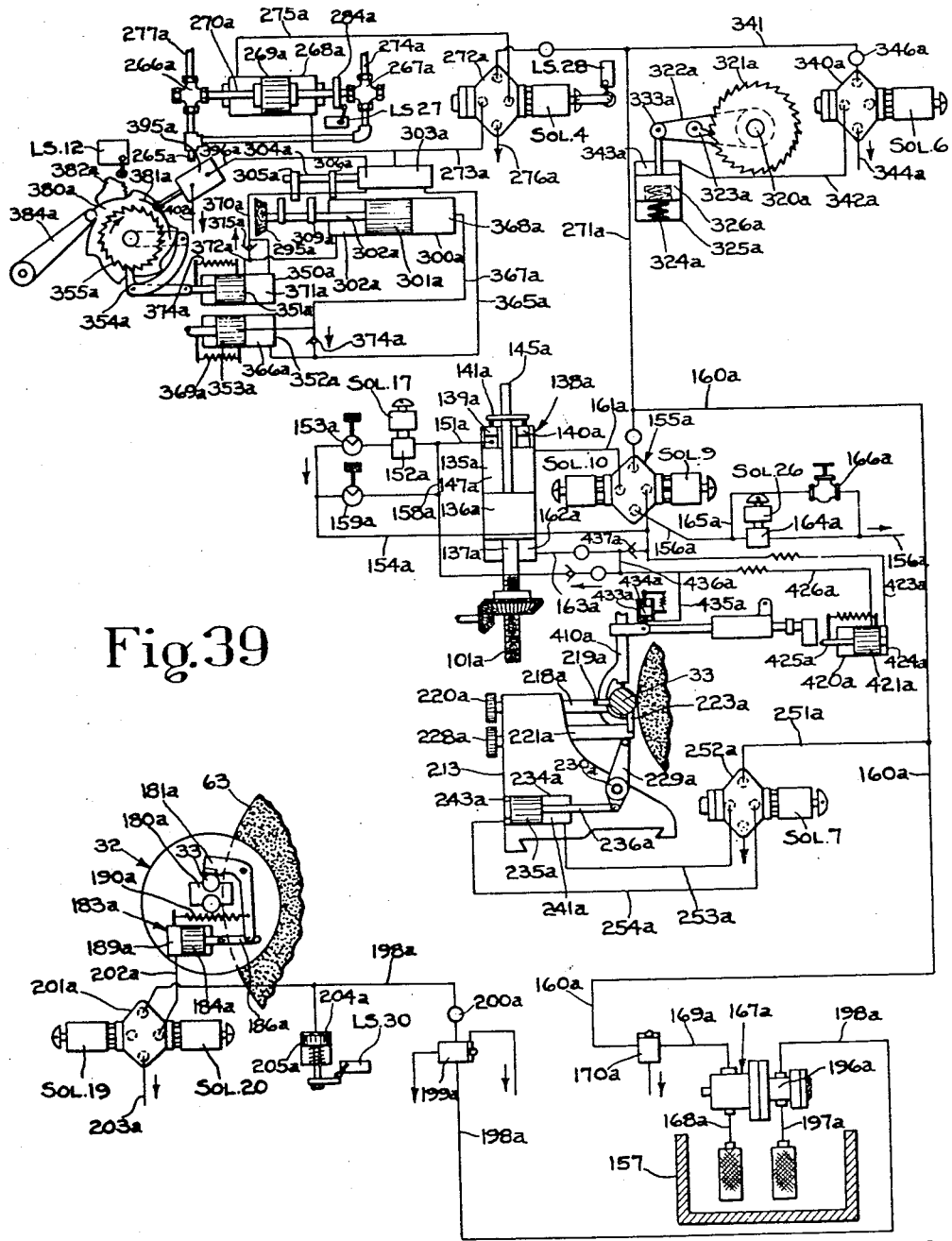
Fig. 39 is a similar hydraulic diagram of the right hand grinding wheel head and associated mechanism.

A similar feed control mechanism is provided for the right hand wheel head as shown diametrically in Fig. 39. This mechanism comprises a cylinder 135a which contains a slidably mounted piston 136a. A piston rod 137a is connected to or formed integral with the feed screw 101a. A dash pot feed regulator 138a is provided containing dash pot pistons 139a and 140a. A flanged collar 141a is carried by the piston rod 137a. An adjustable collar 145a is adjustably mounted on the rearwardly extending portion of the piston rod 137a. When fluid is admitted through a pipe 161a into a cylinder chamber 147a, the piston 136a will be moved in a vertical direction to cause an approaching movement of the grinding wheel. As the grinding wheel approaches the cheeks or shoulders of the crankpin to be ground, the collar 145a engages the flanged member 141a to move the dash pot pistons 139a and 140a which exhaust fluid through a pipe 151a, through a solenoid valve 152a, through an adjustable throttle valve 153a. Fluid exhausting from the dash pots also may exhaust through a pipe 158a and an adjustable throttle valve 159a. As the grinding wheel approaches the peripheral or body portion of the crankpin to be ground, a solenoid 17 is energized to close the solenoid valve 152a thus requiring all fluid exhausting from the dash pot cylinders to pass through the throttle valve 159a which is set to produce the desired body feed. Fluid exhausting through the throttle valves 153a and 159a passes through an exhaust pipe 154a to a solenoid actuated control valve 155a. Fluid under pressure is supplied by a motor driven duplex fluid pump 167a which draws fluid from a reservoir 157 through a pipe 168a and passes fluid under pressure through a pipe 169a and a pipe 160a to the control valve 155a. An adjustable pressure relief valve 170a is connected between the pipes 160a and 169a to facilitate the exhaust of excess fluid under pressure from the system. When it is desired to cause an approaching movement of the grinding wheel, a solenoid 9 is energized to position the valve 155a so that fluid from the pipe 160a passes through the pipe 161a into the cylinder chamber 147a During the forward movement of the grinding wheel 63, fluid within a cylinder chamber 162a exhausts out through a pipe 163a, through the control valve 155a and out through an exhaust pipe 156a.

A similar control for a side truing operation on the grinding wheel 63 is provided. This mechanism comprises a normally open solenoid valve 164a in the pipe line 156a. A pipe 165a and a throttle valve 166a bypasses around the solenoid valve 164a. When it is desired to move the grinding wheel 63 and its supporting slide 55 at a truing speed for truing the side faces thereof, a solenoid 26 is energized to close the solenoid valve 164a thus forcing fluid exhausting through the pipe 156a to pass through the throttle valve 166a which is adjusted to provide the desired truing speed to the wheel slide 55.

A positive stop is provided positively to limit the infeeding movement of each of the grinding wheel slides 54 and 55. A positive stop collar 171 is adjustably mounted on the sleeve of the flange 141 and is arranged to engage the end face of the dash pot cylinder head when the wheel slide 54 reaches a predetermined position thereby to prevent further advancing movement of the slide. A similar positive stop collar 171a is adjustably mounted on the sleeve of the flange 141a which is arranged to engage the end face of the cylinder cap for the dash pot feed control unit 138a when the wheel slide 55 reaches a predetermined position to prevent further advancing movement thereof.

Limit switches—Wheel slide

A plurality of limit switches are actuated by and in timed relationship with the movement of each of the wheel slides which are connected to interlock various mechanisms of the machine. As illustrated in Fig. 34 an arm 172 is mounted on the right hand end of the threaded portion 146 of the piston rod 137. A slide bar 173 is fastened to the upper end of the arm 172. The slide bar 173 is slidably supported in a bracket 174 which is fixedly mounted on the dash pot feed regulator unit 138. When the piston rod 137 moves either toward the right or toward the left, the arm 172 will transmit a corresponding movement to the slide bar 173. The slide bar 173 serves as a support for a pair of adjustably mounted cams 175 and 176. The cam 175 is arranged in the path of the actuating roller of the limit switch LS39. The cam 176 is arranged in the path of the actuating roller of the limit switch LS2. A limit switch LS25 is mounted on the end cap of the dash pot feed regulator unit 138. The positive stop collar 171 is provided with a bracket 177 having an adjustably mounted actuating screw 178 which is arranged in the path of the limit switch LS25 so that when the piston rod 137 moves toward the left (Fig. 34) the actuating screw 178 will engage and actuate the limit switch LS25. The function and operation of the limit switches LS2, LS25 and LS39 will be more fully described hereinafter.

Similarly an arm 172a is mounted on the upper end of the threaded portion 146a of the other piston rod (Fig. 33). The end of the arm 172a is fastened to a slide bar 173a which is slidably supported in a bracket 174a. The bracket 174a is fixedly mounted to the dash pot feed regulator 138a. The slide bar 173a serves as a support for a pair of adjustably mounted cam bars 175a and 176a. The cam bar 175a is arranged in the path of the actuating roller of the limit switch LS38. The cam bar 176a is arranged in the path of the actuating roller of the limit switch LS3.

A limit switch LS24 is mounted on the end cap of the feed regulator 138a. The stop collar 171a is provided with a bracket 177a which carries an adjustable actuating screw 178a. The actuating screw 178a is arranged in the path of the limit switch LS24.

The wheel slide 54 is provided with a cam plate 179 which is arranged to actuate a limit switch LS33 when the wheel slide 54 is moved to its extreme rearward position. Similarly the wheel slide 55 is provided with a cam plate 179a which is arranged to actuate a limit switch LS32 when the wheel slide 55 is moved to its extreme rearward position. The limit switches LS33 and LS32 are interconnected in a manner to be hereinafter described.

Pot chucks

Figure 15:
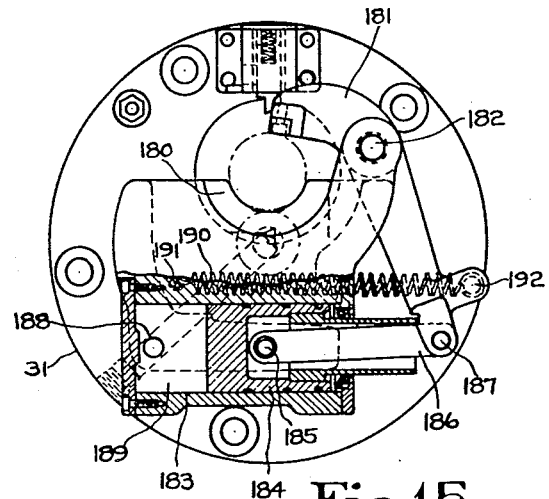
Fig. 15 is a sectional view, through the left hand pot chuck, taken approximately on the line 15—15 of Fig. 14.

The pot chuck 31 which is supported on the work spindle 29 is provided with a crankshaft supporting shoe 180. A clamping jaw 181 is pivotally mounted on a stud 182. The jaw 181 is preferably actuated by a hydraulically operated mechanism comprising a cylinder 183. A piston 184 is slidably mounted in the cylinder 183. The piston 184 is connected by a stud 185 with a connecting rod 186. The other end of the rod 186 is connected by a stud 187 with the clamping jaw 181. When fluid under pressure is passed through a port 188 into a cylinder chamber 189, the piston 184 will be moved toward the right (Fig. 15) to swing the clamping jaw 181 in a counterclockwise direction to lock a crankshaft 33 in rigid engagement with the supporting shoe 180.

In order to release the clamping jaw when pressure is cut off from the cylinder chamber 189, a tension spring 190 is provided which is connected between a stud 191 carried by the pot chuck 31 and a stud 192 mounted on the clamping jaw 181. It will be readily apparent that as soon as the pressure is cut off from the cylinder chamber 189, the released tension of the spring 190 will move the clamping jaw 181 in a clockwise direction to release the crankshaft 33.

Figure 17:
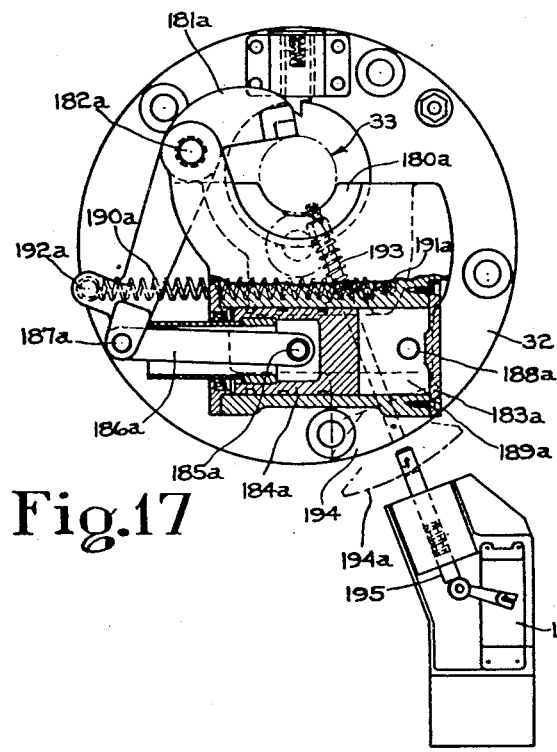
Fig. 17 is a sectional view through the right hand pot chuck, taken approximately on the line 17—17 of Fig. 16, showing the interlock switch which is actuated when the side truing bar is in an operative position.
Figure 16:
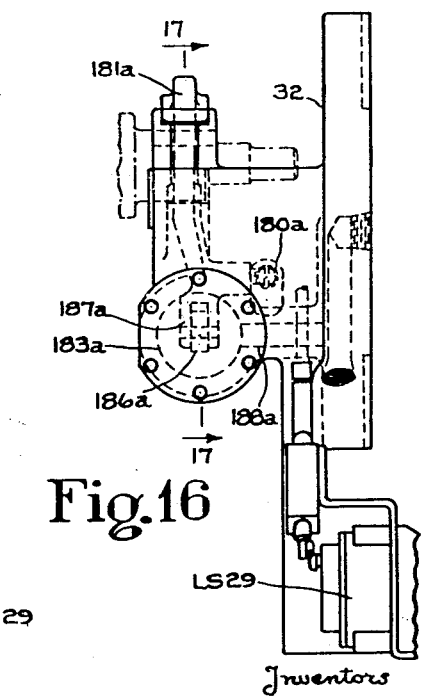
Fig. 16 is a front elevation, on an enlarged scale, of the right hand pot chuck.

The pot chuck 32 carried by the right hand work spindle 30 is substantially identical in construction. This pot chuck as shown in Figs. 16 and 17 comprises a crankshaft supporting shoe 180a. A clamping jaw 181a is pivotally supported on a stud 182a. A hydraulic mechanism is provided for actuating the clamping jaw 181a comprising a cylinder 183a which contains a slidably mounted piston 184a. The piston 184a is connected by a stud 185a with the right hand end of a connecting rod 186a (Fig. 17). The other end of the rod 186a is connected by a stud 187a with a clamping jaw 181a. When fluid under pressure is admitted through a port 188a into a cylinder chamber 189a, the piston 184a will be moved toward the left (Fig. 17) to move the clamping jaw 181a in a clockwise direction to clamp the right hand end of the crankshaft 33 rigidly in the pot chuck 32.

A tension spring 190a is connected between a stud 191a on the cylinder 183a and a stud 192a on the clamping jaw 181a. When pressure is cut off from the port 188a, the released tension of the spring 190a will swing the clamping jaw 181a in a counterclockwise direction to release the crankshaft 33 after a grinding operation has been completed.

It is desirable to provide a suitable interlock so that the pot chucks 31 and 32 cannot be rotated during a side truing operation on the grinding wheels 61 and 63 respectively. The right hand pot chuck 32 is provided with a slidably mounted rod 193 having a shoe 194 mounted on its outer end. The shoe 194 is normally maintained in a cut out portion of the periphery of the chuck 32. A compression spring surrounding the rod 193 serves normally to maintain the shoe 194 in the position illustrated in full lines in Fig. 17. When a side truing bar is inserted into the pot chucks a projection on the side truing bar engages the upper end of the slide rod 193 and moves it downwardly (Fig. 17) so that the shoe 194 assumes the dotted line position 194a. During this movement the shoe 194a moves a spring pressed plunger 195 downwardly to actuate a limit switch LS29. The spring pressed plunger 195 of the limit switch LS29 is carried by the right hand work head 28. The limit switch LS29 is connected in a manner to be hereinafter described to prevent starting of the work drive motor 36 while the side truing bar is in an operative position.

*Fluid pressure actuation—Left hand pot chuck*

A smaller pump 196 of the duplex pump 167 draws fluid through a pipe 197 from the reservoir 157 and passes fluid under pressure through a pipe 198. A pressure relief valve 199 is connected in the pipe line 198 (Fig. 38) by means of which excess fluid under pressure may be exhausted directly to the reservoir 157. A throttle valve 200 is connected in the pipe line 198 to control the amount of fluid passing therethrough. The pipe 198 is connected to a solenoid actuated valve 201. The valve 201 is a standard commercial valve of the type which is normally held in a central or neutral position by balanced springs. The valve 201 is actuated by means of solenoids Sol. 12 and Sol. 11. When it is desired to clamp a crankshaft in the pot chuck 31, the solenoid Sol. 12 is energized to shift the valve 201 so that fluid from the pipe 198 passes through a pipe 202 into the cylinder chamber 198 to actuate the clamping jaw 181 so as to clamp crankshaft 33 in the pot chuck 31. When it is desired to release the clamping jaw 181, the solenoid Sol. 11 is energized to shift the valve 201 so that fluid under pressure from the pipe 198 will exhaust through the pipe 203 thereby releasing the tension of the spring 90 to unclamp the jaw 181.

A pressure actuated switch comprising a cylinder 204 and a slidably mounted piston 205 is connected in the pipe line 198. The movement of the piston 205 is arranged to actuate a limit switch LS22. The limit switch LS22 is operatively connected so that when the pressure in the clamping cylinder 183 reaches a predetermined safe operating pressure, the work may be rotated. Similarly if the pressure within the clamping cylinder fails, the limit switch LS22 will be actuated to stop the work rotation before the crankshaft may be unclamped.

*Fluid pressure actuation—Right hand pot chuck*

Similarly a small pump 196a which is part of the duplex pump unit 167a draws fluid through a pipe 197a from reservoir 157a and passes fluid under pressure through a pipe 198a. A pressure relief valve 199a is connected in the pipe line 198a by means of which excess fluid under pressure may be exhausted directly to the reservoir 157a. A throttle valve 200a is also provided in the pipe line 198a to regulate the fluid passing through the pipe 198a. The pipe 198a is connected to a solenoid actuated control valve 201a which is actuated by solenoids Sol. 19 and Sol. 20. When it is desired to clamp the right hand end of the crankshaft 33 in the pot chuck 32, the solenoid Sol. 19 is energized so that fluid passing through the pipe 198a will pass through a pipe 202a into the cylinder chamber 198a to actuate the clamping jaw 181a to clamp the right hand end of the crankshaft 33 in the pot chuck 32. When it is desired to release the clamping jaw 181a, the solenoid Sol. 20 is energized so that fluid from the pipe 198a will exhaust directly through a pipe 203a into the reservoir 157a, thus releasing the tension of the spring 190a to release the clamping jaw 181a.

A pressure actuated switch is provided in the pipe line 198a comprising a cylinder 204a and a piston 205a which is arranged to actuate a limit switch LS30. The pressure switch LS30 is arranged so that the work drive motor can not be started until the pressure in the right hand clamping cylinder has reached a safe operating pressure. If for any reason the pressure within the clamping cylinder 183a fails, the pressure switch will actuate LS30 to stop the work drive motor before the clamping jaw 181 releases.

*Work stop control mechanism*

It is desirable to provide a suitable work stop control mechanism automatically to stop the pot chucks 31 and 32 in an upright position to facilitate loading crankshafts therein. This mechanism may comprise a cam 205 which is mounted on the left hand work head spindle 29. A follower roller 206 is mounted on one end of a rock arm 207. The rock arm 207 is supported by a stud 208 which is fixedly mounted on the work head 27. A compression spring 209 serves normally to urge the rock arm 207 in a clockwise direction so as normally to maintain the roller 206 in engagement with the cam 205.

A solenoid Sol. 1 is energized during a grinding operation normally to rock the rock arm 207 is a counterclockwise direction to maintain the follower roller 206 out of engagement with the cam 205. When it is desired to stop the rotation of the crankshaft after a grinding operation has been completed, the solenoid Sol. 1 is deenergized thereby allowing the released compression of the spring 209 to rock the roller 206 into operative engagement with the cam 205. Unless the pot chucks 31 and 32 are in an upright position, the roller 206 will engage the peripheral surface on the cam 205 in which position rotation of the work spindles will continue until the roller 206 engages the low point on the cam 205. When the roller 206 rocks into this position, the limit switch LS9 will be actuated to stop the rotation of the work drive motor 36. It will be readily apparent from the foregoing disclosure that the work supporting pot chucks 31 and 32 may be stopped only in an upright position.

*Steadyrests*

Figure 1:
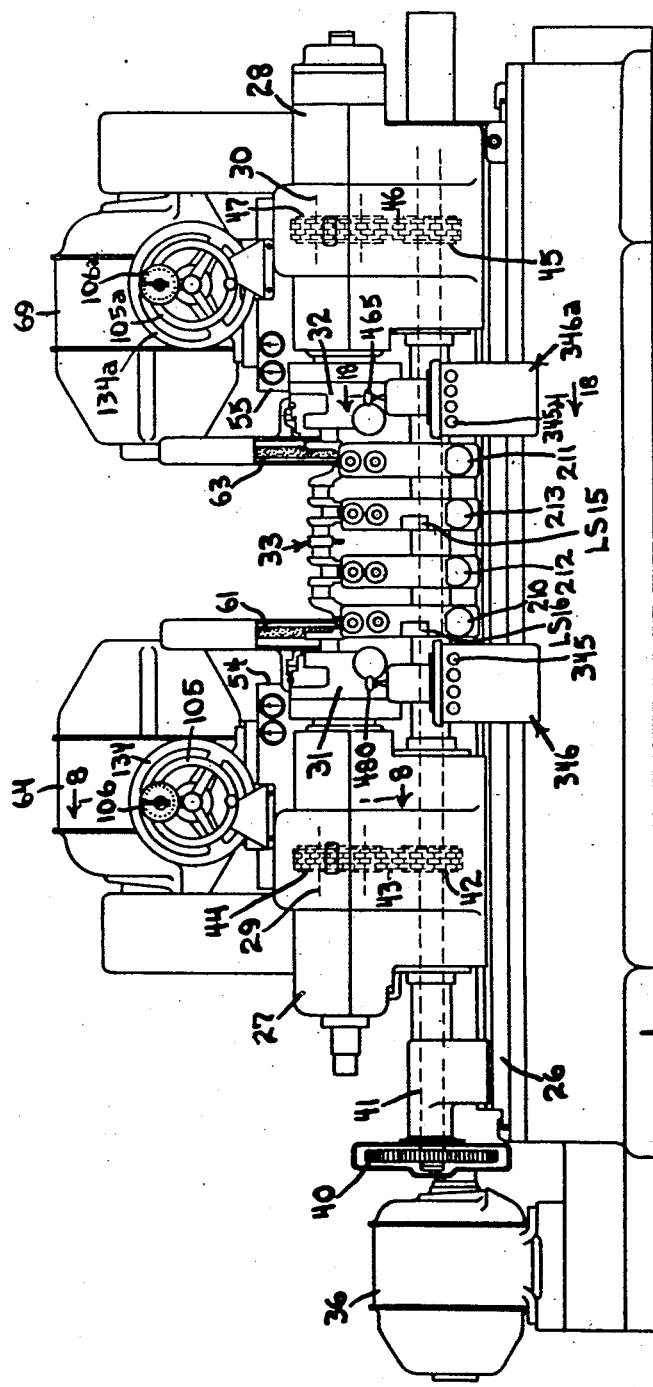

In grinding crankpins of a crankshaft it is essential to provide suitable steadyrest supports to support and steady the crankpin being ground. In the present machine pairs of aligned pins are simultaneously ground after which the wheels are indexed to position them for grinding a second pair of aligned crankpins. It is therefore desirable to provide a plurality of steadyrests which are arranged simultaneously to support successive pairs of crankpins being ground. As illustrated in Fig. 1 of the drawings, a plurality of steadyrests 210, 211, 212 and 213 are provided.

The steadyrests 210 and 211 being arranged to support and steady the outer pair of pins of the crankshaft 33 and the steadyrests 212 and 213 are arranged to support and steady the aligned inner pair of pins on the crankshaft 33. These steadyrests are substantially identical in construction consequently only one of the steadyrests has been illustrated in detail in Fig. 4.

Figure 4:
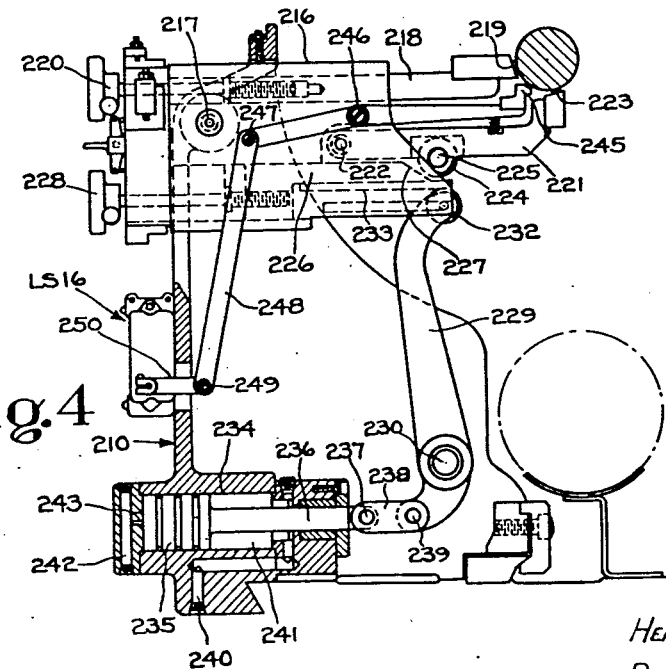
Fig. 4 is a side elevation, on an enlarged scale, partly broken away and shown in section of one of the steadyrests.

It is desirable to arrange the steadyrests so that the steadyrests may be moved to an inoperative position to facilitate rotary indexing of the crankshaft. As illustrated in Fig. 4 the steadyrest 210 comprises a pivotally mounted frame 216 which is supported on a stud 217 carried by the steadyrest 210. A shoe supporting slide 218 is slidably mounted within the frame 216 and carries a work steadying shoe 219 which is arranged to engage the crankpin in a horizontal plane passing through the axis of the pin being ground. An adjusting screw 220 is provided to facilitate adjusting the slide 218 and shoe 219 toward and from the work axis to facilitate feeding the shoe and maintaining it in steadying engagement with the crankpin as the crankpin is being ground.

The frame 216 also supports a pivotally mounted arm 221 on a stud 222. The arm 221 supports a work steadying shoe 223 which is arranged to engage the lower portion of the crankpin being ground. To facilitate adjustment of the lower shoe 223, a roller 224 is supported by a stud 225 on the arm 221. A transversely adjustable slide 226 carried by the steadyrest frame 216 is provided with a cam 227 which is arranged in the path of the roller 224. An adjusting screw 228 is provided to facilitate adjusting the slide 226 and cam 227 so as to raise and lower the steadyrest shoe 223 when desired. It will be readily apparent from the foregoing disclosure that by manipulation of the adjusting screws 220 and 228 the work steadying shoes 219 and 223 respectively may be maintained in supporting engagement with the crankpin being ground during the grinding operation. In the preferred construction, the adjusting screws 220 and 228 are automatically actuated, automatically to maintain the shoes in supporting engagement with the crankpin being ground. This feature is not considered part of the present invention and consequently has not been shown in detail. The details of the steadyrest are more fully disclosed and described in the pending United States patent application, Serial No. 583,187, filed March 17, 1945, which issued as U. S. Patent No. 2,419,170, dated April 15, 1947, to which reference may be had for details of disclosure not contained herein.

A suitable mechanism is provided for swinging the steadyrest frame to and from an operative position comprising an actuating arm 229 which is pivotally supported by a stud 230 on the frame of the steadyrest 216. The arm 229 is provided with a roller 232 which engages a plane surface 233 on the frame 216.

A hydraulically operated mechanism is provided for actuating the arm 229. This mechanism comprises a hydraulic cylinder 234 which contains a slidably mounted piston 235. A piston rod 236 is formed integral with the piston 235 and is connected by means of a stud 237 with a link 238. The link 238 is connected by a stud 239 with the lower end of the arm 229. When it is desired to move the steadyrest frame to an operative position, fluid under pressure is passed through a passage 240 into a cylinder chamber 241 to move the piston 235 toward the left. This movement transmits a clockwise movement to the arm 229 to swing it into the position illustrated in Fig. 4. When it is desired to move the frame 216 and steadyrest shoes 219 and 223 to an inoperative position, fluid under pressure is passed through a passage 242 into a cylinder chamber 243 to move the piston 235 toward the right (Fig. 4). This movement of the piston 235 serves to move the arm 229 in a counterclockwise direction which allows the steadyrest frame 216 to swing downwardly in a clockwise direction to move the frame 216 and work steadying shoes 219 and 223 to an inoperative position so as to facilitate a rotary indexing movement of the crankshaft being ground.

The steadyrests 210 and 211 are operatively connected so that fluid under pressure is simultaneously admitted to move the shoes of each steadyrest simultaneously to an operative or inoperative position. Similarly the pair of steadyrests 212 and 213 are arranged to be moved simultaneously to and from an operative position.

It is desirable to provide a suitable interlock mechanism to prevent a forward feeding movement of the grinding wheels 61 and 63 unless the crankshaft 33 is indexed to its proper position and the steadyrest shoes have been moved to an operative position. A suitable interlock control mechanism is provided for one steadyrest of each pair, namely for the steadyrests 210 and 213. As illustrated in Fig. 4 a work engaging feeler arm 245 is pivotally mounted on a stud 246 carried by the steadyrest frame 216. The arm 245 is connected at its other end by means of a stud 247 with a link 248. The lower end of the link 248 is connected by a stud 249 with an actuating arm 250 of a limit switch 16. When the crankpin is in proper position for grinding and the steadyrest frame is in an operative position, the feeler arm will engage the periphery of the crankpin and through the mechanism above described actuate the limit switch LS16 which is interconnected in a manner to be hereinafter described to allow forward movement of the wheel slides.

The steadyrest 213 is provided with an identical feeler mechanism which has not been illustrated since it is identical with that shown in Fig. 4 in connection with the steadyrest 210. The steadyrest 213 supports a limit switch LS15 which is similarly connected to prevent an infeeding movement of the grinding wheels 61 and 63 unless the crank shaft 33 is in a predetermined indexed position and the steadyrest frame is also in an operative position.

In order to supply fluid under pressure for actuating the steadyrest 210, a pipe 251 is connected between the pipe 160 and a solenoid actuated control valve 252. The valve 252 is a piston type valve (Fig' 54) comprising a valve stem 252a having valve pistons 252b, 252c and 252d formed integrally therewith. A compression spring 252e serves normally to maintain the valve stem 252a in its right hand end position. A solenoid Sol. 1 serves when energized to shift the valve stem 252a into its left hand end position. A pipe 253 connects the control valve 252 with the cylinder chamber 241. A pipe 254 connects the control valve 252 with the cylinder chamber 243. When the solenoid Sol. 8 is energized, the control valve 252 is shifted to a left hand position so that fluid under pressure from the pipe 160 passes through the pipe 251, through the valve 252, through the pipe 253 into the cylinder chamber 241 to actuate the arm 229 and swing the steadyrest frame 216 to an operative position (Figs. 4 and 38). When the solenoid Sol. 8 is deenergized, fluid under pressure from the pipe 251 passes through the valve 252, through the pipe 254 into the cylinder chamber 243 to swing the arm 229 and thereby allow the steadyrest frame 216 to swing downwardly in a clockwise direction to an inoperative position. During this movement, fluid may exhaust from the cylinder chamber 241, through the pipe 253, through the valve 252 and through exhaust pipe 255 to the reservoir 157.

The control valve 252 is arranged to simultaneously control the admission to and exhaust of fluid from the cylinder 234 on the steadyrest 210 and also to a cylinder (not shown) on the steadyrest 211.

A similar hydraulic control is provided for the steadyrests 212 and 213. This mechanism has been diagrammatically illustrated in Fig. 39. The steadyrest 213 is provided with a pair of work steadying shoes 219a and 223a which are carried by members 218a and 221a. The steadyrest shoes 219a and 223a are arranged to be moved to and from an operative position by means of adjusting screws 220a and 228a. These mechanisms are identical with that more fully described in connection with steadyrest 210 and shown in Fig. 4. Fluid under pressure passing through the pipe 160a also passes through a pipe 251a to a control valve 252a which is actuated by means of a solenoid Sol 7. When the solenoid Sol. 7 is energized, the valve 252a is shifted so that fluid under pressure passing therethrough may pass through a pipe 253a into a cylinder chamber 241a in the cylinder 234a to move the piston 235a toward the left (Fig. 39) to swing the arm 229a so as to move the steadyrest frame to an operative position. Similarly when the solenoid Sol. 7 is deenergized, fluid passing through the valve 252a passes through a pipe 254a into a cylinder chamber 243a to move the piston 235a toward the right which serves to swing the arm 229a in a counterclockwise direction and thereby allow the steadyrest shoes 219a and 223a to swing downwardly in a clockwise direction to an inoperative position.

*Coolant supply system left hand wheel unit*

Figure 3:
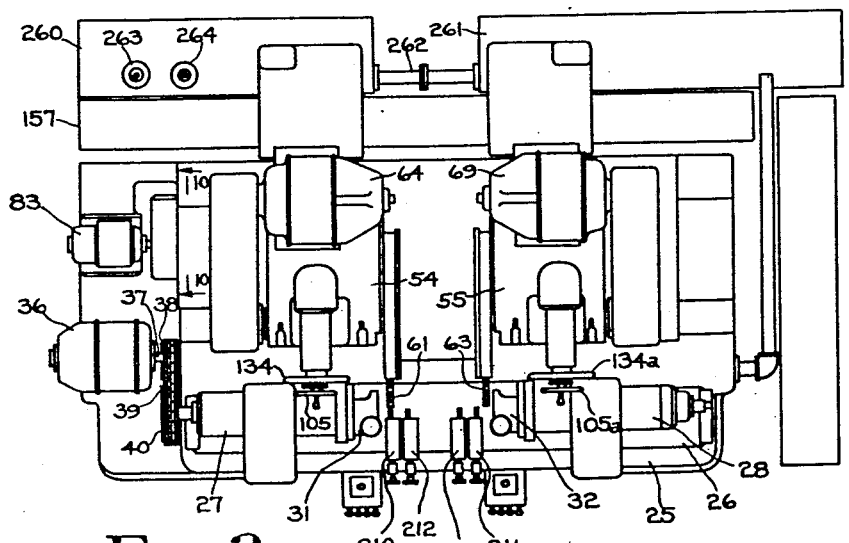
Fig. 3 is a fragmentary plan view, on a reduced scale, of the improved grinding machine.

A suitable coolant supply system is provided for conveying the coolant or cutting fluid to the grinding wheels during a grinding operation and also to the truing tools during a truing operation. This mechanism may comprise a fluid supply tank which as illustrated in Fig. 3 comprises two spaced tanks or reservoirs 260 and 261 which are interconnected by means of a pipe 262. A motor driven coolant pump 263 is provided for supplying coolant fluid to the left hand wheel unit 54 and a similar motor driven coolant pump unit 264 is provided for supplying coolant fluid to the grinding wheel slide unit 55. Both of the coolant pump units 263 and 264 are arranged to pump fluid from the reservoir 260. The coolant fluid which is returned from the grinding machine is conveyed to the tank or reservoir 261 which overflows through pipe 262 into the tank 260. By providing a separate tank for the return fluid, heat generated during the grinding operation will be dissipated before the coolant fluid is again pumped back to the wheel slide unit.

Coolant fluid from the pump unit 263 passes through a pipe 265 to a gate type valve 266 and also to a gate valve 267. The valve stems of the valves 267 and 268 are either formed integral with or are operatively connected to a piston rod 270 which is connected to a piston 269 slidably supported within a hydraulic cylinder 268. When the piston 269 is moved in one direction, one of the valves will be opened and the other valve closed. A suitable control valve 272 is provided which is actuated by a solenoid Sol. 3. Fluid under pressure passing through the pipe 160 passes through a pipe 271 to the control valve 272. In the position of the valve 272 when solenoid Sol. 3 is deenergized, fluid is passed through a pipe 275 to move the piston 269 toward the right (Fig. 38) to close the valve 267 and to open the valve 266 which allows coolant fluid passing through the pipe 265 to pass through a pipe 277 to pass through a flexible hose 279 (Fig. 9) and a nozzle 280 to convey coolant fluid to the grinding wheel 63 adjacent to the line of contact between the wheel 61 and the crankpin being ground. In case of a side truing operation, coolant fluid passing through the pipe 277 may also be passed through a control valve 281, through a flexible pipe 282 and a nozzle 283 to the side face of the grinding wheel 61.

When it is desired to true the periphery of the grinding wheel, the solenoid Sol. 3 is energized to shift the valve 272 so that fluid under pressure will be passed through a pipe 273 to move the valve piston 269 toward the left (Fig. 38). This movement of the piston 269 serves to close the valve 266 and to open the valve 267 so that coolant fluid will be passed through a pipe 274 to the point of contact between the grinding wheel and a peripheral truing tool to be hereinafter described. A limit switch LS26 is actuated by the solenoid Sol. 3. Limit switch will be more fully described hereinafter.

*Coolant fluid system right hand wheel unit*

A similar coolant supply system is provided for the right hand grinding wheel unit. Coolant fluid from the coolant pump unit 264 (Fig. 3) is conveyed through a pipe 265a (Fig. 39) to the control valves 266a and 267a. The control valve 266a serves to control the passage of fluid to a pipe 277a which conveys fluid to the right hand grinding wheel unit. The control valve 267a serves to control the passage of coolant fluid through a pipe 274a to the right hand wheel unit truing apparatus. A cylinder 268a and piston 269a are provided having a piston rod 270a connected to simultaneously actuate both the valve 266a and 267a. Fluid under pressure from the pipe 160a passes through a pipe 271a to a solenoid actuated control valve 272a. In the position of the control valve 272a (that is with the solenoid Sol. 4 deenergized) fluid under pressure passes through a pipe 275a to move the piston 269a toward the right (Fig. 39) to close the valve 267a and to open the valve 266a so as to convey coolant fluid through the pipe 277a to the right hand grinding wheel unit during a grinding operation.

When the solenoid Sol. 4 is energized, fluid under pressure is passed from the control valve 272a through a pipe 273a to move the piston 269a toward the left (Fig. 39) to close the valve 266a and to open the valve 267a so that coolant fluid may pass through the pipe 274a to supply coolant fluid to the peripheral dressing apparatus for the grinding wheel 63 to be hereinafter described. A limit switch LS28 is actuated by the solenoid Sol. 4. This limit switch and its connections will be hereinafter described.

A limit switch LS23 is actuated by a flanged member 284 which is carried by the piston rod 270. Similarly a limit switch LS27 is actuated by a flanged member 284a carried by the piston rod 270a. The function of the limit switches LS23 and LS27 will be hereinafter described.

*Left hand wheel head peripheral truing apparatus*

A built-in wheel truing apparatus is provided for truing the peripheral surface of each of the grinding wheels. The wheel truing apparatus comprises a truing tool which is reciprocated automatically across the face of the grinding wheel for a predetermined number of passes and is automatically fed in between passes. On the last two or three strokes the traversing speed is preferably slowed down to produce the desired surface on the periphery of the wheel. This mechanism is suitably interlocked in a manner to be hereinafter described with the other mechanisms of the machine so that the truing operation may take place only when the grinding wheels are located in an extreme rearward position and the wheels are indexed longitudinally to a point beyond the normal outer pin grinding position. The truing apparatus is also interlocked with the wheel indexing mechanism and the wheel feeding mechanism so that neither of these mechanisms may be set in motion during a wheel truing operation.

A left hand wheel truing apparatus 290 (Fig. 26) is mounted on a rear portion of the wheel slide 54. The wheel slide 54 is provided with a slide way 291 which is arranged parallel with the V-way 56 and flat way 57. A wheel truing slide 292 is mounted to move on the slide way 291. The slide 292 supports a cylindrically shaped slide 293 which is arranged to move in a direction parallel with the grinding wheel axis. The cylindrical slide 293 supports a truing tool head 294 which carries a rotatable bonded abrasive truing tool 295. Support for the truing tool 295 is preferably provided with a cylindrically shaped support 310 to facilitate tilting the truing tool 295 as and when desired. A pair of adjusting screws 311 and 312 are provided on the head 294 to facilitate swivelling or tilting the truing tool 295 as desired.

The cylindrical slide 293 is supported by two sets of spaced symmetrically arranged rollers 296 and 297. One set of rollers 296 being located adjacent to the left hand end of the slide 293 (Fig. 26). The other set of rollers 297 being located adjacent to the right hand end of the slide 293. There are three symmetrically arranged rollers 296 in each set, only one set of rollers 296 being illustrated in Fig. 27. A pair of opposed guide rollers 298 are supported by the truing apparatus frame 290 in engagement with opposite parallel faces of a guide bar or key 299 which is fixedly mounted on the cylindrical slide 293. The guide rollers 298 and the guide 299 serve to hold the cylindrical slide 293 against rotary movement so that the truing tool 295 will travel in a rectilinear path when the cylindrical slide 293 is reciprocated.

Figure 29:
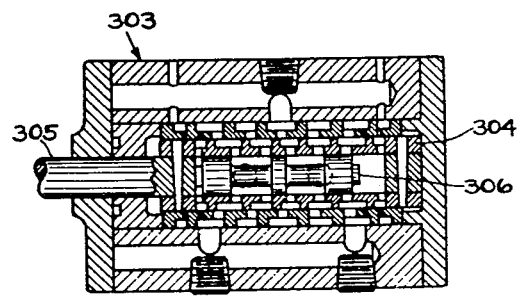
Fig. 29 is a longitudinal section taken approximately on the line 29—29 of Fig. 26, through the reversing valve for controlling reciprocation of the left hand truing tool.
Figure 31:
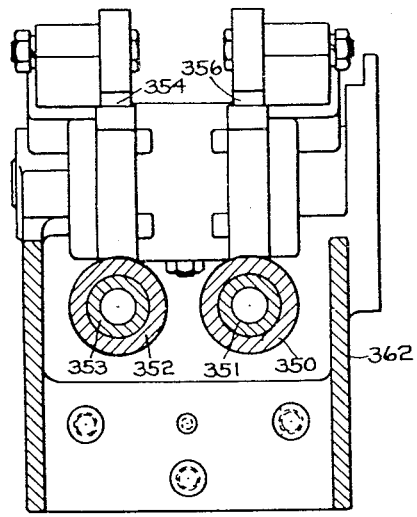
Fig. 31 is a cross sectional view, taken approximately on the line 31—31 of Fig. 30.
Figure 32:
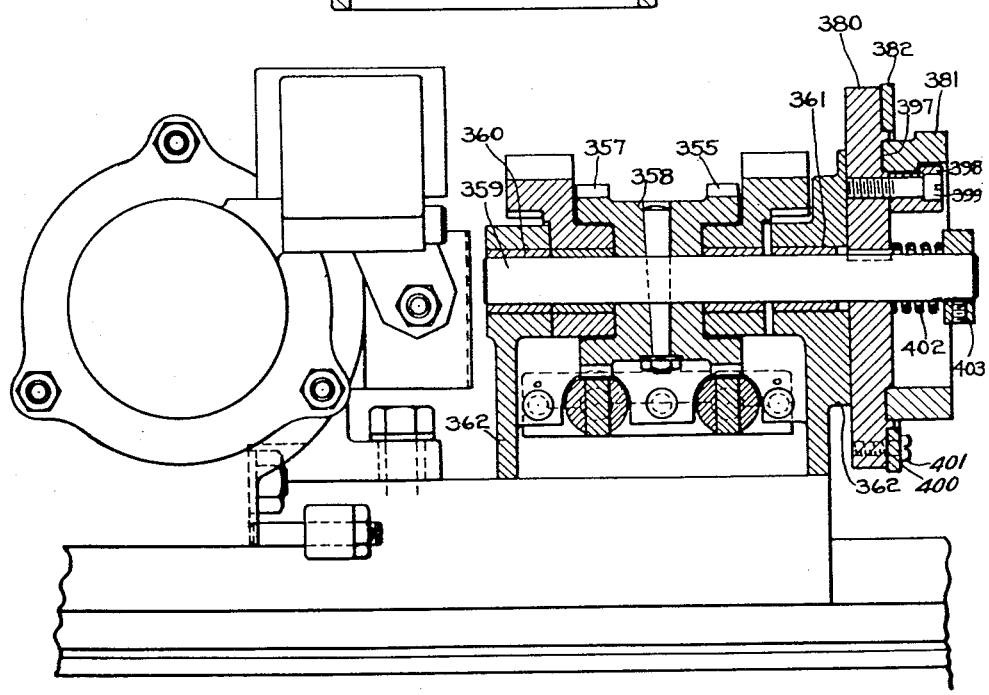
Fig. 32 is a cross sectional view, taken approximately on the line 32—32 of Fig. 30.

A hydraulically operated mechanism is provided for reciprocating the cylindrical slide 293 comprising a cylinder 300 which contains a slidably mounted piston 301. The piston 301 is connected to one end of a piston rod 302, the other end of which is fixedly connected to the cylindrical slide 293. A suitable control valve 303 is provided for controlling the admission to and exhaust of fluid from the cylinder 300 in a manner to be hereinafter described. The control valve 303 comprises a pilot valve 304 (Fig. 29) which is connected to one end of a valve stem 305. The pilot valve 304 contains a slidably mounted shuttle type reversing valve 306. This valve mechanism is substantially identical with that shown in the prior United States patent to Wallace H. Wood, No. 2,212,871, dated August 27, 1940, to which reference may be had for details of disclosure not contained herein. A pair of adjustably mounted dogs 307 and 308 are mounted on the valve stem 305. An arm 309 is adjustably mounted on the piston rod 302 and is arranged in the path of the dogs 307 and 308 to facilitate reversal of the movement of the piston 304.

A suitable feeding mechanism is provided for the truing tool slide 292 comprising a non-rotatable feed screw 315 (Fig. 27). A rotatable sleeve 316 is provided with an internally threaded portion or nut 317. A manually operable hand wheel 319 is keyed to the outer end of a shaft 320 which is fixedly connected to the right hand end of the sleeve 316. It will be readily apparent from the foregoing disclosure that when the hand wheel 319 is rotated, a rotary motion will be imparted to the nut 317 to move the truing tool slide 292 so as to cause the truing tool 295 to approach or recede from the peripheral surface of the grinding wheel 61.

Figure 28:
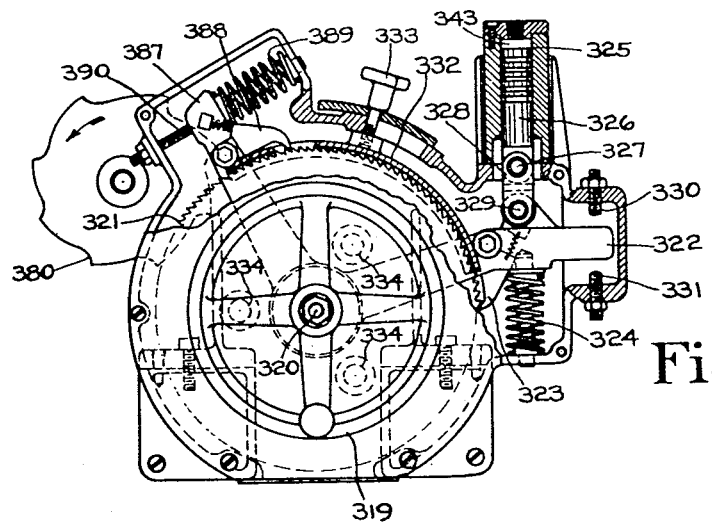
Fig. 28 is a right hand elevation of the manually operable feed wheel shown in Fig. 27, having parts broken away and shown in section to clarify the construction.

An actuating mechanism is provided for incrementally feeding the truing tool from the operator's control station in front of the machine. This mechanism comprises a ratchet wheel 321 which is keyed to the shaft 320. An arm 322 is rotatably supported on a hub portion of the feed wheel 319. A pawl 323 is supported by the arm 322 (Fig. 28) which is arranged to engage the teeth of the ratchet wheel 321. A compression spring 324 is provided normally to urge the arm 322 in a counterclockwise direction (Fig. 28) to pass the pawl 323 idly over the teeth of the ratchet wheel 321. A hydraulically operated mechanism is provided for producing an actuating stroke of the pawl 323 and its supporting arm 322. This mechanism comprises a cylinder 325 which contains a slidably mounted piston 326 (Fig. 28). The lower end of the piston 326 is connected by a stud 327 with a link 328, the lower end of which is connected by a stud 329 with the arm 322. A pair of opposed adjustably mounted stop screws 330 and 331 are provided for limiting the rocking movement of the arm 322. It will be readily apparent from the foregoing disclosure that when fluid is admitted to a cylinder chamber 343 at the upper end of the cylinder 325, the piston 326 will be moved downwardly to move the arm 322 in a clockwise direction so that the pawl 323 will transmit a rotary motion to the ratchet wheel 321. When the pressure is relieved in the cylinder chamber 343, the released compression of the spring 324 will rock the arm 322 in a counterclockwise direction to return the pawl 323 idly over the ratchet teeth 321 to its initial position. To facilitate adjusting the number of teeth picked up at each actuation of the pawl 323, an adjustably mounted shield 332 is provided adjacent to and surrounding the periphery of the ratchet wheel 321. A clamping screw 333 is provided to clamp the shield 332 in adjusted position. It will be readily apparent from the foregoing disclosure that by adjustment of the shield 332, the number of teeth picked up at each actuation of the ratchet wheel 321 may be varied and adjusted as desired. A plurality of spring pressed plungers 334 are supported in the housing 335 which surrounds the ratchet feed mechanism (Figs. 27 and 28). The plungers 334 frictionally engage the side face of the ratchet wheel 321 to prevent rotary motion being imparted to the ratchet wheel during the idle stroke of the pawl 323. This ratchet feeding mechanism is shown diagrammatically in Fig. 38. A solenoid actuated control valve 340 is actuated by a solenoid Sol. 5. Fluid under pressure from the pump 167 passes through the pipe 160, the pipe 271 and a pipe 341 to the control valve 340. When the solenoid Sol. 5 is energized, the valve 340 is shifted so that fluid under pressure passes through a pipe 342 into the cylinder chamber 343 to actuate the pawl 323.

Figure 40:
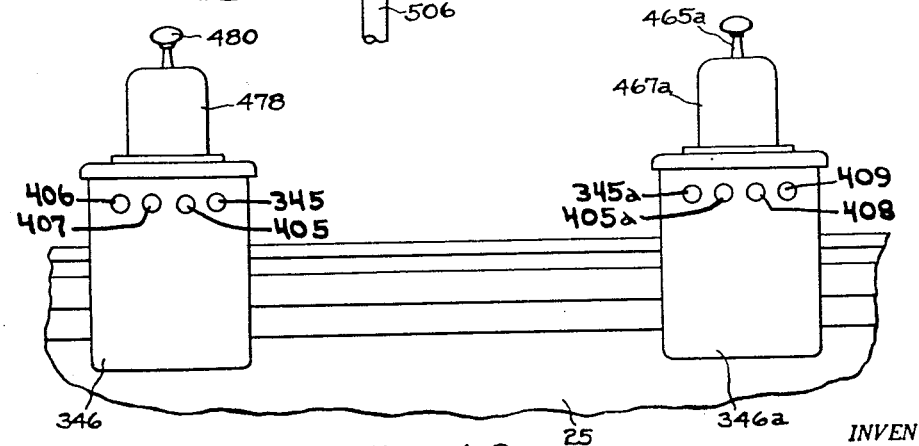
Fig. 40 is a fragmentary front elevation, on an enlarged scale, showing the main control levers and main control aprons.

A remote control mechanism is provided comprising a push button switch 345 which is located on the left hand main control apron 346 (Fig. 40). When it is desired to impart an incremental or inching feed to the truing tool 295, the push button switch 345 is actuated by the operator. Actuating of the switch 345 serves to move the ratchet pawl 323 through a predetermined stroke to impart a slight feeding movement to the truing tool 295. The amount of feed for each actuation of the pawl 323 is governed by the position of the stop screws 330 and 331. Each time the push button switch 345 is actuated, the truing tool 295 will be advanced toward the periphery of the grinding wheel 61 by a predetermined increment. A throttle valve 346 is provided in the pipe line 341 to facilitate regulating the amount of fluid passing from the pipe 341 to the control valve 340. This incremental feeding mechanism above described serves to adjust the position of the truing tool 295 at the start of a truing operation or to set up the truing apparatus when either a new truing tool or grinding wheel is mounted thereon.

A suitable hydraulically operated electrically controlled mechanism is provided for automatically feeding the truing tool at the end of each traversing movement of the truing tool 295 across the periphery of the grinding wheel 61. This mechanism is also arranged so that the truing tool 295 will make a predetermined number of passes across the face of the wheel after which the truing mechanism will be automatically stopped. This feeding mechanism comprises a pair of hydraulic units comprising a cylinder 350 which contains a piston 351 and a cylinder 352 which contains a piston 353. The piston 351 is operatively connected to actuate a pawl 354 to impart a rotary motion to a ratchet wheel 355 (Fig. 38). Similarly the piston 353 is operatively connected to actuate a pawl 356 which engages a ratchet wheel 357 (Fig. 30). As shown in Fig. 30, the ratchet wheel 355 and the ratchet wheel 357 are formed integral with a hub 358 which is keyed to a rotatable shaft 359. The shaft 359 is supported in bearings 360 and 361 which are carried by a frame 362.

A pipe 365 (Fig. 38) is connected between the control valve 303 and a cylinder chamber 366 in the cylinder 352. A pipe 367 is connected between the cylinder 352 and a cylinder chamber 368 in the cylinder 300. A tension spring 369 is operatively connected normally to urge the piston 353 toward the right (Fig. 38). A pipe 370 is connected between the control valve 303 and a cylinder chamber 371 in the cylinder 350. A pipe 372 is connected between the cylinder 350 and a cylinder chamber 373 in the cylinder 300. A ball check valve 374 is provided in a pipe line connecting pipes 365 and 367. Similarly a ball check valve 375 is provided in a pipe connecting the pipes 370 and 372. It will be readily apparent from the foregoing disclosure that when fluid under pressure is passed through the pipe 365 into the cylinder chamber 366, the piston 353 will be moved toward the left (Fig. 38) to move the pawl 356 through an actuating stroke (Fig. 30) to rotate the ratchet wheel 357. When the piston 353 moves toward the left, it uncovers a port to allow fluid under pressure to pass from the cylinder chamber 366 through the pipe 367 into the cylinder chamber 368 to move the piston 301 toward the left to traverse the truing tool 295 across the peripheral face of the grinding wheel 61. This traversing movement of the truing tool occurs after the truing tool has been advanced a predetermined increment toward the periphery of the grinding wheel 61. During movement of the piston 301 toward the left, fluid within the cylinder chamber 373 may exhaust through the pipe 372, the ball check valve 375, the pipe 370, to the control valve 303 and exhaust through a pipe 396 into a throttle valve 395 and out through an exhaust pipe 302 into the reservoir. When the control valve 303 is shifted automatically by means of the arm 309 engaging the dog 307, the control valve 303 will be shifted into a reverse position so that fluid under pressure will be passed through the pipe 370 into the cylinder chamber 371 to move the piston 351 toward the left so as to actuate the pawl 354 which in turn imparts a rotary motion to the ratchet wheel 355. As soon as the feeding movement has been imparted to the truing tool 295, the movement of the piston 351 toward the left uncovers a port so that fluid under pressure within the cylinder chamber 371 may pass through the pipe 372 into the cylinder chamber 373 to move the piston 301 toward the right (Fig. 38) so as to traverse the truing tool 295 across the peripheral face of the grinding wheel 61.

A suitable cam actuated mechanism is provided to transmit incremental movement of the ratchet wheels 355 and 357 to rotate the nut 317 and thereby to impart the desired predetermined feed to the truing tool 295. This mechanism comprises a multiple lobed cam 380 which is keyed to the shaft 359. A roller 383 mounted on the upper end of a rock arm 384 engages the peripheral surface of the lobed cam 380. The rock arm 384 is connected by a key 385 with a sleeve 386 which surrounds the sleeve 316 and shaft 320 (Fig. 27). An arm 387 is keyed to the right hand end of the sleeve 386 (Fig. 27). The arm 387 carries a pawl 388 (Figs. 27 and 28). A compression spring 388 is interposed between the arm 387 and the surrounding casing. The spring 388 serves normally to maintain the roller 383 in engagement with the surface of the cam 380. A stop screw 390 serves to limit the rocking movement of the arm 387 in a counterclockwise direction (Fig. 28). It will be readily apparent from the foregoing disclosure that rotary motion of the ratchet wheels 355 and 357 will impart a rotary motion to the lobed cam 380 which in turn imparts a rocking motion to the arm 384 to actuate the ratchet pawl 388. The ratchet pawl 388 imparts a rotary motion to the ratchet wheel 321 to rotate the nut 317 relative to the screw 315 so as to impart a transverse feeding movement to the truing tool 295.

The lobed cam 380 as illustrated in the drawing is formed with eight lobes so that the truing tool will be advanced or fed toward the periphery of the grinding wheel 61 before each of eight passes of the truing tool across the peripheral face thereof. If a truing operation requires a different number of passes of the truing tool, a different lobed cam must be provided to replace the cam 380.

It is desirable to slow down the traversing movement of the truing tool 295 on the last few passes of the truing tool across the periphery of the wheel. This is preferably accomplished by means of the valve 395. As shown in the drawing the valve 395 is open so that unrestricted exhaust of fluid from the control valve 303 may pass through the pipe 396, through the valve 395 and out through an exhaust pipe 402 into the reservoir 157. A cam 381 which is arcuate in shape is mounted in a groove 397 formed in the side face of the lobed cam 380. The cam 381 is held in adjusted position by means of a clamping block 398 and a clamping screw 399 which is screw threaded into the lobed cam 380. The cam 391 is adjusted so that when the lobed cam rotated to a predetermined position, the cam 381 will engage the actuating roller 393 to move the valve stem 394 toward the right (Fig. 30) to partially close the valve 395 so as to throttle the exhaust of fluid and thereby to slow down the traversing movement of the truing tool 295. The length and position of the cam 381 may be varied depending on the number of passes at a slow speed which are required for a given truing operation. The cam 381 may also be adjusted relative to the lobed cam 380 so that the slow down motion of the truing tool may be readily timed as desired.

A suitable stop control mechanism is provided for stopping the truing operation after the truing tool has traversed across the face of the grinding wheel a predetermined number of passes. This is preferably accomplished by means of a single lobed cam 382 which is adjustably mounted on the side face of the lobed cam 380. The cam 382 is provided with elongated arcuate slots 400 through which clamping screws 401 pass and are screw threaded into the lobed cam 380. It will be readily apparent from the foregoing disclosure that the cam 382 may be readily adjusted relative to the cam 380. An actuating roller 391 of the limit switch LS11 is arranged in the path of the single lobe of the cam 382. When the lobe engages and moves the roller 391 to actuate the limit switch LS11, a circuit is broken to deenergize the solenoid Sol. 3 thereby shifting the control valve 272 to stop the truing operation.

The lobed cam 380 which supports the cams 381 and 382 is slidably keyed on the shaft 259 and is held in position thereon by means of a compression spring 402 and a collar 403. The compression of the spring 402 against the cam 380 holds it in frictional engagement with the frame 362 so as to retard the rotation of the cam 380 and to prevent any back motion of the same when the pawls move idly over the teeth of the ratchet wheels 355 and 357.

The operation of the left hand wheel head truing apparatus is readily apparent from the foregoing disclosure. When it is desired to true the periphery of the grinding wheel 61, a push button switch 405 on the left hand main control apron 346 is actuated to close a circuit so as to energize the solenoid Sol. 3 to actuate the valve 272. Actuation of valve 272 closes the grinding coolant valve 266 and opens truing coolant control valve 267. Actuating of the valve 272 also admits fluid under pressure through the pipe 273 to initiate a truing cycle. The truing tool 295 is traversed across the peripheral face of the grinding wheel 61 a predetermined number of passes. Before each pass, the truing tool 295 is automatically fed toward the grinding wheel 61. On the last two or more passes, the traversing speed of the truing tool 295 is automatically reduced by means of a cam 381 actuating the valve 375. When the predetermined truing operation has been completed the cam 282 engages the roller 291 to actuate the limit switch LS11 to stop the truing cycle. In case it is desired to jog or inch the truing tool 295 toward the grinding wheel 61, the push button switch 345 may be actuated initially to move the truing tool into position or if desired to provide an additional feeding increment.

Right hand wheel head truing apparatus

A truing apparatus is provided for truing the peripheral face of the right hand grinding wheel 63. This truing apparatus is identical with the left hand grinding wheel truing apparatus and is shown only in a diagrammatic form in Fig. 39. Identical parts are indicated with the same reference numerals with the suffix "a" added thereto in each case. A push button switch 345a is provided on a right hand main control apron 346a. When switch 345a is actuated, it energizes the solenoid Sol. 6 to actuate a control valve 340a so as to admit fluid under pressure through a pipe 342a into a cylinder chamber 343a to move a piston 326a downwardly and thereby cause a clockwise movement of an arm 322a and a pawl 323a. This movement of the pawl 323a causes a counterclockwise movement of a ratchet wheel 321a to impart an inching feed to a truing tool 295a.

A push button switch 405a is provided on the right hand main control apron 346a for starting a truing cycle. When switch 405a is actuated to close a circuit so as to energize solenoid Sol. 4 to actuate a valve 272a, actuation of the valve 272a admits fluid under pressure through a pipe 273a into a cylinder 268a to move a piston 269a toward the left (Fig. 39) so as to close a grinding coolant control valve 266a and to open a truing coolant control valve 267a. Opening valve 267a passes coolant fluid through a pipe 274a to the truing tool 295a.

Actuation of the valve 272a also admits fluid pressure through a pipe 273a to initiate a truing cycle. A cylinder 300a and a piston 301a serve to traverse the truing tool 295a. Cylinders 350a and 352a together with pistons 351a and 353a are arranged to actuate a ratchet wheel 355a and through a multi-lobe cam 380a are arranged to actuate a ratchet wheel 355a automatically to feed the truing tool 295a toward the grinding wheel 63 before each pass of the truing tool 295a. A cam 381a actuates a control valve 375a to slow down the traversing speed of the truing tool on the last few passes. A single lobe cam 282a is provided which after a predetermined number of passes of the truing tool across the peripheral face of the grinding wheel 63, serves to actuate a limit switch LS12 to energize the solenoid Sol. 4 and thereby terminate the truing cycle. For further details of the right hand truing apparatus and truing cycle reference may be had to the more detailed disclosure and description of the left hand truing apparatus previously described.

In order to precisely control the grinding feed so as to facilitate grinding a crankpin to a predetermined size, an electric gaging device is provided to cause a separation of the grinding wheel from the crankpin being ground. As shown in the drawings, a standard well known commercial grinding gage is employed such as that commonly known as the Foster electric sizing gage which is fully disclosed and described in the United States patent to S. A. Foster, No. 2,267,559, dated December 23, 1941, is provided. One of these gage heads is mounted on each of the grinding wheel heads as shown diagrammatically in Figs. 38 and 39. The mounting for the right hand gage is shown in Fig. 9.

An electric gaging head 410a is pivotally supported on a stud 411a which is formed integral with a rod 412a. The rod 412a is supported by a bracket 413a which is in turn adjustably mounted on a rod 414a. The rod 414a is supported by a pivotally mounted bracket 415a on a stud 416a which is fastened to the wheel guard. The bracket 415a also is provided with a rearwardly extending rod 417a which supports an adjustably mounted weight 418a by means of which the weight of the gaging head and associated parts may be counter balanced.

The gaging head is arranged so that after the initial grinding on a crankpin, the gaging head may be manually moved downwardly into an operative position in engagement with the pin being ground. It is desirable however to provide automatic means for removing the gage from engagement with the crankpin being ground just before the crankpin reaches a predetermined size. This is preferably accomplished by providing a hydraulically operated mechanism comprising a cylinder 419a which contains a slidably mounted piston 420a. The piston 420a is fixedly connected to one end of a slidably mounted piston rod 421a. A compression spring 422a surrounds the piston rod 421a and is contained within the cylinder 419a between the piston 420a and the left hand end cap of the cylinder 419a (Fig. 9). Fluid under pressure is conveyed to the cylinder 419a through a pipe 423a into a cylinder chamber 424a to cause the piston 420a to move toward the left (Fig. 9). When the piston moves toward the left through a part of its normal stroke, a port 425a is uncovered to allow fluid to exhaust from the chamber 424a through a pipe 426a which is connected by a pipe 436a with a pipe 163a to admit fluid under pressure to cylinder chamber 162a (Fig. 39) to cause a rearward movement of the piston 136a and the wheel slide 55 and the grinding wheel 63.

The piston rod 421a is connected to the right hand end of a slide rod 427a which is adjustably connected to a block 428a. A slide rod 429a connects the block 128a with the gage head 410a.

When fluid under pressure is admitted through the pipe 423a into cylinder chamber 424a to cause the piston 420a to move toward the left (Fig. 9) to remove the gage head from engagement with the crankpin 33 before the grinding wheel 63 moves rearwardly, the movement of the piston 420 serves first through the rods 427a and 429a to rock the gage head 410a about the stud 411a as a pivot to move the gaging head out of engagement with the pin being ground. When the gage has been moved clear of the crankpin being ground, a collar 430a mounted on the left hand end of the piston rod 421a engages a downwardly extending arm 431a of the block 415a to swing the block 415a in a clockwise direction. This movement of the block 415a serves to swing the rods 414a and 412a in a clockwise direction to raise the gaging head 410a to an uppermost or inoperative position.

A manually operable knob 432a is provided on the gage head to facilitate manually applying the gage head to the pin being ground at the start of the grinding operation after the pin being ground has been rounded-up by the grinding wheel 63.

A suitable automatic reset mechanism is provided for resetting the gaging head 410a after a grinding operation has been completed so that the gaging head is ready for the next grinding operation. This mechanism preferably comprises a hydraulic cylinder 433a containing a slidably mounted piston 434a which is operatively connected to reset the contact points in the gage head 410a. Fluid under pressure passing through the pipe 426a when the gage head 410a is moved toward an inoperative position, also passes through a pipe 435a into a cylinder chamber at the lower end of the reset cylinder 433a to move the piston 434a upwardly and thereby to reset the gage for the next grinding operation.

A ball check valve 437a is provided in the pipe line 163a to allow fluid to exhaust from the feed cylinder chamber 162a. This ball check valve 437a prevents admission of fluid to the cylinder chamber 162a (Fig. 39) until fluid from the valve 155a is passed through the cylinder 120a and through the pipe 426a, through the pipe 436a and the pipe 163a to facilitate removing the gage head from operative engagement with the crankpin being ground before the grinding wheel 63 starts its rearward movement.

*Lefthand—Electric sizing head*

An identical electric sizing head 410 is provided for controlling the movement of the grinding wheel 61 and the left hand wheel head (Fig. 38). This gaging head and operating parts have been shown only in a diagrammatic form in Fig. 38. The gaging head 410 is manually applied to the crankpin 33 in a manner previously described after the pin has been rounded up by the grinding wheel 61. The gaging head 410 remains in operative engagement with the crankpin until the crankpin has been ground to a predetermined size. When the contact points of the gage head 410 close to shift control valve 155 so as to cause a rearward movement of the grinding wheel 61, fluid under pressure passing through the pipe 63 passes through a pipe 423 into a cylinder chamber 424 in a cylinder 420 to move the piston 421 toward the left. During the initial movement of the piston 421, a rod 429 swings the gage head 410 out of operative engagement with the crankpin being ground after which the gage head 410 is raised to an inoperative position in a manner similar to that described in connection with the right hand gaging head. After the gaging head 410 has been moved out of engagement with the crankpin being ground, fluid under pressure within the chamber 424 has moved the piston 421 a sufficient distance toward the left to uncover the port so that fluid under pressure may pass through a pipe 426, through a pipe 436 and the pipe 163 into the cylinder chamber 162 to cause the piston 136 and the grinding wheel 61 to move rearwardly to an inoperative position. It will be readily apparent from the foregoing disclosure that the gaging head 410 is automatically moved out of engagement with the crankpin being ground before the grinding wheel 61 starts its rearward movement.

A hydraulic reset cylinder 433 is provided containing a slidably mounted piston 434. A pipe 435 connects the pipe 426 with a cylinder chamber at the lower end of the reset cylinder 433 so that when fluid under pressure passes through the pipe 426 to cause a rearward movement of the grinding wheel 33, after the gage head 410 has been swung out of engagement with the crankpin being ground, fluid under pressure will be passed through the pipe 435 to move the reset piston 434 upwardly so as to reset the gage 410 for the next grinding operation.

A ball check valve 437 is connected in the pipe line 463 to allow fluid to exhaust directly from the cylinder chamber 162 through the pipe 163 to the control valve 155 when the grinding wheel 61 is moved toward the crankpin being ground. It will be readily apparent however that the ball check valve 437 prevents direct passage of fluid from the valve 155 to the cylinder chamber 162 but causes fluid to pass through the pipe 423 into the cylinder chamber 424 thereby to remove gage head 410 from operative engagement with the crankpin being ground, before fluid under pressure can be admitted to the cylinder chamber 162 to cause a rearward movement of the grinding wheel 63. It will be readily apparent from the foregoing disclosure that when the grinding wheel 61 has ground the crankpin to a predetermined size, contacts in the gage head will shift the control valve 155 and in a manner above described first removing the gage head 410 from engagement with the crankpin being ground after which the grinding wheel 61 will be moved rearwardly to an inoperative position.

Dog bar—Interlocks

Figure 36:
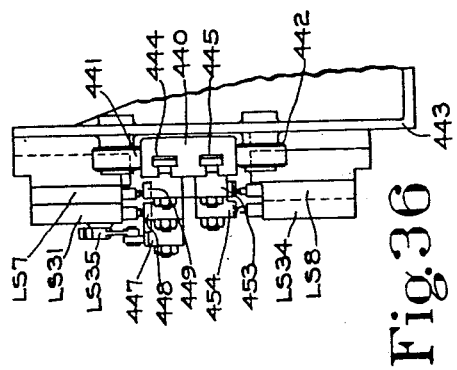
Fig. 36 is a right hand end elevation of the dog bar and associated parts as shown in Fig. 35, showing the limit switches in end elevation.
Figure 37:
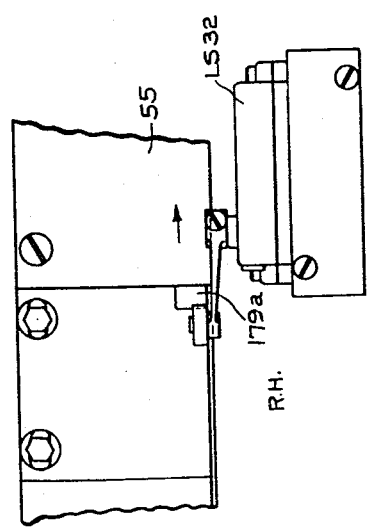
Fig. 37 is a fragmentary side elevation, on an enlarged scale, of a limit switch actuated by a cam on the wheel slide.
Figure 35:
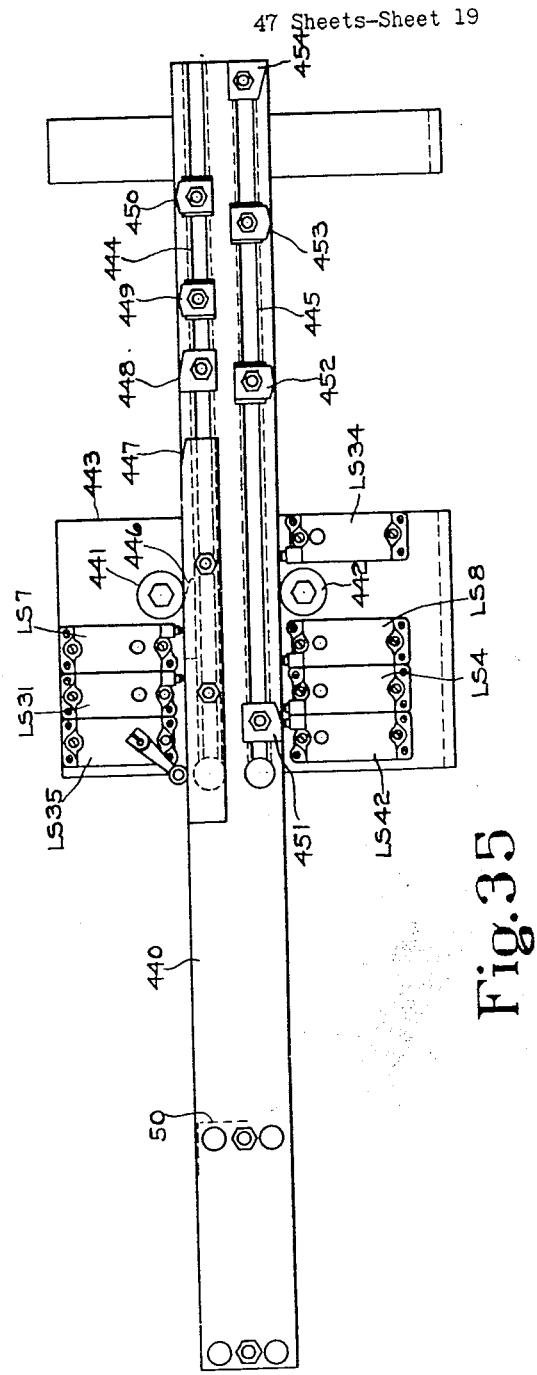
Fig. 35 is a fragmentary rearward elevation, on an enlarged scale, of the dog bar which is moved by the longitudinal indexing movement of the left hand wheel carriage, and showing the limit switches and actuating dogs associated therewith.

An interlock mechanism is provided for interlocking the several mechanisms of the machine which is tied in with the longitudinal indexing movement of the grinding wheels 61 and 63. This mechanism has been illustrated in Figs. 35 and 36 and comprises a dog bar 440 which is fastened to the rear end of the wheel slide 50. The dog bar is slidably supported by a pair of opposed rollers 441 and 442 which are carried by a bracket 443. The dog bar 440 is provided with a pair of parallel longitudinally extending T-slots 444 and 445 which serve as supports for a plurality of adjustably mounted dogs 446, 447, 448, 449, 450. These dogs are adjustably clamped by clamping bolts having heads slidably supported by the T-slot 444. Similarly, adjustably mounted dogs 451, 452, 453, and 454 are adjustably supported by clamping bolts having their heads supported by the T-slot 445.

As the dog bar 440 is moved longitudinally by longitudinal indexing movement of the wheel slide 50, the dogs above described will actuate a plurality of limit switches LS35, LS31, LS7, LS42, LS4, LS8, and LS34. The dogs 446, 449 and 450 serve to actuate the limit switch LS7 as the dog bar 440 is moved longitudinally to slow down the longitudinal indexing movement of the grinding wheels 61 and 63 before wheels reach the desired predetermined positions. The dog 446 serves to slow down the wheel indexing movement as the wheels approach a change wheels position. The dog 449 serves to actuate the limit switch LS7 to slow down the indexing movement of the grinding wheels as the wheels approach an "outer pins" position. Similarly, the dog 450 actuates the limit switch LS7 to slow down the longitudinal indexing movement as the grinding wheels approach an "inner pins" position.

The dog 447 serves to actuate a limit switch LS35 which serves as a "safety wheel slide back switch" to prevent forward feeding movement of either grinding wheel slide when the wheels are in an extreme outer or truing position. The dog 448 serves to actuate limit switch LS31 which serves as a "safety grinding switch" when the grinding wheels are in an outer pins position.

The dog 451 serves to actuate limit switch LS42 which serves as a "over travel safety switch" when the wheels are in a change wheels position. Dog 452 serves to actuate limit switch LS4 which serves as a "positioning stop switch" to stop the wheel indexing motor when the grinding wheels are indexed to an outer pins position. Dog 453 serves to actuate a limit switch LS8 which serves as a "positioning stop switch" to stop the indexing movement of the grinding wheels when they reach an inner pins position. Dog 454 serves as a "over travel safety switch" when the grinding wheels are indexed to an inner pins position. The connection of these limit switches with the various control mechanisms of the machine will be described hereinafter.

Right hand main control lever

Figure 19:
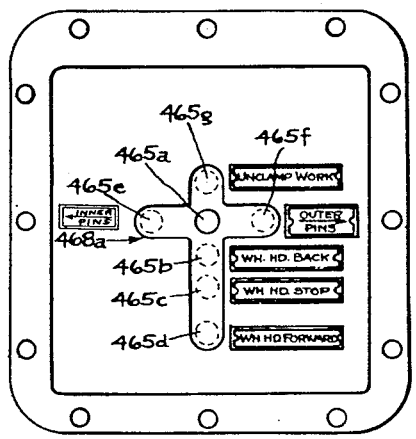
Fig. 19 is a horizontal sectional view, taken approximately on the line 19—19 of Fig. 18, showing the cover plate in elevation.
Figure 20:
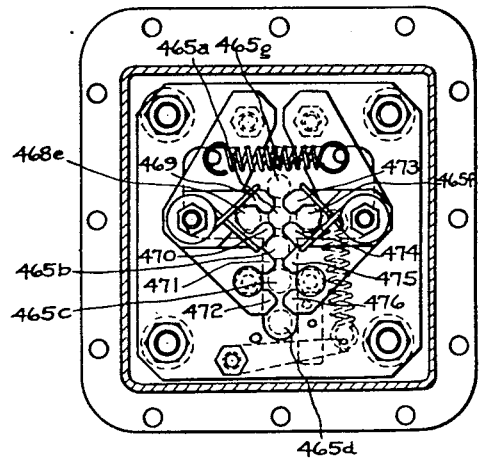
Fig. 20 is a horizontal sectional view, taken approximately on the line 20—20 of Fig. 18, showing the detents for locating the control lever in predetermined positions.
Figure 18:
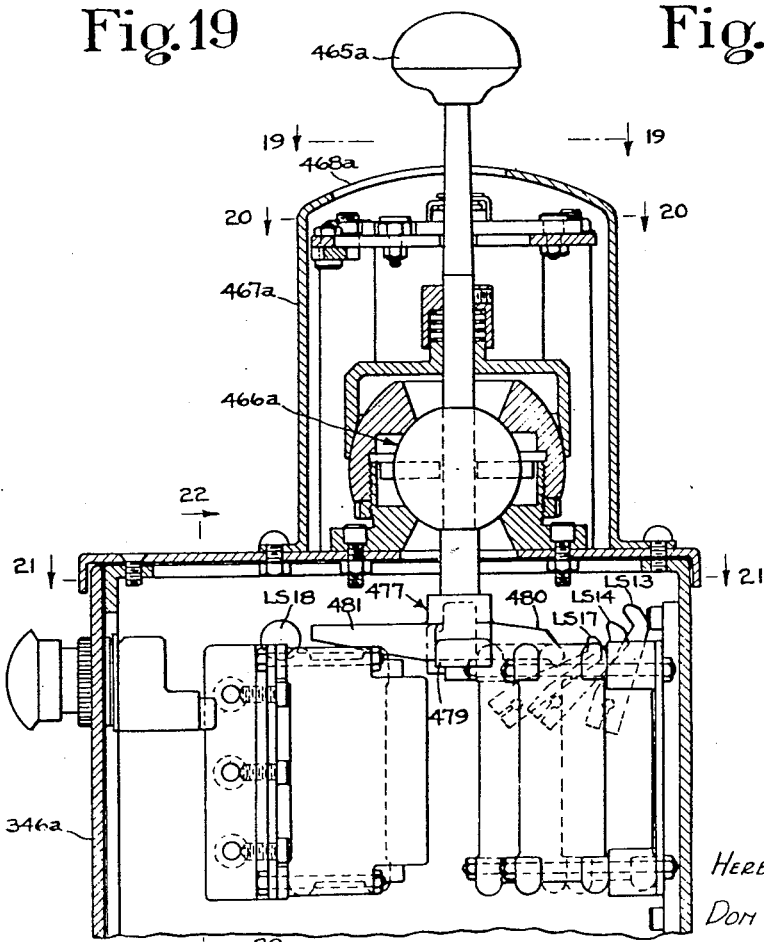
Fig. 18 is a fragmentary vertical sectional view, on an enlarged scale, taken approximately on the line 18—18 of Fig. 1, through the right hand main control lever and box.

The movement of the grinding wheels 61 and 63 that is the transverse feeding movement and the longitudinal indexing movement, is preferably controlled by a pair of main control levers. The machine is provided with a right hand main control apron 346a which serves as a support for a right hand main control lever 465a. The main control lever 465a is supported by a ball and socket joint 466a to facilitate movement of the lever in one of two directions. The apron 346a is provided with an upwardly extending housing 467a. The housing 467a is provided with a cross-shaped slot 468a which serves as a guide for facilitating movement of the control lever 465a in one of two directions (Figs. 18, 19 and 20). The control lever 465a is shown in full lines in Fig. 19 in a central position in which position it may be moved in a horizontal portion of the cross-shaped slot 468a to cause a longitudinal indexing movement of the grinding wheels 61 and 63. If it is desired to move the grinding wheels to an "inner pins" position, the control lever 465a is moved into position 465e. When it is desired to cause an indexing movement to an "outer pins" position, the control lever 165a is shifted in a horizontal direction (Fig. 19) into position 465f.

When it is desired to unclamp a crankshaft from the pot chucks 31 and 32, the control lever 465a is moved upwardly into position 465g which serves to unclamp the crankshaft 33 after a grinding operation has been completed to facilitate removal thereof. A new crankshaft may then be placed in the pot chucks 31 and 32 after which the control lever 465a is moved from position 465g into position 465a which movement serves to actuate the clamping jaws of the pot chucks above described to clamp the crankshaft in the pot chucks 31 and 32 for a grinding operation. After the crankshaft has been clamped in position, the control lever 465a may be moved into an extreme forward position 465d in which position the grinding wheel 63 will start its forward feeding movement. If it is desired to stop the wheel feeding movement at any time, this may be accomplished by shifting the lever 465a into position 465c. When it is desired to move the grinding wheel 63 rearwardly, the main control lever 465a is shifted into position 465b (Fig. 19).

To facilitate locating and holding the main control lever 465a in the positions above described, a plurality of spring pressed detents 469, 470, 471, 472, 473, 474, 475 and 476 are provided to locate and normally maintain the main control lever 465a in the desired position. The tension of the springs governing the detents being sufficient normally to hold the main control lever in the manual set position.

Figure 21:
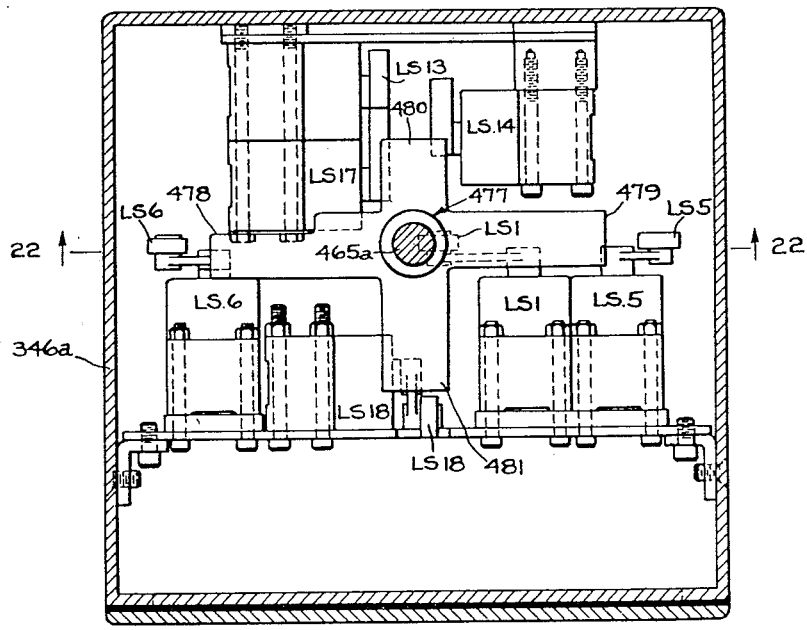
Fig. 21 is a horizontal sectional view, taken approximately on the line 21—21 of Fig. 18, showing the lower end of the control lever and the arrangement of the switches actuated thereby.
Figure 22:
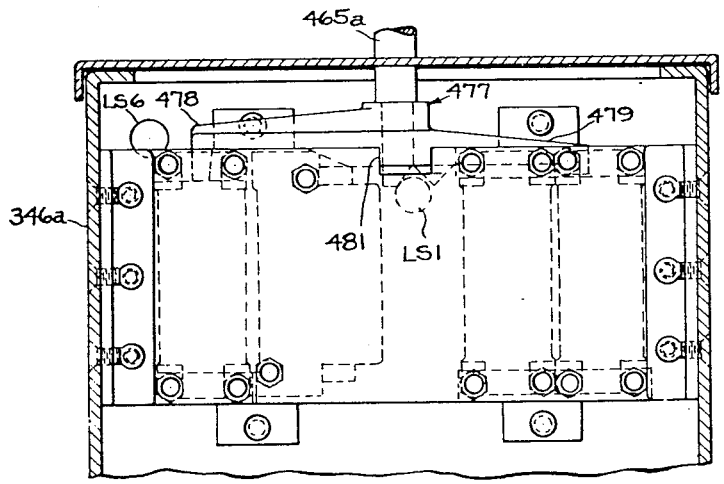
Fig. 22 is a vertical sectional view, taken approximately on the line 22—22 of Fig. 18.

The lower end of the main control lever 465a is provided with a cross-shaped member 477 which is provided with horizontally extending arms 478 and 479 (Fig. 21) and vertically extending arms 480 and 481. When the control lever 465a is in a central position such as illustrated in full lines in Fig. 19, the limit switch LS1 is actuated to render the longitudinal indexing movement operative so that the wheel slides and their supporting carriages may be indexed longitudinally to either "inner pins" or "outer pins" positions. If the lever 465a is moved into position 465f, that is to an "outer pins" position, the arm 478 (Fig. 21) engages and actuates limit switch LS6. Actuation of the limit switch LS6 serves to rotate the wheel index motor so as to traverse the grinding wheels 61 and 63 to an "outer pins" position. Similarly, if the control lever 465a is moved to position 465e (Fig. 19), this movement serves to move the arm 479 (Fig. 21) toward the right to engage the actuating roller and actuate the limit switch LS5. Actuation of limit switch LS5 serves to start the wheel index motor to traverse the grinding wheels 61 and 63 longitudinally to an "inner pins" position for grinding a pair of aligned inner pins of the crankshaft 33.

When the control lever 465a is moved into position 465g to "unclamp work" (Fig. 19) the arm 481 is moved downwardly (Fig. 21) to engage and actuate the roller of limit switch LS18. Actuation of limit switch LS18 serves to unclamp the clamping jaws of the pot chucks 31 and 32.

When the control lever 465a is moved downwardly (Fig. 19) that is to a forward position, the arm 480 engages and actuates the actuating arm of limit switch LS13 to initiate a forward feeding movement of the grinding wheel 63. Actuation of limit switch LS13 serves to energize one of the solenoids to shift the feed control valve 155a. If it is desired to stop the forward feeding movement, the control lever 465a is moved to position 465c (Fig. 19) which serves to actuate a limit switch LS13 (Fig. 21) to stop the wheel slide movement, that is to deenergize both of the solenoids Sol. 9, Sol. 10 so that control valve 155a assumes a central or neutral position. When it is desired to move the grinding wheel 63 rearwardly, the control lever 465a is positioned at 465b (Fig. 19) which in turn serves to actuate the limit switch LS17 to actuate the control valve 155a so as to cause a rearward movement of the grinding wheel. It will be readily apparent from the foregoing disclosure that the main control lever 465a serves to control the clamping and unclamping of the work piece in the pot chucks 31 and 32, to control the indexing movement of both the grinding wheels 61 and 63 to either "outer pins" or "inner pins" positions, and also to control the transverse feeding movement of the grinding wheel 63.

Left hand main control lever

Figure 23:
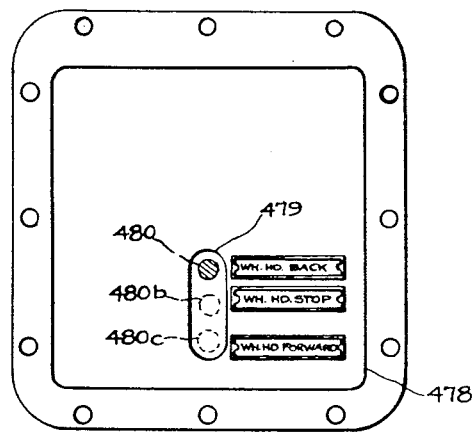
Fig. 23 is a horizontal sectional view, on an enlarged scale, through the left hand main control lever, showing a plan view of the cover plate.
Figure 24:
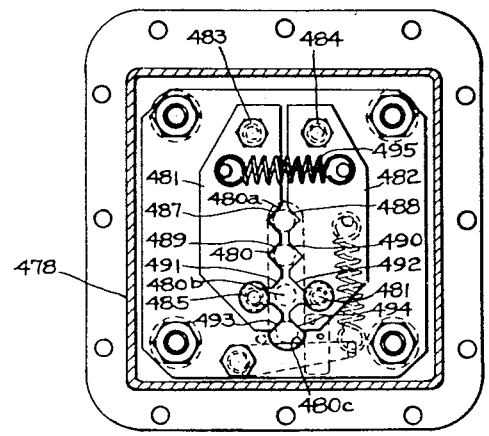
Fig. 24 is a horizontal sectional view, on an enlarged scale, through the left hand control lever and box, showing the detents for locating the control lever successively in one of a plurality of predetermined positions.

A left hand main control lever 480 is provided for controlling the transverse feeding movement of the wheel slide 54 and the grinding wheel 61. The control lever 480 is pivotally supported within the left hand main control apron 346 in a manner similar to that shown and described in connection with the right hand control lever 465. The control apron 346 is provided with an upwardly extending housing 478 the upper surface of which is provided with an elongated slot 479 for guiding the main control lever 480. As illustrated in Fig. 23 the control lever 480 has four positions, namely a rear position 480a which is an idle position, position 480 which is the normal position with the wheel slide back, position 480b with the wheel head stop and position 480c to cause a forward feeding movement of the grinding wheel slide 54.

A suitable mechanism is provided for maintaining the control lever in any one of the four positions above mentioned. This mechanism may comprise a pair of pivotally mounted plates 481 and 482 which are pivotally supported by studs 483 and 484 respectively. The lower ends of the plates 481 and 482 are guided by a pair of studs 485 and 486 which are fixedly mounted relative to the housing 478. The plates 481 and 482 are provided with a plurality of pairs of V-shaped notches 487—488, 489—490, 491—492, and 493—494. A tension spring 495 is connected normally to maintain the plates 481 and 482 in engagement with the studs 185 and 186. As the control lever 480 is moved within the slot 479, the plates 481 and 482 will be rocked on their respective pivot studs 483 and 484 as the control lever moves between notches in the plates 481 and 482. The spring 485 serves normally to hold the plates 481 and 482 so as to maintain the control lever 480 in the desired operating position.

Figure 25:
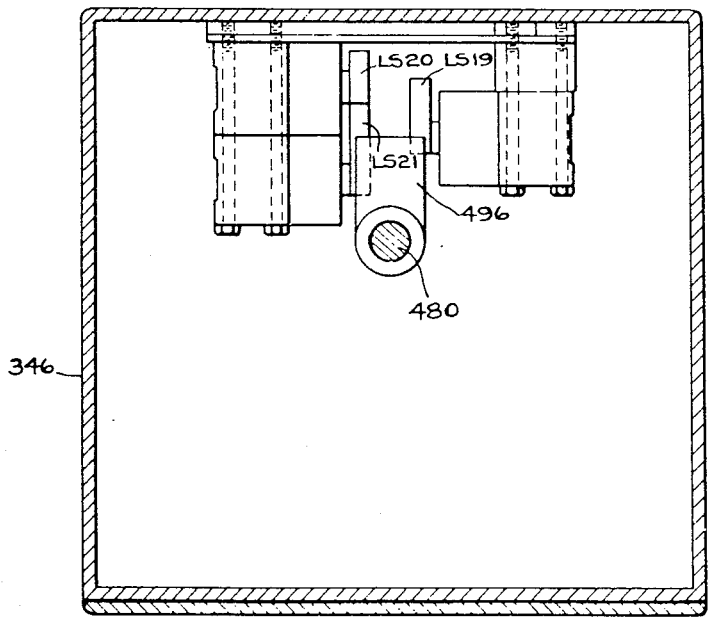
Fig. 25 is a horizontal sectional view, on an enlarged scale, through the left hand control box, showing the lower end of the control lever and the arrangement of the limit switches actuated thereby.

The control lever 480 is operatively connected to actuate a plurality of limit switches and to thereby control the movement of the wheel slide 54. The lower end of the lever 480 is provided with an upwardly extending arm 496 (Fig. 25). When the lever 480 is positioned as shown in full lines (Fig. 23), the arm 496 engages the actuating arm of the limit switch LS21 which is operatively connected to actuate the control valve 155 and cause a rearward movement of the wheel slide 54. When it is desired to stop the wheel slide movement, the control lever is shifted to position 480b in which position the arm 496 actuates the limit switch LS19 which serves to deenergize the solenoid so that valve 155 returns to a neutral or central position thus stopping the movement of the wheel slide. When it is desired to cause a forward feeding movement of the grinding wheel 61, main control lever 480 is moved to position 480c in which position the arm 496 (Fig. 25) engages and actuates the limit switch LS20 to energize the solenoid Sol. 15 to shift the valve 155 so as to admit fluid under pressure through the pipe 161 to cause a forward feeding movement of the grinding wheel 61 and its supporting slide 54. It will be readily apparent from the foregoing disclosure that movement of the control lever 480 serves to control the movement of the grinding wheel slide 54 and grinding wheel 61 independent of the movement of the wheel slide 55 and grinding wheel 63.

Mechanical safety stop—Wheel indexing mechanism

Figure 41:
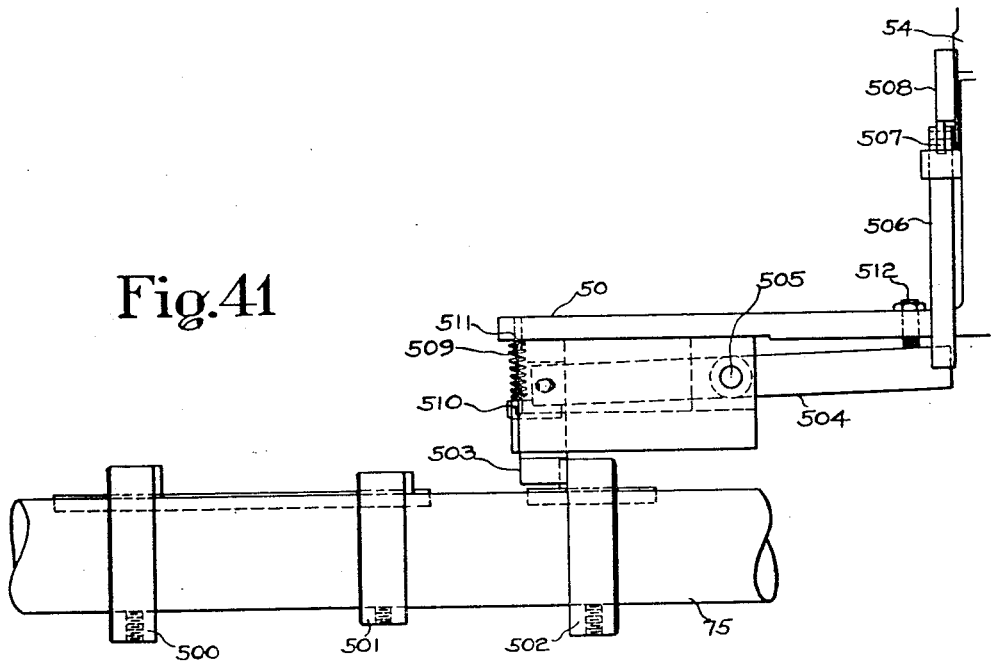
Fig. 41 is a fragmentary front elevation, on an enlarged scale, of the mechanical safety arrangement for stopping the longitudinal indexing movement of the grinding wheel carriages.
Figure 42:
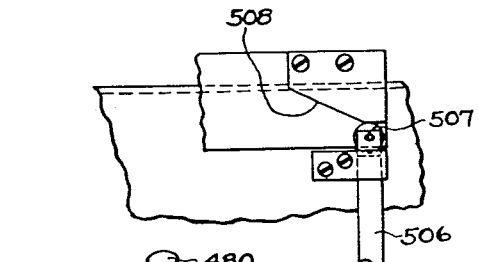
Fig. 42 is a fragmentary side elevation, on an enlarged scale, showing the cam for actuating the safety mechanism shown in Fig. 41.

It is desirable to provide a suitable mechanical safety stop mechanism positively to prevent overrun of the indexing movement of the grinding wheel carriages during movement thereof so as to prevent collision of the grinding wheels and their guards as they move toward each other and also positively to limit the separating movement of the grinding wheels in case of failure of the electrical safety controls. As illustrated in Figs. 5 and 41, a plurality of adjustable collars 500, 501 and 502 are provided on the feed screw shaft 15. A slidably mounted plunger 503 is mounted on the grinding wheel carriage 50. During the normal longitudinal indexing movement of the grinding wheel carriages 50 and 51, the plunger moves between the collars 501 and 502 which serve positively to limit the normal movement of the carriages. Normally the plunger does not engage either of the collars 501 or 502, since electrical controls to be hereinafter described serve to stop the movement of the carriages 50 and 51. The diameter of the collar 501 is smaller than the collars 500 and 502. When it is desired to traverse or index the grinding wheel carriages 50 and 51 to a "wheel truing" or "change wheels" position, the plunger 503 may be raised so that it will ride over the collar 501. In this position of the plunger 503, the collar 500 will serve to limit the separating movement of the wheel carriages 50 and 51.

The plunger 503 is preferably actuated automatically by means of a rock arm 504 which is pivotally supported on a rock shaft 505 supported by the wheel carriage 50. The rock arm 504 is actuated by means of a vertically arranged slide rod 506 which is slidably supported on the wheel carriage 50. The slide rod 506 is provided with a roller 507 at its upper end which is arranged in the path of a cam 507 which is supported on the wheel slide 54. The cam 508 is adjusted relative to the wheel slide 54 so that when the wheel slide 54 is moved transversely to an extreme rearward position to facilitate moving the grinding wheel carriages 50 and 51 to either a "wheel truing" or "change wheel" position, the cam 508 automatically depresses the slide rod 506 and rocks the rock arm 504 so as to raise the plunger 503 so that it is out of the path of the collar 501. The carriages 50 and 51 may then be traversed or indexed to a "wheel truing" or "change wheel" position. The plunger 503 is normally held in a downward position by means of a compression spring 509 which is interposed between a stud 510 on the rock arm 504 and a stud 511 on the wheel carriage 50. A stop screw 512 on the carriage 50 serves to limit the downward movement of the plunger 503. It will be readily apparent from the foregoing disclosure that if the electrical controls which normally govern the stopping of the indexing movement of the wheel carriages 50 and 51 fail, the mechanical safety device including the collars 500, 501, and 502 will positively stop the longitudinal movement of the carriages 50 and 51.

*Side truing apparatus*

In grinding crankpins of a crankshaft, it is desirable to grind the peripheral body portion of the crankpin, the opposed cheeks or side faces at the ends of the crankpin and also the fillets therebetween. In grinding a crankpin it is therefore desirable that the side faces of the wheel be trued so that the opposed side faces will grind the opposed cheeks of the crankpin as the wheel is moved toward the pin during a grinding operation. The grinding wheel will first grind the cheeks and thereafter the cylindrical body portion of the pin. A truing apparatus is provided for side truing of the grinding wheels 61 and 63 (Fig. 43) comprising a bar 515 which is supported at its opposite ends in pot chucks 31 and 32. The truing bar 515 is provided with a flanged portion 516 at its right hand end. When the bar is placed in position in the pot chucks 31 and 32, the flange 516 engages and depresses the rod 193 (Fig. 17) to move the shoe 194 into the broken line position 194a thereby causing a downward movement of the plunger 195 to actuate the limit switch LS29 which is operatively connected to prevent starting of the work driving motor during the side truing operation.

Figure 43:
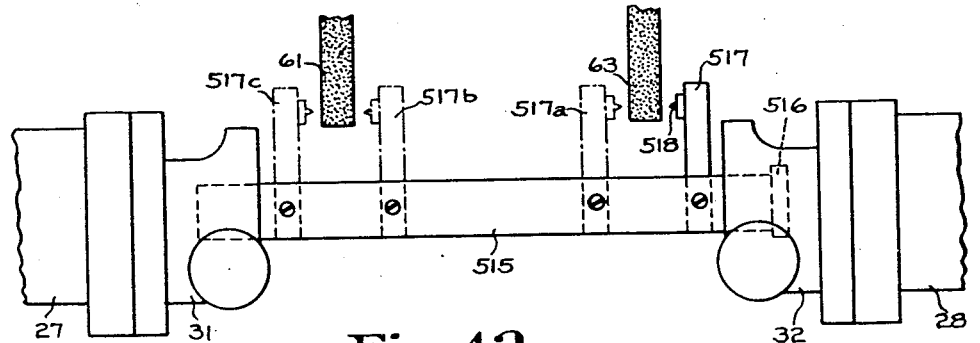
Fig. 43 is a fragmentary plan view of the side truing apparatus.

As illustrated in Fig. 43, a truing tool holder 517 is provided which is clamped in an aperture formed in the truing bar 515. The holder 517 is provided with a truing tool such as a diamond 518. The grinding wheel may be traversed in a manner above described to traverse the grinding wheel 16 across the truing tool 518. The wheel 63 may be moved toward or from the truing tool by manipulation of the hand wheel 134a so as to regulate the amount of material trued from the right hand side face of the wheel 63. After the right hand side face has been trued, the holder 517 may be shifted to position 517a to true the left hand side face of the grinding wheel 63. Similarly, the truing tool holder 517 may be shifted to positions 517b and 517c to true the side faces of the grinding wheel 61. If desired, four truing tool holders may be provided and precisely located on the bar 515 so that the side faces on both the wheel 63 and the wheel 61 may be simultaneously trued. In the preferred construction however only one truing tool holder is provided which is shifted as above described to true one side face at a time.

*Telltale signal light panel*

Figure 44:
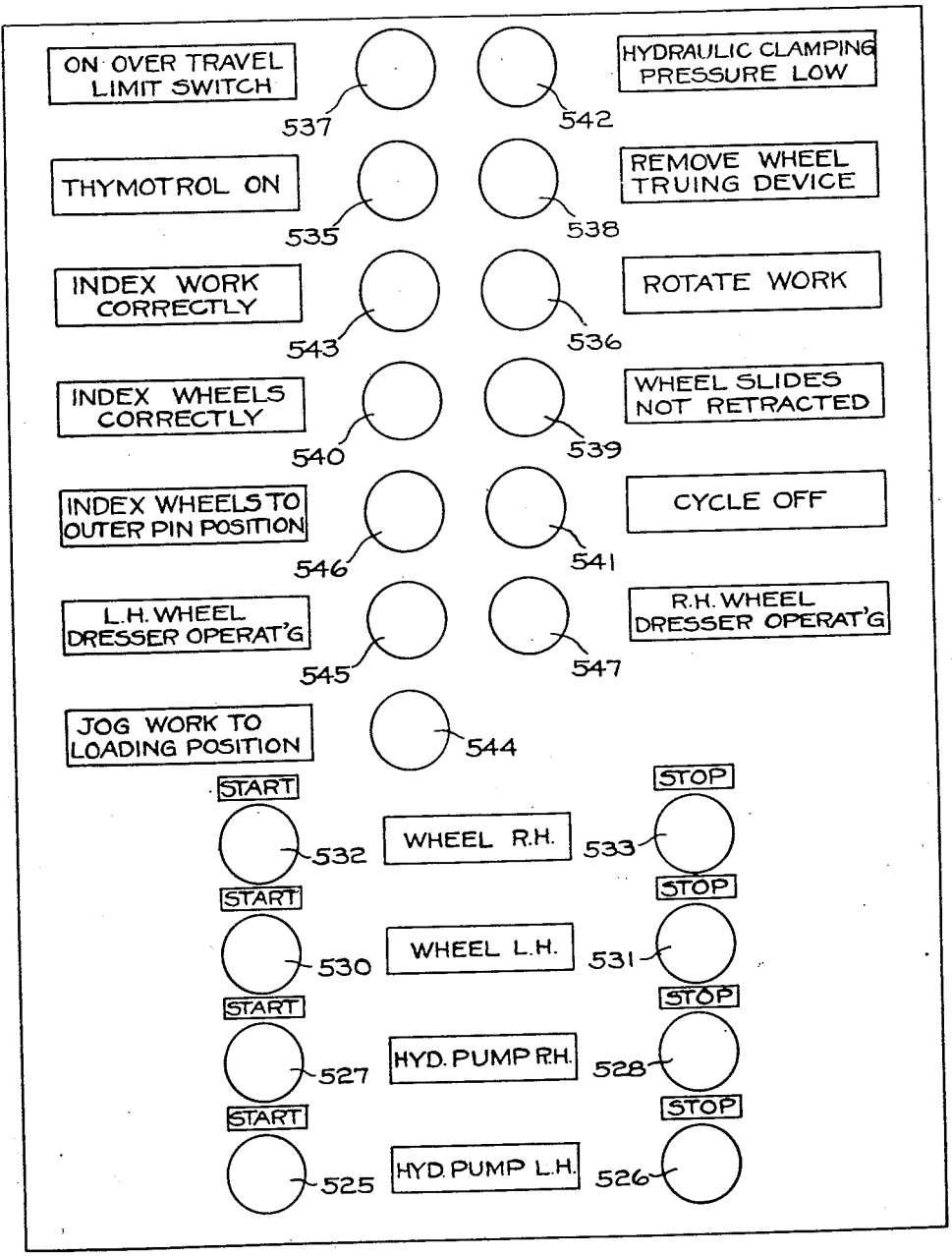
Fig. 44 is an elevation of the telltale signal light panel.

In order to facilitate operation of the machine, a telltale signal light panel is provided which is either fixed to the machine or mounted adjacent thereto. A panel 524 (Fig. 44) is provided having a plurality of signal lights 535, 536, 537, 538, 539, 540, 541, 542, 543, 544, 545, 546, and 547. The amber light 535 (Figs. 44 and 47) is labeled "Thymo-trol on" and is automatically lighted to signal when the tubes in the electronic control unit have reached proper temperature. The red light 536 (Figs. 44 and 48) is labeled "Rotate work" and is automatically lighted to signal the operator in case he neglects to turn the selector switch 408 from "Hand" to "Auto" in setting up the machine. The red light 537 (Figs. 44 and 49) is labeled "On overtravel limit switch—to traverse wheel heads to change wheel positions" and is automatically lighted to signal if operator attempts to traverse wheel heads to change wheel position before both wheel heads are in the extreme rear positions. The red light 538 (Figs. 44 and 49) labeled "Remove wheel truing device" automatically is lighted to signal if operator attempts to traverse wheel heads before the side truing device has been removed from the pot chucks.

The red light 539 (Figs. 44 and 49) labeled "Wheel slides not retracted" automatically is lighted to signal if operator attempts to transverse or index wheel heads before they are retracted. The red light 540 (Figs. 44 and 49) labeled "Index wheels correctly" and automatically is lighted if the operator attempts to advance wheel heads before the heads are properly indexed. The green light 541 (Figs. 44 and 49) labeled "Cycle off" automatically is lighted to signal the operator in case he neglects to push cycle reset button 406 (Fig. 40), after machine has been shut down.

The red light 542 (Figs. 44 and 49) labeled "Hydraulic clamping pressure low" automatically is lighted to signal in case the hydraulic pressure in the work clamping cylinders drops below a safe operating pressure. The red light 543 (Figs. 44 and 50) labeled "Index work correctly" automatically is lighted if the operator attempts to advance the wheel heads before the crankshaft is correctly indexed. The red light 544 (Figs. 44 and 50) labeled "Jog work to loading position" automatically is lighted to signal if operator attempts to open pot chucks when not in a loading or upright position. The white light 545 (Figs. 44 and 51) labeled "L. H. wheel dresser operating" automatically is lighted when the left hand truing apparatus is started and remains lighted during the dressing or truing operation.

The blue light 546 (Figs. 44 and 51) labeled "Index wheel to outer pin position" automatically is lighted to signal if operator attempts to dress or true grinding wheels when in an "Inner pin" position. The white light 547 (Figs. 44 and 51) labeled "R. H. wheel dresser operating" automatically is lighted when a truing operation on the right hand grinding wheel is started and remains lighted during the truing operation.

Wheel drive motors

As shown in Fig. 47, the left hand wheel drive motor K (64) is controlled by a standard magnetic across-the-line type started composed of contactor MK and overload relays OLK. This starter has standard start and stop functions controlled by push buttons 531 and 530 respectively. Right hand wheel drive motor L (69) is controlled by a standard magnetic across-the-line type starter composed of a contactor ML and overload relays OLL. This starter has standard start and stop functions controlled by push buttons 533 and 532 respectively.

Electronic control unit

Any of the well known electronic control units may be employed for controlling the work drive motor 36 and the traverse motor 83. As illustrated in Figs. 45, 46 and 47, the work drive motor 36 and a traverse drive motor 83 are part of and controlled by a General Electric Company "Thy-mo-trol" electronic control unit which is shown diagrammatically in Figs. 45, 46 and 47. This "Thy-mo-trol" equipment consists essentially of anode transformer Figs. 45 and 47, electronic power and control circuits shown schematically in Figs. 45 and 46, direct current work drive motor 36 and direct current traverse drive motor 83 and various speed control potentiometers whose function will be described later. The standard General Electric Company "Thymotrol" electronic control unit is covered by U. S. Patent No. 2,312,117 to E. E. Moyer et al., dated February 23, 1943, to which reference may be had for details of disclosure not contained herein. This equipment is a standard unit as manufactured by the General Electric Company with the exception that motors 36 and 83 are controlled alternately from the same electronic control unit which necessitates additional control relays for transfer of circuits from one motor to the other, a slow down speed control for positioning of work drive motor 36 and traverse drive mtor 83 which will be described in detail later and a slow speed jogging control of the work drive motor 36 which will be described in detail later.

From the diagram shown in Fig. 45 it can be seen that the standard "Thy-mo-trol" electronic control unit consists essentially of the following elements: Tubes 1, 2 and 3 constitute a rectifier which converts to direct current the alternating current supplied by the anode transformer. This direct current is then fed alternately through armatures of motor 36 and motor 83. Likewise tubes 4 and 5 make up a rectifier which supplies direct current to the shunt fields 36a and 83a of motors 36 and 83. By varying the outputs of these two rectifiers, it is possible alternately to control the operation of motors 36 or 83. Their speed can be varied from zero by armature voltage control up to a maximum for which either motor 36 or motor 83 is designed to operate by field weakening. The means by which the output of the power rectifier is varied is a group of control tubes A, B, G, D, C, F, J, E, and H whose basic circuit is shown in Fig. 46. Acting as amplifiers of current and voltage signals received from the motor circuit, these tubes supply the necessary direct current to the saturating winding of the saturable core reactor in the resistance reactance bridge which is used to vary the output voltage of the power rectifiers by the phase-shift method. By varying the current in the saturating winding, the power tubes are turned on or off as required to give the desired motor performance.

The adjustment of the speed for each motor is controlled by two adjustable potentiometers mounted on the same shaft. One controls armature voltage, the other controls field voltage. The speed control potentiometers for the work drive motor 36 are 7VR and 18VR controlling armature voltage and field voltage respectively. The speed control potentiometers for traverse motor 83 is 10VR—14VR controlling armature voltage and field voltage respectively. These potentiometers are connected to the control circuit of the electronic equipment by transfer relay TRR. When energized relay TRR inserts traverse motor 83 potentiometers 10VR—14VR into the speed control circuit and when deenergized inserts work drive motor 36 speed control potentiometers 7VR—18VR into control circuit. Motors 36 and 83 are connected alternately to the direct current output of tubes 1, 2 and 3 by relays A and B (Fig. 45), when relay A is energized, motor 36 is connected and when relay B is energized motor 83 is connected.

A separately controlled jogging speed is available for the work drive motor 36 as determined by the setting of potentiometer 9VR. This potentiometer is inserted into the control circuit by energizing relay JR, thus adjusting the speed of motor 36 to the setting of potentiometer 9VR.

Work motor—Slow down

Work drive motor 36 includes a slow down speed control for positioning of the pot chucks 31 and 32 in an upright position to facilitate loading and unloading. When the running speed with potentiometers 7VR—18VR controlling motor speed is interrupted by the retracting of both the left hand and right hand wheel slides, a slow down resistor SDR is shunted across the armature of the motor by energizing relay SD. Relay LV is also energized at the same time. The motor decelerates to a pre-set slow down speed determined by potentiometers 8VR—15VR. The drop-out voltage of relay LV is adjusted so that relay LV will become deenergized at an armature voltage slightly above that determined by the slow down speed potentiometers. A contact of relay LV when deenergized inserts limit switch LS9 into the positioning circuit. LS9 is controlled by the work positioning mechanism and is actuated until the depression of the work stop cam 205 is reached at which point LS9 energizes relay DB and thereby shunts dynamic braking resistor DBR across the armature of motor 36 and brakes the motor to a positioned stop and thereby positions pot chucks 31 and 32 in an upright position.

Wheel traverse motor—Slow down

Wheel traverse motor 83 is connected with a slow down speed control for positioning the grinding wheels 61 and 63 relative to the crankpins being ground. When the rapid traversing speed with potentiometers 10VR—17VR controlling the motor speed is interrupted by contacting slow down limit switch LS7, a slow down resistor SDR is shunted across the armature of the motor 83 by energizing relay SD. Relay LV is also energized at the same time. The motor 83 decelerates to a pre-set slow down speed determined by potentiometers 11VR—16VR. The drop-out voltage of relay LV is adjusted so that the relay LV will become deenergized at an armature voltage slightly above that determined by the slow speed potentiometers 11VR—16VR. A contact of relay LV when deenergized inserts limit switch LS10 into the circuit, LS10 is controlled by the traverse positioning mechanism and is actuated until one of the depressions 92a of the traverse cam 92 is reached at which point LS10 energizes relay DB and therefore shunts dynamic braking resistor DBR across the armature of motor 83 and brakes the motor to a positioned stop and thereby positions grinding wheels 61 and 63 relative to the crankpins being ground.

Relays SC and SC1 are transfer relays to change from the running speed on either motors 36 and 83 to the slow down speed. When energized either motor 36 or 83 will run at running speed. Interlock C is closed to traverse motor 83 in inner pins direction. Interlock D is closed to traverse motor 83 in outer pins direction. Interlock E is closed to rotate work drive motor 36.

Line contactor F when energized runs either the work drive motor 36 or the traverse drive motor 83 in the inner pins direction whichever is selected by relays E or C. Line contactor R when energized runs traverse drive motor 83 in outer pins direction. Limit switch LS34 is an overtravel switch which prevents wheel slides from overtraveling in the inner pins position and when traversing to the change wheels position. Limit switch LS4 is a limit switch which prevents overtravel in the outer pins position. Interlock CR1 is closed when wheel slides are manually moved to extreme rearward position. This allows wheel slides to be traversed beyond the outer pins position to the change wheels position. Interlock CR23 is closed when both line contactors F and R are deenergized, Fig. 46. This provides a time delay between the deenergizing of F and energizing of R or vice versa when reversing traverse motor 83. Interlock JR is closed when jogging of work drive motor 36, thus providing a quick response as JR is connected direct to line contactor F.

Relays BC and BC1 are traverse motor 83 circuit selecting relays. When energized traverse motor circuits are inter-connected with the electronic equipment. Relay TRR is a transfer relay to select the proper control potentiometers for either the work drive or traverse drive motors energized to select traverse motor potentiometers. Relay C when energized runs traverse motor in inner pins position. Relay D when energized runs traverse motor in outer pins position. The tripping of either overload interlocks AOL or BOL due to the overloading of either motors 36 or 83 will stop motors 36 and 83 and deenergize the master cycle control thereby lowering the steadyrest and retracting the left hand and right hand wheel slides.

Timer relay, Fig. 47, when timing out after a proper warm-up period for the electronic tubes closes interlock TR, Fig. 45, thereby allowing the field rectifier tubes to fire and placing field voltage on the shunt fields of motors 36 and 83. Shunt field voltage on motors 36 and 83 energizes field failure relay FLR, Fig. 45, and closes FLR interlock, Fig. 47, and allows work drive, wheel drive and cycle to function. Loss of field on motors 36 or 83 will deenergize relay FLR and shut down motors 36 and 83, lower steadyrest and retract left hand and right hand wheel slides. The closing of interlock FLR, Fig. 47, also lights amber light 535 indicating that "Thy-mo-trol" is on and motors 36 and 83 and cycle are ready to function.

Limit switch LS1, Fig. 48, controlled by lateral motion of right hand control lever 465a, Fig. 18, selects either the work drive motor 36 or traverse drive motor 83 circuits. Relay CL is a current limit transfer relay which selects the proper current limit adjustment of the electronic motor energized to select current limit circuit for work drive motor 36. Relays AC and AC1 are transfer relays which select control circuits for motors 36 or motors 83 energized to connect work drive motor circuits with electronic equipment. Relay CRX is a jogging relay which when deenergized allows work to be jogged with jog button 409. Relay JR is a jogging relay which when energized jogs work. Interlocks CRS7 and CRS8 are closed when steadyrests are in down position, thus allowing work to be jogged with steadyrest lowered and preventing jogging with steadyrest raised unless CR15 and CR16 are closed which is the case when the steadyrests are raised and contacting the pins of the crankshaft. In general this interlocking of CRS7 and CRS8 with CR15 and CR16 prevents operator from jogging with the steadyrest raised and the crankshaft not properly indexed in the work holders. If the crankshaft is not properly positioned or rotated in the work holders corresponding to the lateral positioning of the wheel slides, rotation of the work will cause the crankpins in question to revolve around and crash into the steadyrest. Interlock CR29 is open when the truing bar 515 is in the work holders. This prevents rotation of the work holders with the truing bar 515 in place. The switches LS2 and LS3 and interlocks CR2 and CR3 respectively are closed when the left hand and right hand wheel slides respectively move forward. Closing of these interlocks energizes relay E which is an auxiliary relay for starting the work drive motor 36. Retraction of the left hand and right hand wheel slides opens the limit switches LS2 and LS3 and the interlocks CR2 and CR3 and thereby causing the work to position to a stop. Interlock CR6 is open when the cycle stop button 407 is pressed thereby preventing rotation of the work. Interlocks CRS20 and CR19 are open when the work holders are unclamped. This prevents rotating the work when it is not clamped and thereby dumping the crank into the machine. Interlock CR22 is open when the hydraulic pressure for the work clamps is insufficient so as to prevent rotation of the work. Interlocks CR13 and CR20 are closed when the right hand and left hand main control levers 465 and 480 respectively are moved to the wheel head forward positions. Interlock CRX is closed with the work selector switch 408 on hand. Therefore if the operator fails to turn the work selector switch 408 from hand to automatic and brings either wheel head forward, a red indicating light 536 is lighted indicating that the work is not rotating thereby preventing grinding a flat on the crankpin. Limit switch LS5 is closed by moving the right hand main control lever 465a to inner pins traverse position. Limit switch LS6 is closed by moving right hand main control lever laterally to outer pins traverse position. LS7 is a slow down limit switch operated by dogs 446, 449 and 450 (Fig. 35) to initiate slow down positioning cycle for the change wheels position, outer pins position or inner pins position respectively of wheels 61 and 63. Interlocks CRS4 and CRS3 are open when the right hand and left hand wheel dressers respectively are operating. This prevents lateral traversing of wheels 61 and 63 while wheel dressers are operating. CR3 and CR2 interlocks are open with the right hand and left hand wheel slides forward. These prevent traversing of wheels 61 and 63 in the forward position. Before traversing wheels 61 and 63 must be retracted to clear cheeks of crankshaft. Interlock CR9 is open when work holders are not positioned in loading and unloading positions. Crankshaft must be positioned in the loading or unloading positions before wheels 61 and 63 can traverse laterally. Interlock CR29 is open when truing bar 515 is placed in the work holders thus preventing traversing with truing bar in place.

Relay CR24 is a control relay to insure proper sequence of operation between relays SD, LV, and DB. When relay SC is deenergized to change from running speed to slow down speed on either motors 36 or 83, both relays LV and relays CR24 are energized at the same time. The closing of CR24 contact energizes relay SD thereby shunting slow down resistor SDR across the armature of either motor 36 or 83. When the motor slows down to slightly above the pre-set slow down speed, interlock LV closes and either limit switches LS9 or LS10 are closed by the positioning cams, relay DB is energized and shunts dynamic braking resistor DBR across the armature of either motors 36 or 83 thereby dynamic braking motors 36 or 83 to a stop. Interlock CR34 is closed when overtravel limit switches LS4 or LS34 are actuated thereby giving an instantaneous dynamic braking on overtravel.

As the adjusted pick-up voltage of relay LV may be above that obtained when motors 36 or 83 are operating at the running speed, it will be necessary to add relay LVR which instantaneously places full armature voltage on relay LV to insure that it picks up properly.

Red indicating light 537 is lighted when either overtravel limit switches LS4 or LS34 are actuated to indicate to machine operator that wheels 61 and 63 have overtraversed. Interlock CR6 is closed when cycle start button is pressed. Interlock DC10 is closed with right hand main control lever in wheel head traverse position. Interlock CR29 is closed with truing bar mounted in work holders. Red indicating light 538 will therefore light when operator attempts to either start the cycle or traverse the wheel heads when the truing bar is mounted in the work holders. Indicating light 538 instructs operator to remove wheel truing device.

Interlock DC1 is closed with the right hand main control lever in wheel head traverse position. Interlocks CR2 and CR3 are closed with left hand wheel slide and right hand wheel slide respectively in forward position. Therefore red light 539 will light when operator attempts to laterally traverse wheels 61 and 63 when wheels are not retracted. Light 539 informs operator that wheel slides are not retracted when attempting to traverse.

Limit switch LS8 is closed with wheels 61 and 63 positioned in inner pins position. Relay CR8 is therefore energized in this position.

Limit switch LS31 is closed with wheels 61 and 63 in outer pins position. Relay CR7 is therefore energized with wheels in this position.

Interlocks CR13 and CR20 are closed if the right hand and left hand main control levers respectively are moved into the wheel head forward positions. Interlocks CR7 and CR8 are closed when wheels 61 and 63 are traversed to a position between the inner pins position and the outer pins position. The red indicating light number 540 will therefore light and instruct the operator to index the wheels correctly if he should attempt to bring either wheel slide forward when numbers 61 and 63 are in neither the inner pins position nor the outer pins position. Interlock CR10 is closed when the follower 93a on the traverse motor positioning cam 92 is not in the depression of the cam 92. Therefore light 540 will also indicate when the operator attempts to bring either wheel slide forward and wheels 61 and 63 are not positioned accurately.

Control relay CR6 is the master cycle control relay. When deenergized, green indicating light number 541 is lighted and indicates that the cycle is off. Interlocks of relay CR6 are distributed throughout the electrical circuits in such a manner that, if the cycle stop button 407 is pressed, both the right hand and left hand wheels will retract, steadyrests will be lowered and the work drive motor 36 will stop.

Interlock CR29 automatically stops the cycle as described in the previous paragraph when the truing bar 515 is placed in the work holders.

Relay CR19 when energized energizes solenoid number 12 which clamps left hand work holder. Relay CRS20 when energized energizes solenoid 19 to clamp right hand work holder.

Relay CR18 energizes solenoid number 11 to unclamp left hand work holder. Relay CRS19 when deenergized energizes solenoid number 20 to unclamp right hand work holder.

If the work is clamped and solenoid 11 and solenoid 12 are deenergized the left hand work holder will remain clamped. Likewise if the work is clamped and solenoid number 19 and solenoid number 20 are deenergized the work will remain clamped.

Interlock CR22 will open when the hydraulic pressure to either the left hand or the right hand work clamps becomes insufficient to hold or to clamp the work safely.

Interlock CR9 remains open until the follower 206 on the work positioning mechanism rides into the depression on the work positioning cam 205. As this follower 206 may ride into the work cam depression and out again during the slowdown portion of the deceleration period, it is necessary to add interlock DB1 which remains closed until the dynamic braking portion of the deceleration period is reached. Interlocks CR9 and DB1 therefore insure that the work is positioned correctly before the work holders can be unclamped.

Limit switch LS18 is actuated by the right hand main control lever 465 and provides clamping and unclamping of the left hand and right hand work holders.

Limit switch LS22 is opened when the hydraulic pressure to the left hand drops below a set value. Limit switch LS30 is opened when the hydraulic pressure for the right hand work clamp drops below a set value. Therefore control of relay CR22 is deenergized when the hydraulic pressure to either the left hand or the right hand work clamp becomes insufficient.

Red indicating light number 542 is lighted by interlock CR22 when the pressure in either the left hand or right hand work clamp becomes insufficient and indicates that the hydraulic clamping pressure is low.

Relay CRS7 when energized energizes solenoid 8 to raise steadyrests 210 and 211 for the outer pins. Relay CRS8 when energized energizes solenoid 7 to raise the steadyrests 212 and 213 for the two inner pins.

Interlocks CR13 and CR20 close when the right hand wheel 63 or left hand wheel 61 respectively are brought forward by either the left hand or the right hand main control levers. Interlock CR7 is closed with the wheel heads in the outer pins position. Therefore the steadyrests 210 and 211 for the outer pins would be raised if either wheel slide moves forward. Interlock CR8 closes with wheels 61 and 63 in the inner pins position. Therefore the steadyrests 212 and 213 for the inner pins will be raised when the wheels 61 and 63 move forward.

Interlock CR10 is open when the follower 93a on the traverse motor positioning mechanism is not in the depression of the traverse cam 92. Therefore neither the inner pin steadyrests 212 and 213 nor the outer pin steadyrests 210 and 211 can be raised if wheels 61 and 63 are not positioned accurately.

Limit switch LS15 closes when the steadyrests for the inner pins rise and contact the pins. Therefore relay CR15 is energized when the inner steadyrests 212 and 213 contact the inner pins.

Limit switch LS16 is closed when the steadyrests 210 and 211 for the outer pins rise and contact the pins. Therefore relay CR16 is energized when the outer steadyrests 210 and 211 contact the outer pins.

Interlocks CRS7 and CRS8 are closed when the outer steadyrests 210 and 211 or the inner steadyrests 212 and 213 respectively are raised. Interlocks CR13 and CR20 close when the right hand and left hand wheel slides respectively move forward. Interlocks CR15 and CR16 are closed until either the inner pins steadyrests 212 and 213 contact the inner pins or the outer pins steadyrests 210 and 211 contact the outer pins respectively. Therefore if the steadyrests are raised and do not contact the pins of the crankshaft due to the crankshaft not being indexed properly in the work holders or either the right hand or left hand main control lever is moved to the wheel head forward position, red indicating light 543 is lighted to indicate to the machine operator that the work is not indexed in the work holders correctly.

Interlock CR13 is closed when the right hand main control lever is moved to the wheel head forward position. LS24 closes when the right hand wheel 63 reaches the point in the forward motion where body feed is required. Solenoid 17 is then energized to change rate of feed from rapid to body feed.

Interlock CR20 is closed when the left hand main control lever is moved to the wheel head forward position. Limit switch LS25 closes at the point in the forward motion where body feed is required. Solenoid 18 is then energized to change left hand wheel feed from rapid to body feed.

Limit switch LS13 is closed momentarily with the right hand main control lever 465 in the wheel head forward position. This energizes relay CR13 and establishes a holding circuit through interlock CR13. Interlock CR9 is open if the follower 93a on the work positioning mechanism is not in the depression of the work cam 92 and therefore the right hand wheel head cannot move forward unless the work is positioned correctly. Relay CRS9 when energized energizes solenoid 9 to move the right hand wheel 63 forward. Interlocks CR15 and CR16 close when either the inner steadyrests 212 and 213 contact the inner pins or the outer steadyrests 210 and 211 contact the outer pins respectively. Therefore when the right hand main control lever 465 is moved to the wheel head forward position and the steadyrests are raised, the right hand wheel 63 will move forward when the steadyrests contact the inner or the outer pins of the crankshaft.

Limit switch LS14 is open with the right hand main control lever 465 in a wheel head stop position thus deenergizing relay CRS9 and stopping the wheel at any point in its forward motion if desired.

Limit switch LS17 is closed with the right hand main control lever 465 in the wheel head back position. This energizes relay CRS10 which energizes solenoid 10 to retract the right hand wheel slide.

When the work is ground to size, Foster gage contact closes energizing relay CRG1 which deenergizes forward motion solenoid 9 and energizes retract motion solenoid 10.

Interlocks CRS20 and CR19 are closed when the right hand and left hand work holders respectively are clamped. Therefore it will be necessary for the work to be clamped before the right hand wheel 63 can be moved forward.

Limit switch 35 is open with the wheel slides traversed laterally in the change wheels position. This prevents moving wheels 61 and 63 forward in this position and crashing into the work heads.

If the master cycle stop button 407 is pressed relay CR6 is deenergized which in turn deenergizes the forward motion solenoid 9 and energizes retract motion solenoid 10.

Interlock CR22 closes when the hydraulic clamping pressure to either the left hand or right hand work heads becomes insufficient. This energizes retract motion solenoid 10 to retract the right hand wheel 63.

Figure 50:
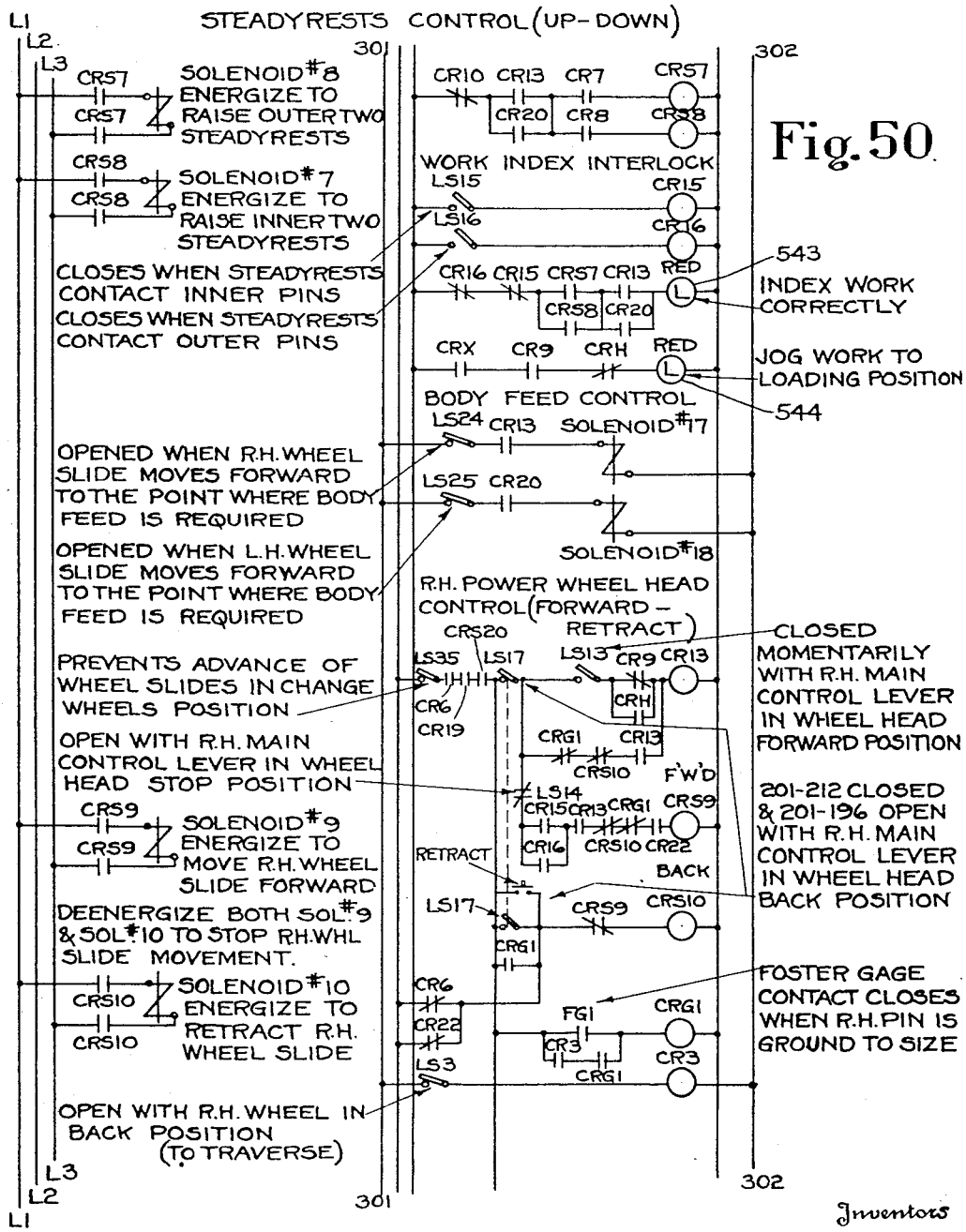
Figure 50A:
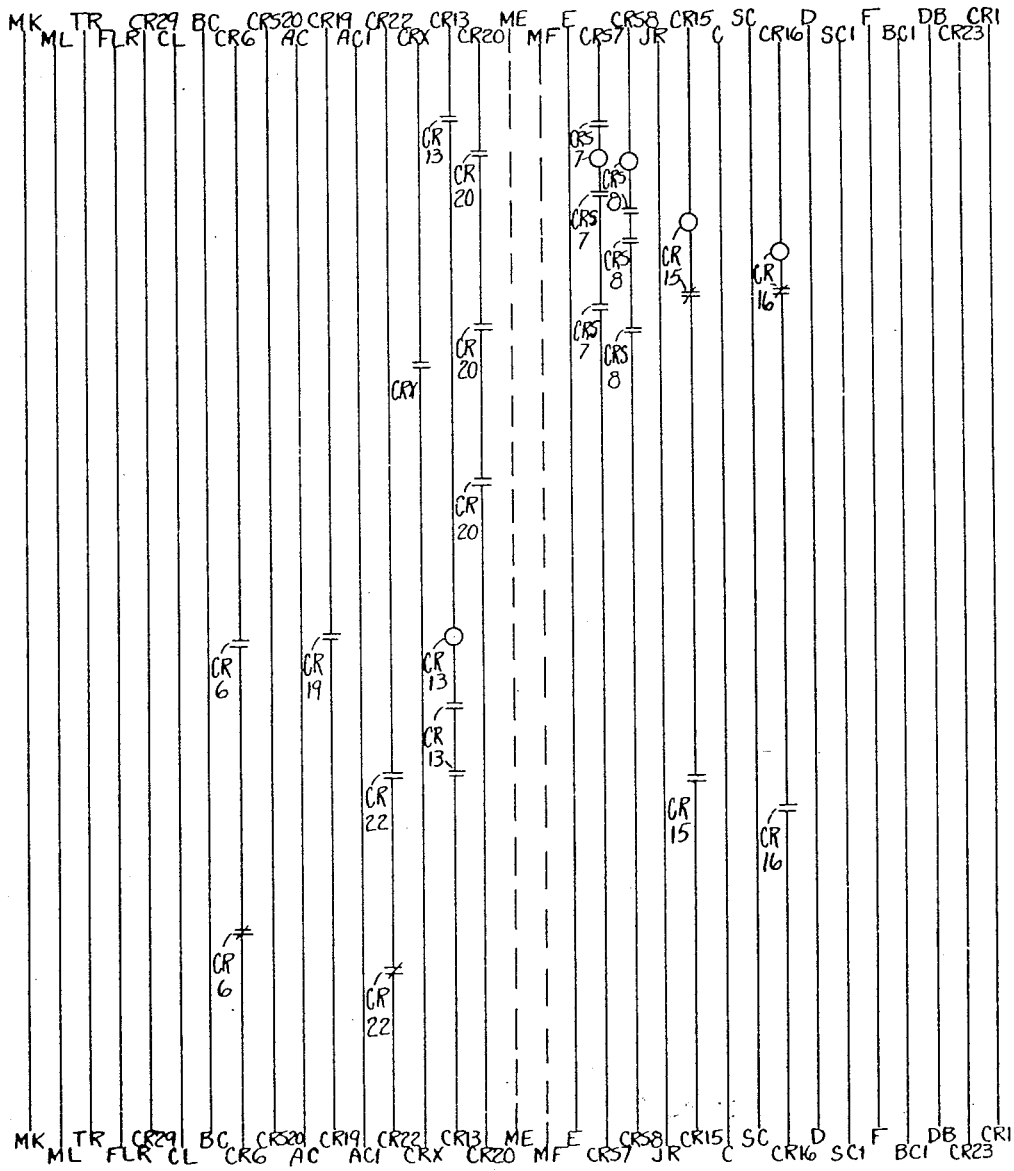
Figure 50B:
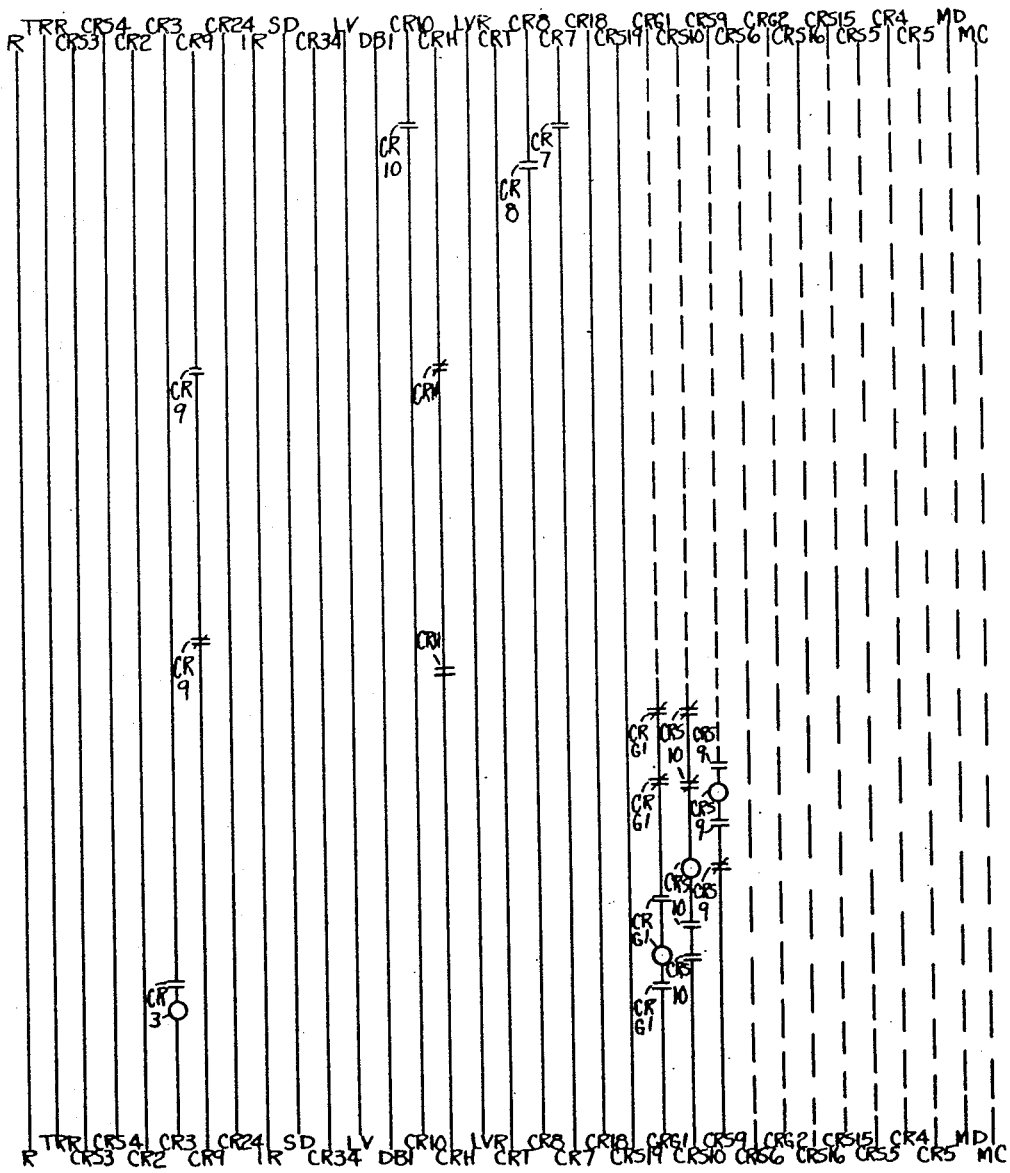
Figure 51A:
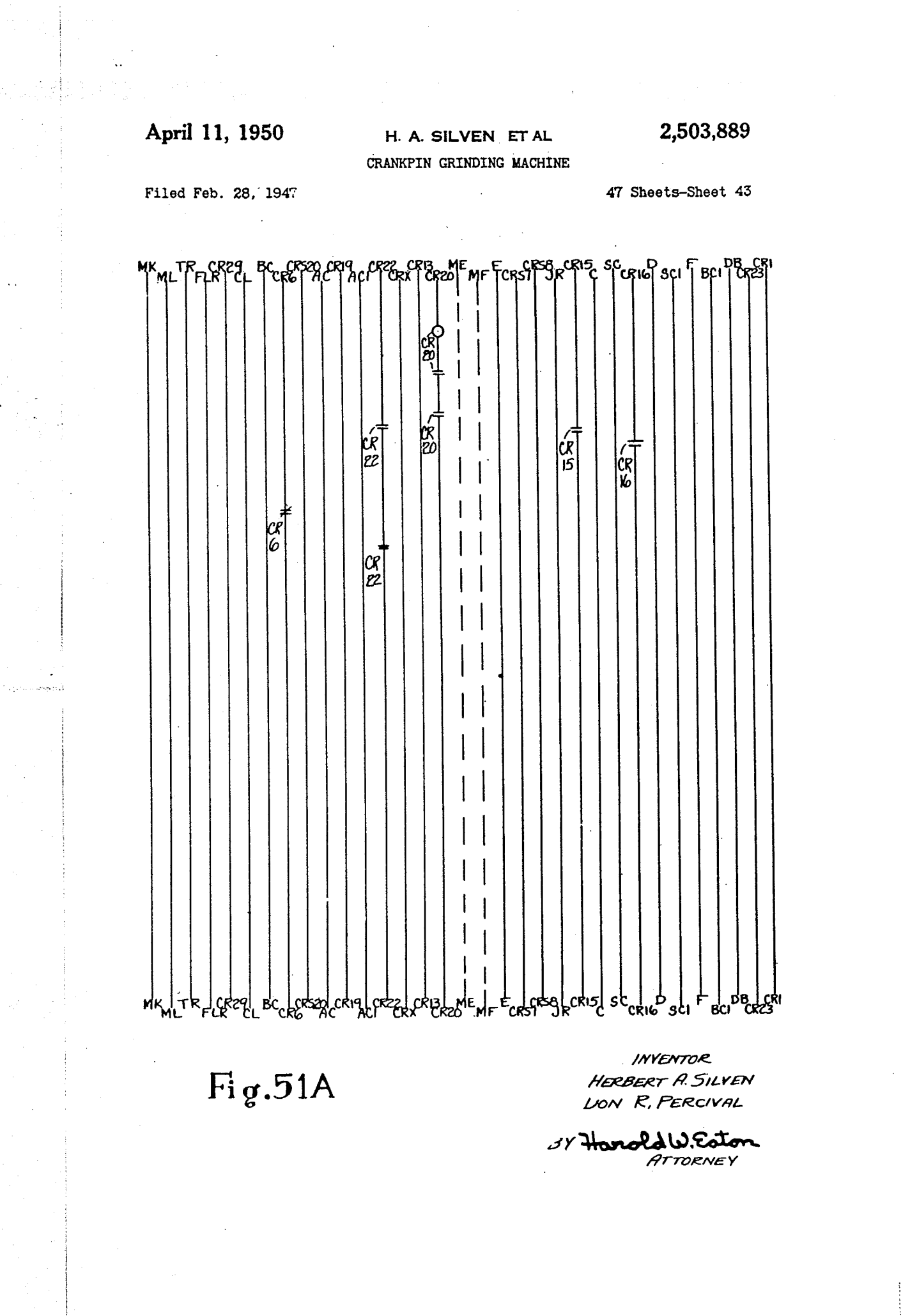
Figure 51B:
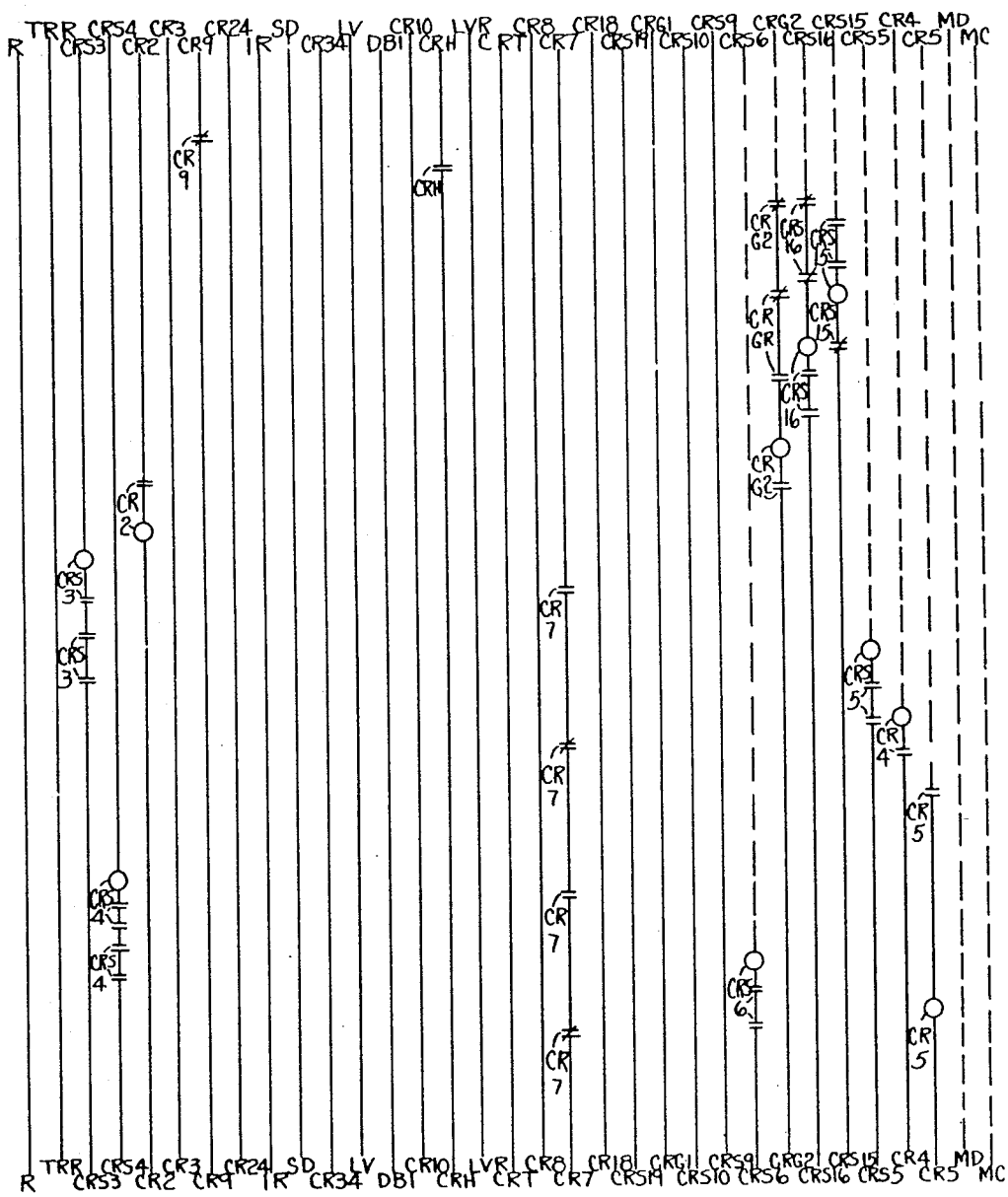
Figure 52:
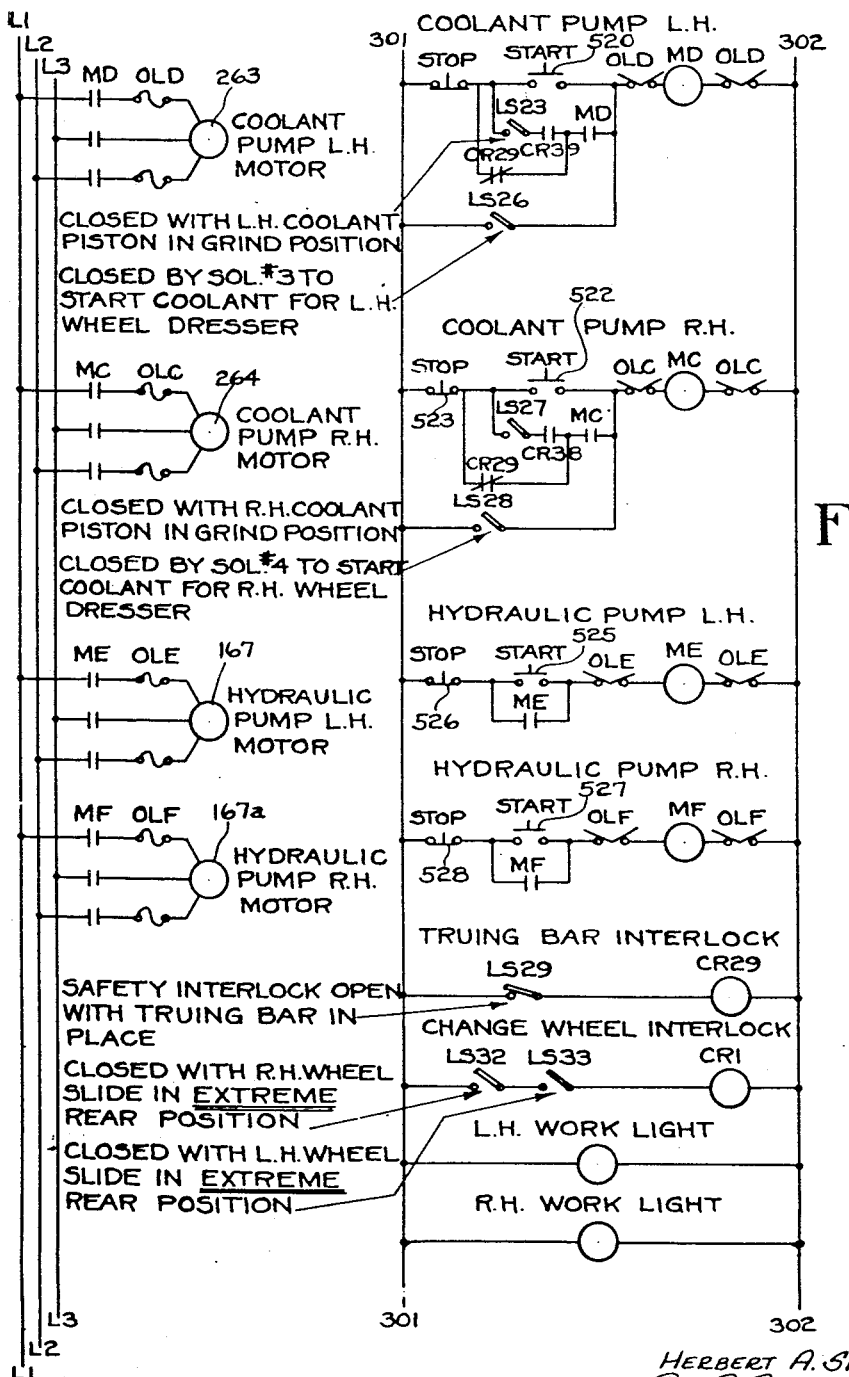
Figure 52A:
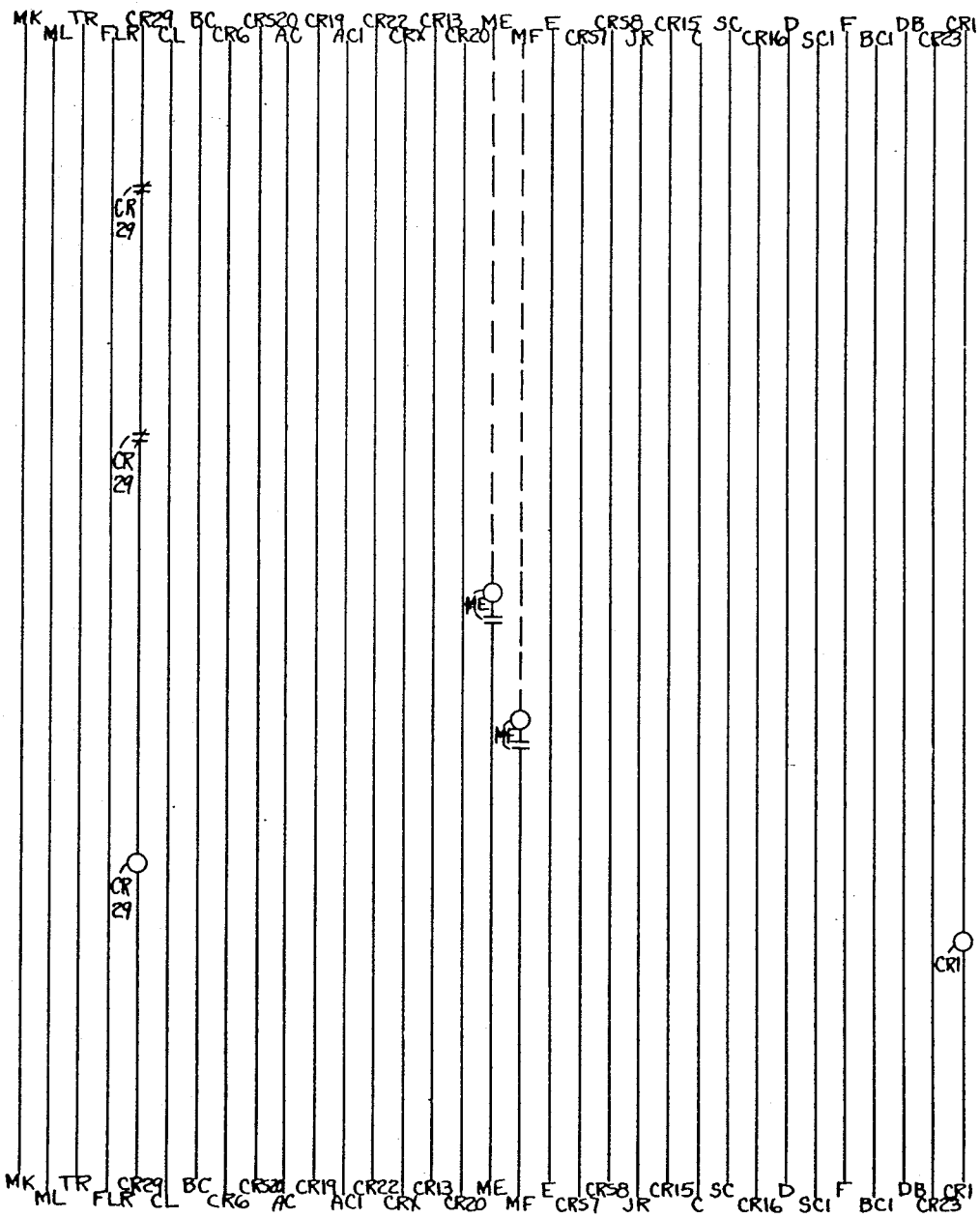
Figure 52B:
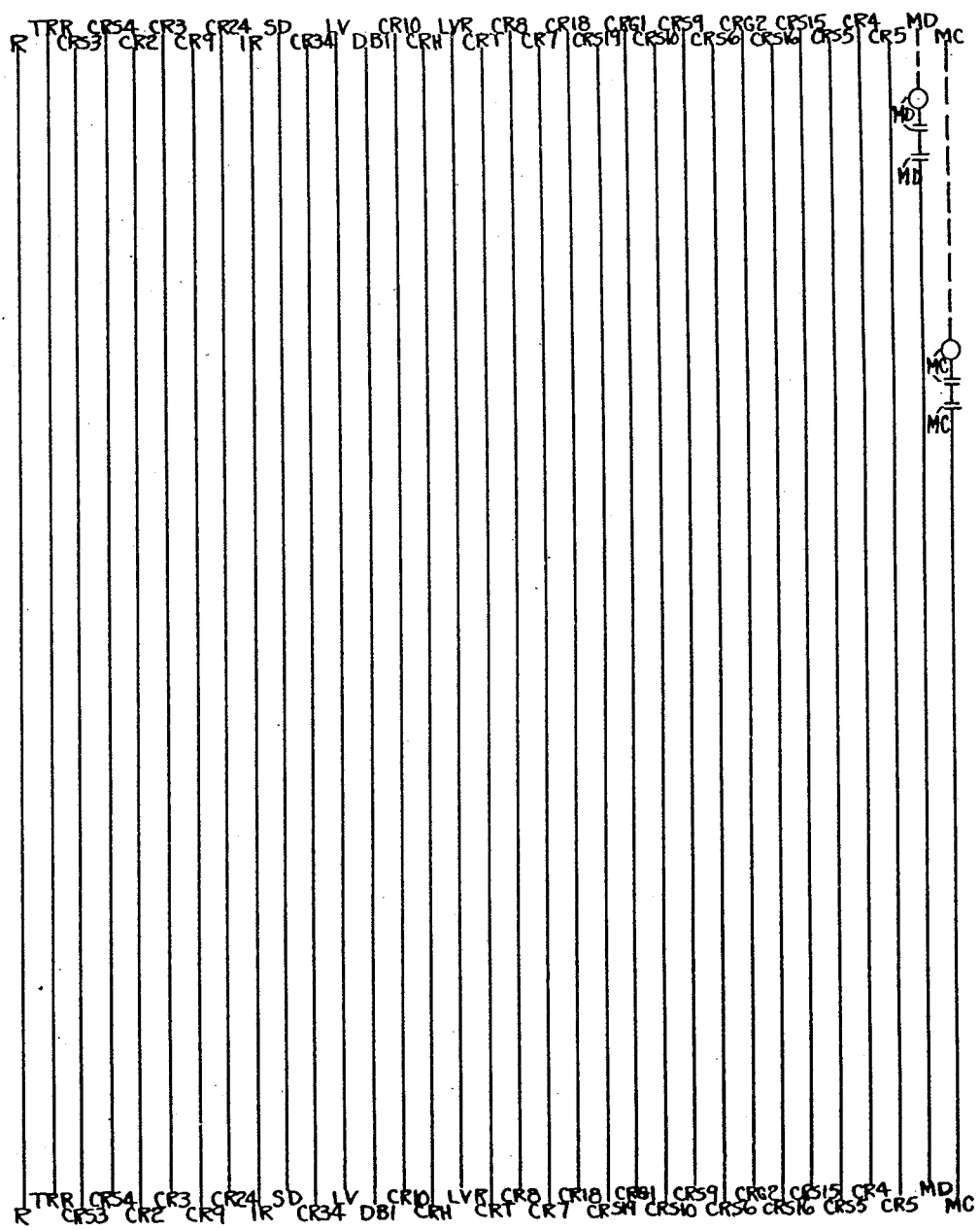

The left hand power wheel head control, Fig. 51, functions as described for the right hand wheel head control, Fig. 50.

Relay CRS3 when energized energizes solenoid number 3 to start the left hand wheel dresser operating. At the same time white indicating light 545 is lighted to indicate the dresser is operating. Interlock CR7 is closed when wheels 61 and 63 position in the outer pins position. Therefore when start button 405 is pressed the left hand wheel dresser will start operating providing the wheels are positioned laterally in the outer pins position. After the correct number of passes by the dresser have been made across the wheels limit switch LS11 is opened breaking the holding circuit of CRS3 and stopping the wheel dresser.

Relay CRS5 when energized energizes solenoid number 5 for one pick feed of the left hand wheel dresser. Interlock CRS3 is closed when the left hand wheel dresser is operating. Therefore when each time push button 345 is pressed one pick feed of the dresser will be attained providing the dresser is operating.

Interlock CR7 is closed when wheel heads 61 and 63 are in any position other than the outer pins position. Relay CR4 is therefore energized when interlock CR7 is closed and blue indicating light 546 instructs the operator to index laterally wheels 61 and 63 to the outer pins position when attempting to dress the wheels.

The functioning of the right hand wheel dresser Figure 51 is identical with that described for the left hand wheel dresser Figure 51.

Contactor MD and overload relays OLD are elements of a standard magnetic across the line type starter operating left hand coolant pump motor 263.

Limit switch LS23 is closed with the left hand coolant piston in the grind position. Limit interlock CR2 is closed when the left hand wheel 61 moves forward. When grinding the coolant will start when start push botton 520 is pressed when the left hand wheel 61 moves forward and will stop automatically when wheel 61 retracts. Interlock CR29 is closed when the truing bar 515 is mounted in the work holders. This allows manual control of the coolant through push buttons 520 and 521 when truing the sides of the wheels.

LS26 is closed when solenoid number 3 is energized and automatically starts coolant when left hand wheel dresser is operating.

Right hand coolant pump motor 264 Figure 52 is as described above for left hand coolant pump motor 263 Figure 52.

Contacter ME and overload relays OLE are elements of a standard magnetic across the line type starter controlling left hand hydraulic pump motor 167. This starter is operated by push buttons 526 and 525.

Contacter MF and overload relays OLF are elements of a standard magnetic across the line type starter controlling right hand hydraulic pump motor 167a. This starter is operated by push buttons 527 and 528.

Limit switch LS29 is opened with the truing bar in place in the work holders thereby deenergizing relay CR29. Interlocks of relays CR29 are distributed throughout the various circuits as described previously to prevent the work from rotating, to prevent the steadyrests from rising, to prevent the wheels 61 and 63 from moving forward and to prevent wheels 61 and 63 from traversing laterally.

Limit switch LS32 is closed by the cam 179 when the right hand wheel slide 55 is moved manually to the extreme rear position. Limit switch LS33 is closed when the left hand wheel slide 54 is moved manually to the extreme rear position. Therefore with both wheel slides in the extreme rear position, relay CR1 is energized. Interlock CR1, Figure 48, as described previously then shorts out outer pins overtravel limit switch LS4 and allows wheels 61 and 63 to be traversed laterally to the change wheels position.

It will thus be seen that there has been provided by this invention a grinding machine in which the various objects hereinabove set forth together with many thoroughly practical advantages are successfully achieved. As many possible embodiments may be made of the above invention and as many changes might be made in the embodiment above set forth, it is to be understood that all matter hereinbefore set forth or shown in the accompanying drawings is to be interpreted as illustrative and not in a limiting sense.

We claim:

1. In a crankpin grinding machine having a rotatable grinding wheel, a transversely movable wheel slide therefor, a feeding mechanism to feed said slide transversely, a rotatable work support including a pair of opposed synchronously rotated pot chucks to support a crankshaft to be ground, means including an electric motor synchronously to rotate said pot chucks, means to traverse said wheel slides longitudinally precisely to index and position the grinding wheel relative to crankpins to be ground, means including an electric motor for driving said traverse mechanism, a single electronic control unit for controlling both of said motors, and means including an automatically actuated transfer switch which is arranged to connect said control unit to operate and control one or the other of said motors.

2. In a crankpin grinding machine having a base, a rotatable crankshaft support, a pair of spaced rotatable grinding wheels, means to feed said wheels transversely to grind a pair of aligned crankpins to a predetermined size and to index said wheels longitudinally successfully to position said wheels relative to pairs of crankpins to be ground, independently controlled feeding mechanisms for each of said wheels, an electrically controlled index mechanism simultaneously to index said grinding wheels longitudinally in opposite directions precisely to position said wheels relative to successive pairs of crankpins to be ground, means including an electric motor to rotate said crankshaft, means including an electric motor to actuate said longitudinal indexing mechanism, an electronic control device to control both of said motors, and a transfer switch to connect said control device with one or the other of said motors.

3. In a crankpin grinding machine as claimed in claim 1 in combination with the parts and features therein specified of a main control lever which is arranged to move in two directions, a guide plate having a cross-shaped slot to restrict the movement of said lever, a pair of limit switches actuated when said lever is moved to extreme positions in one direction to actuate said indexing mechanism so as to position the grinding wheels successively in predetermined grinding positions, and a plurality of limit switches which are actuated when the control lever is moved in the other direction to actuate the work clamping mechanism to clamp a crankshaft in said pot chucks and to actuate the wheel feeding mechanism to feed one of said grinding wheels toward and from the crankshaft to be ground.

4. In a crankpin grinding machine as claimed in claim 1 in combination with the parts and features therein specified of a main control lever which is movable in two directions, a guide plate having a cross-shaped slot to restrict the movement of said lever, a pair of limit switches actuated when said lever is moved to extreme positions in one position to actuate said indexing mechanism and position the grinding wheels successively in predetermined grinding positions, and a plurality of limit switches which are actuated when the control lever is moved in the other direction to actuate the clamping mechanism to clamp a crankshaft in said pot chucks and to actuate the feeding mechanism to feed one of the grinding wheels toward and from the crankshaft to be ground, a second main control lever which is movable in one direction, and a pair of limit switches actuated by said second lever to actuate the wheel feeding mechanism to feed the other grinding wheel toward and from the crankshaft to be ground.

5. In a crankpin grinding machine having a base, a pair of spaced rotatable grinding wheels, means to feed said wheels transversely to grind a pair of aligned crankpins to predetermined size and to index said wheels longitudinally successively to position said wheels relative to successive pairs of crankpins to be ground, independent electrically controlled feeding mechanisms for each of said wheels, electrically controlled indexing mechanism simultaneously to index said wheels longitudinally precisely to position said wheels relative to successive pairs of pins to be ground, and means including a pair of spaced pivotally mounted main control levers, one of said levers being arranged to control the transverse feeding movement of one of said grinding wheels, the other of said levers being arranged when moved in one direction to control the crankshaft clamping means and the transverse feeding mechanism for the other of said wheels and when moved in a second direction to control said longitudinal indexing movement of both of said wheels.

6. In a crankpin grinding machine having a base, a pair of spaced rotatable grinding wheels, a pair of spaced aligned pot chucks to support and rotate the opposite ends of a crankshaft, electrically controlled hydraulic clamping means on said pot chucks, means including an electric motor synchronously to rotate said pot chucks, independent electrically controlled hydraulic feeding mechanisms to feed each of said wheels toward and from the crankshaft to be ground, means including a pair of limit switches for controlling each of said feeding mechanisms, means including an electric motor simultaneously to index both of said grinding wheels longitudinally to position said wheels opposite a pair of aligned crankpins to be ground, means including a limit switch actuated by the forward feeding movement of said grinding wheels to start said pot chuck driving motor to rotate said chucks, a pair of spaced pivotally mounted main control levers, one of said levers being arranged when moved in one direction to actuate one of said pairs of limit switches to control one of the feeding mechanisms, and the other controlling lever being arranged when moved in one direction to control the motor driven carriage indexing mechanism and when moved in a second direction to actuate a plurality of limit switches which are arranged to actuate the clamping means and to actuate the other of said wheel feeding mechanisms.

7. In a crankpin grinding machine as claimed in claim 6 in combination with the parts and features therein specified of an independent solenoid actuated valve for controlling the feeding movement of each of said wheels, a solenoid actuated cam controlled limit switch to control the stopping and starting of the pot chuck driving motor, a pair of steadyrests for steadying aligned crankpins to be ground, a hydraulic piston and cylinder to move the steadyrests to and from an operative position, a solenoid valve to control the movement of said steadyrests, an independent coolant system to supply coolant fluid for each of said grinding wheels, and means including limit switches actuated by the rearward movement of said grinding wheels to actuate said solenoid valves to stop the pot chuck driving motor, to lower the steadyrests to an inoperative position and to shut off the flow of coolant fluid to both of said grinding wheels when both of the wheel slides reach rearward inoperative positions.

8. In a crankpin grinding machine as claimed in claim 6 in combination with the parts and features therein specified of a main control lever operatively connected to control the movement of one of the grinding wheels toward and from the crankpin being ground, a second main control lever for controlling the feeding movement of the other grinding wheel and to actuate the clamping mechanism, means including a limit switch actuated by and in timed relation with the feeding movement of the grinding wheels to start the pot chuck driving motor, and limit switches actuated by movement of both of the grinding wheels to a rearward or inoperative position to stop the rotation of the pot chuck driving motor, said second main control lever being arranged to unclamp the pot chucks, said control levers being arranged so that they may be moved independently or simultaneously as desired.

9. In a crankpin grinding machine having a pair of spaced rotatable grinding wheels, a pair of spaced transversely movable wheel slides to support said wheels, an independent cylinder and piston to feed each of said slides, an independent solenoid control valve for each of said cylinders, opposed aligned pot chucks to support and rotate a crankshaft to be ground, an electric motor synchronously to rotate said pot chucks, a solenoid actuated cam controlled limit switch to start and stop said motor, a pair of independent steadyrests for steadying a pair of aligned crankpins being ground, an independent piston and cylinder to move said steadyrests to and from an operative position, an independent solenoid valve to control the admission to and exhaust of fluid from said cylinders, a coolant system including a control valve to supply coolant fluid to said grinding wheels, a hydraulic piston and cylinder to open and close said valve, a solenoid valve to control the admission to and exhaust of fluid from said cylinder, a pair of main control levers, limit switches actuated thereby to initiate a grinding cycle, and a cycle stop switch which is operatively connected to effect a rearward movement of both of the wheel slides, to stop the pot chuck driving motor, to move the steadyrests to an inoperative position, and to shut off the coolant fluid.

10. In a crankpin grinding machine having a pair of spaced rotatable grinding wheels, a pair of spaced transversely movable wheel slides to support said wheels, an independent cylinder and piston to feed each of said slides, an independent solenoid control valve for each of said cylinders, opposed aligned pot chucks to support and rotate a crankshaft to be ground, an electric motor synchronously to rotate said pot chucks, a solenoid actuated cam controlled limit switch to start and stop said motor, a pair of independent steadyrests for steadying a pair of aligned crankpins being ground, an independent piston and cylinder to move said steadyrests to and from an operative position, an independent solenoid valve to control the admission to and exhaust of fluid from said cylinders, a coolant system including a control valve to supply coolant fluid to said grinding wheels, a hydraulic piston and cylinder to open and close said valve, a solenoid valve to control the admission to and exhaust of fluid from said cylinder, a pair of main control levers, limit switches actuated thereby to initiate a grinding cycle, a cycle stop switch which is operatively connected to effect a rearward movement of both of the wheel slides, to stop the pot chuck driving motor, to move the steadyrests to an inoperative position, and to shut-off the coolant fluid, and means including a cycle reset switch to render said mechanism operative for the next grinding cycle.

11. In a crankpin grinding machine having a base, a pair of spaced rotatable grinding wheels, a pair of spaced transversely movable slides therefor, a pair of spaced longitudinally traversable carriages to support said slides, independent feeding mechanisms to feed each of said slides, a traversing mechanism including aligned positively rotated right and left hand nut and screw mechanisms simultaneously to index said carriages longitudinally in opposite directions, and adjustable connections between said screws to facilitate adjustment of one screw relative to the other so as to facilitate relative longitudinal adjustment of said carriages and grinding wheels.

12. In a crankpin grinding machine having a rotatable grinding wheel, a transversely movable wheel slide therefor, a longitudinally movable carriage to support said wheel slide, opposed aligned pot chucks to support and rotate a crankshaft to be ground, means including an electric motor synchronously to rotate said pot chucks, a piston and cylinder mechanism to feed said slide transversely, a solenoid valve to control the admission to and exhaust of fluid from said cylinder to cause either a forward or rearward movement of the wheel slide, means including an electric motor to index said carriage longitudinally precisely to position the grinding wheel relative to successive crankpins to be ground, a pivotally mounted control lever, means including a cross-shaped slot to restrict the movement of said control lever, a pair of limit switches actuated by a transverse movement of said control lever to actuate said solenoid valve, and a pair of limit switches actuated by a longitudinal movement of said lever to start said carriage indexing motor so as to index the grinding wheel longitudinally relative to the crankshaft being ground.

13. In a crank pin grinding machine having a rotatable grinding wheel, a transversely movable wheel slide therefor, a longitudinally movable carriage to support said wheel slide, opposed aligned rotatable pot chucks to support and rotate a crankshaft to be ground, means including an electric motor synchronously to rotate said pot chucks, a piston and cylinder to feed said slide transversely, a solenoid valve to control the admission to and exhaust of fluid from said cylinder to cause either a forward or rearward movement of the wheel slide, a wheel indexing mechanism including an electric motor to index said carriage longitudinally precisely to position the grinding wheel relative to successive crankpins to be ground, a pivotally mounted main control lever, an apron to support said lever having a cross-shaped slot to restrict the movement of said control lever, a pair of limit switches actuated by a transverse movement of said control lever to actuate said solenoid valve to control the infeeding movement of said grinding wheel, a pair of limit switches actuated by a longitudinal movement of said lever to start said carriage indexing motor so as to index the grinding wheel longitudinally, and means including a switch actuated by and in timed relation with the transverse movement of the wheel slide to start and stop the pot chuck driving motor.

14. In a crankpin grinding machine as claimed in claim 13, in combination with the parts and features therein specified of a double solenoid actuated valve for controlling the flow of fluid to and from each of the grinding wheel feed cylinders, said control valves being arranged to assume a central or neutral position when both of the solenoids are deenergized, the main control levers being arranged to actuate limit switches to energize one of the solenoids on each of the feed valves to initiate an infeeding movement of the grinding wheels, and means actuated by the main control levers to deenergize said solenoids at any time during the grinding cycle so as to stop either or both of the wheel slides during either a forward or rearward feeding movement that interferes with the grinding cycle.

15. In a crankpin grinding machine as claimed in claim 13, in combination with the parts and features therein specified of an independent double solenoid actuated valve for controlling the flow of fluid to and from each of the feed cylinders, said valves being arranged to assume a central or neutral position when both of the solenoids are deenergized, a pair of steadyrests to simultaneously support a pair of aligned pins during grinding, a fluid pressure piston and cylinder to move said steadyrests to and from an inoperative position, means including a solenoid actuated cam controlled limit switch to control the starting and stopping of the pot chuck driving motor, a selector switch to facilitate controlling the pot chuck driving motor automatically in the grinding cycle or to facilitate jogging the pot chucks for inspection, and means including a jogging push button switch to facilitate jogging the pot chuck driving motor when the selector switch is in a hand operated position.

16. In a crankpin grinding machine as claimed in claim 15, in combination with the parts and features therein specified of an independent double solenoid actuated valve for controlling the flow of fluid to and from each of the feed cylinders, said valves being arranged to assume a central or neutral position when both of the solenoids are deenergized, a pair of steadyrests to simultaneously support a pair of aligned pins during grinding, a fluid pressure piston and cylinder to move said steadyrests to and from an inoperative position, means including a solenoid actuated cam controlled limit switch to control the starting and stopping of the pot chuck driving motor, a main control lever, limit switches actuated thereby to control the wheel feed valve, said lever and switches being arranged so that the wheel slide may be stopped without lowering the steadyrests, a selector switch to facilitate controlling the pot chuck driving motor automatically in the grinding cycle or to facilitate jogging the pot chucks for inspection, and means including a jogging push button switch to facilitate jogging the pot chuck driving motor when the selector switch is in a hand operated position.

17. In a crankpin grinding machine having a rotatable grinding wheel, a transversely movable wheel slide therefor, a longitudinally movable carriage to support said wheel slide, opposed aligned rotatable pot chucks to support and rotate a crankshaft to be ground, means including an electric motor synchronously to rotate said pot chucks, a nut and screw feed mechanism to feed said slide transversely, a piston and cylinder to move said feed screw axially, a solenoid valve to control the admission to and exhaust of fluid from said cylinder to cause either a forward or rearward movement of the wheel slide, a wheel indexing mechanism including an electric motor to index said carriage longitudinally precisely to position the grinding wheel relative to successive crankpins to be ground, a pivotally mounted main control lever, an apron to support said lever having a cross-shaped slot to restrict the movement of said control lever, a pair of limit switches actuated by a transverse movement of said control lever to actuate said solenoid valve to control the infeeding movement of said grinding wheel, a pair of limit switches actuated by a longitudinal movement of said lever to start said carriage indexing motor so as to index the grinding wheel longitudinally, means including a switch actuated by and in timed relation with the transverse movement of the wheel slide to start and stop the pot chuck driving motor with the pot chuck in an upright position, and a dog on said feed screw to actuate said switch.

18. In a crankpin grinding machine having a rotatable grinding wheel, a transversely movable wheel slide therefor, a feeding mechanism to feed said slide transversely, a rotatable work support including a pair of opposed synchronously rotated pot chucks to support a crankshaft to be ground, means including an electric motor synchronously to rotate said pot chucks, a traverse mechanism to traverse said wheel slide longitudinally precisely to index and position the grinding wheel relative to crankpins to be ground, means including an electric motor for driving said traverse mechanism, a single electronic control unit for controlling both of said motors, means including an automatically actuated transfer switch which is arranged to connect said control unit to operate and control one or the other of said motors, means including a plurality of adjustable dogs and a limit switch to slow down the traverse motor before the grinding wheel reaches predetermined indexed positions, and means including a cam actuated limit switch to stop the traverse motor when the grinding wheels reach predetermined indexed positions.

19. In a crankpin grinding machine having a pair of spaced rotatable grinding wheels, a pair of spaced transversely movable wheel slides therefor, independent feeding mechanisms to feed said slides transversely, a rotatable work support including a pair of opposed aligned synchronously rotated pot chucks to support a crankshaft to be ground, means including an electric motor synchronously to rotate said pot chucks, a pair of spaced longitudinally movable carriages to support said wheel slides, means to traverse said wheel slides longitudinally precisely to index and position the grinding wheels relative to aligned pairs of crankpins to be ground, means including an electric motor to drive said traverse mechanism, a single electronic control unit for controlling both of said motors, means including an automatically actuated transfer switch which is arranged to connect said control unit to operate and control one or the other of said motors, means including a plurality of adjustable dogs which are moved by and in timed relation with one of said carriages and a limit switch actuated by said dogs to slow down the traverse motor to a preset slow-down speed before the grinding wheels reach predetermined indexed positions, and means including a cam actuated limit switch precisely to stop the traverse motor when the grinding wheels reached predetermined indexed positions.

20. In a crankpin grinding machine having a rotatable grinding wheel, a transversely movable grinding wheel slide therefor, a feeding mechanism for feeding said wheel slide toward and from the crankpin to be ground, opposed aligned pot chucks to support and rotate a crankshaft to be ground, means rotarily to index a crankshaft to position successive crankpins for grinding, a steadyrest which is movable to and from an operative position, an adjustable steadyrest shoe thereon, a pivotally mounted feeler on said steadyrest which is arranged to engage a crankpin to be ground, a limit switch actuated by said feeler, and operative connections between said limit switch and said wheel feeding mechanism to facilitate a forward feeding movement of the wheel slide only when the crankpin is in a predetermined indexed position.

21. In a crankpin grinding machine having a rotatable grinding wheel, a transversely movable grinding wheel slide therefor, a longitudinally movable carriage to support said slide, a feeding mechanism for feeding said slide toward and from the crankpin to be ground, opposed pot chucks to support and rotate a crankshaft to be ground, an electric motor synchronously to rotate said pot chucks, an interlock mechanism including a limit switch actuated by forward movement of the wheel slide to start said motor, means rotarily to index a crankshaft to position successive crankpins for grinding, a steadyrest which is movable to and from an operative position, an adjustable steadyrest shoe thereon, a pivotally mounted feeler on said steadyrest which is arranged to engage a crankpin to be ground, a limit switch actuated by said feeler, and operative connections between said limit switch and said wheel feeding mechanism to facilitate a forward feeding movement of the wheel slide and starting of the pot chuck driving motor only when the crankpin is in a predetermined indexed position.

22. In a crankpin grinding machine having a pair of spaced rotatable grinding wheels, a pair of spaced transversely movable wheel slides therefor, a pair of spaced longitudinally reciprocable carriages to support said wheel slides, an independent feeding mechanism for feeding each of the wheel slides toward and from the crankpin to be ground, opposed aligned pot chucks to support and rotate a crankshaft to be ground, an electric motor synchronously to rotate said pot chucks, an interlock mechanism including a limit switch actuated by the forward feeding movement of either of said wheel slides to start said pot chuck driving motor, means rotarily to index a crankshaft to position successive crankpins for grinding, a pair of spaced steadyrests which are movable to and from an operative position, a pivotally mounted feeler on one of said steadyrests which is arranged to engage a crankpin to be ground, a limit switch on said steadyrest actuated by said feeler, and operative connections between said limit switch and said wheel feeding mechanism to facilitate a forward feeding movement of said wheel slides and starting of the pot chuck driving motor only when the crankpin is in a predetermined indexed position.

23. In a crankpin grinding machine having a rotatable grinding wheel, a transversely movable grinding wheel slide therefor, opposed aligned rotatable pot chucks to support and rotate a crankshaft to be ground, means including an electric motor synchronously to rotate said pot chucks, a truing tool for truing the side faces of said grinding wheel which is arranged to be supported by said pot chucks during a truing operation, means to feed said slide to traverse the grinding wheel relative to the truing tool and means including a limit switch associated with one of the pot chucks which is actuated by the truing tool when it is supported by said pot chucks to render said work driving motor inoperative during a side truing operation.

24. In a crankpin grinding machine having a rotatable grinding wheel, a transversely movable grinding wheel slide therefor, opposed aligned rotatable pot chucks to support and rotate a crankshaft to be ground, means including an electric motor synchronously to rotate said pot chucks, a truing tool for truing the side faces of said grinding wheel which is arranged to be supported by said pot chucks during a truing operation, means to feed said slide to traverse the grinding wheel relative to the truing tool, a normally closed solenoid valve to obtain a slow traversing movement of the wheel slide during side truing in both directions, and means including a limit switch associated with one of said pot chucks which is actuated by the truing tool when it is supported by said pot chucks to render said pot chuck driving motor inoperative and to energize said solenoid valve during side truing operation so as to prevent rotation of the work driving motor and to facilitate a slow traverse of the wheel slide during the truing operation.

25. In a crankpin grinding machine having a rotatable grinding wheel, a transversely movable grinding wheel slide therefor, a longitudinally movable carriage to support said slide, opposed aligned rotatable pot chucks to support and rotate a crankshaft to be ground, a control valve for said pot chucks which is normally held in a central position, a solenoid to open said valve to pass fluid under pressure to said pot chucks to clamp a crankshaft therein, a solenoid to shift said valve to facilitate exhaust of fluid so as to unclamp pot chucks, and means including a pressure actuated switch to deenergize said first solenoid in case of fluid pressure failure.

26. In a crankpin grinding machine having a rotatable grinding wheel, a transversely movable wheel slide therefor, a longitudinally movable carriage to support said slide, opposed aligned rotatable pot chucks to support and rotate a crankshaft to be ground, a control valve for said pot chucks, a solenoid to open said valve to pass fluid under pressure to said pot chucks, and means including a pressure actuated switch to deenergize said solenoid in case of fluid pressure failure, said control valve being normally held in a central position when the solenoid is deenergized so as to trap fluid in the pot chuck cylinders.

27. In a crankpin grinding machine having a pair of opposed aligned rotatable pot chucks to support and rotate a crankshaft to be ground, a hydraulically actuated clamping jaw on each of said chucks, an independent motor driven fluid pump to supply fluid under pressure to each of said chucks, an independent solenoid control valve for each of said chucks, an independent pressure relief valve whereby the clamping pressure of said jaws may be independently adjusted, a main control lever, and a limit switch actuated thereby simultaneously to control said solenoid valves.

28. In a crankpin grinding machine having a rotatable grinding wheel, a transversely movable grinding wheel slide therefor, a longitudinally movable carriage to support said slide, opposed aligned rotatable pot chucks to support and rotate a crankshaft to be ground, a control valve for said pot chucks which is normally held in a central or neutral position, a pair of solenoids operatively connected to shift said control valve to admit fluid under pressure to either clamp or unclamp said pot chucks, an electric motor synchronously to rotate said pot chucks, and means including a cam actuated limit switch to stop said motor only when the pot chucks in an upright or loading position, said limit switch serving to prevent energizing the solenoid to shift the control valve to unclamp the pot chucks while the pot chucks are rotating.

29. In a crankpin grinding machine having a pair of spaced rotatable grinding wheels, a transversely movable slide for each of said wheels, a longitudinally movable carriage to support each of said slides, opposed aligned pot chucks to support and rotate a crankshaft to be ground, means rotarily to index a crankshaft to position successive pairs of crankpins for grinding, a plurality of pairs of steadyrests, one for each crankpin to be ground which are arranged to operate in pairs simultaneously to support and steady aligned crankpins, means including an independent piston and cylinder to move each of said steadyrests to and from an operative position, an independent solenoid actuated control valve to move each pair of steadyrests to and from an operative position, and means including electrical control switches operatively connected to stop the chuck driving motor and to move the steadyrests to an inoperative position only when both of the wheel slides reach an extreme rearward position.

30. In a crankpin grinding machine having a pair of spaced rotatable grinding wheels, a pair of independent spaced transversely movable wheel slides, a pair of spaced longitudinally movable carriages to support said slides, opposed aligned pot chucks to support and rotate a crankshaft to be ground, independent feeding mechanisms to feed said slides relatively toward and from a crankshaft to be ground, an index mechanism including an electric motor simultaneously to index said carriages in opposite directions successively to position said grinding wheels relative to pairs of aligned crankpins to be ground, and means including limit switches actuated by and in timed relation with the longitudinal indexing movement of said carriages automatically to slow down the movement of said carriages to a pre-set slow speed and thereafter to stop the carriages in precise indexed positions relative to the crankpins to be ground.

31. In a crankpin grinding machine having a pair of spaced rotatable grinding wheels, a pair of independent spaced transversely movable wheel slides, a pair of spaced longitudinally movable carriages to support said slides, opposed aligned pot chucks to support and rotate a crankshaft to be ground, independent feeding mechanisms to feed said slides relatively toward and from a crankshaft to be ground, an indexing mechanism including an electric motor simultaneously to index said carriages in opposite directions successively to position said grinding wheels relative to pairs of aligned crankpins to be ground, means including a solenoid actuated cam controlled limit switch to stop the carriage indexing motor, means including limit switches actuated by and in timed relation with the longitudinal indexing movement of said carriages automatically to slow down the movement of the carriages to a pre-set slow speed, and positioning switches automatically actuated by and in timed relation with the longitudinal indexing movement of the carriages to prevent energizing the solenoid valve to cause a forward feeding movement of the wheel slides until the carriages have been indexed to predetermined positions.

32. In a crankpin grinding machine having a rotatable grinding wheel, a transversely movable slide therefor, a longitudinally movable carriage to support said slide, opposed aligned pot chucks to support and rotate a crankshaft to be ground, a feeding mechanism to feed said slide relatively toward and from a crankshaft to be ground, an index mechanism including an electric motor to index said carriage successively to position the grinding wheel relative to crankpins to be ground, means including a solenoid actuated cam controlled limit switch to stop the carriage indexing motor, a solenoid actuated valve to control the feeding movement of said wheel slide, means including limit switches actuated by and in timed relation with the longitudinal indexing movement of the carriage automatically to slow down the movement of said carriage to a pre-set slow speed, and a positioning switch actuated by the longitudinal indexing movement of the carriage to stop the carriage in a precise indexed position relative to the crankpins to be ground.

33. In a crankpin grinding machine having a pair of spaced rotatable grinding wheels, a pair of independent spaced transversely movable wheel slides, a pair of spaced longitudinally movable carriages to support said slides, opposed aligned pot chucks to support and rotate a crankshaft having a plurality of pairs of aligned crankpins to be ground, and a carriage indexing mechanism including a nut and screw mechanism simultaneously to index said slides in opposite directions into either an inner pin or outer pin grinding position, an electric motor, frictional driving connections between said motor and said screw, means including a limit switch actuated by and in timed relation with the indexing movement automatically to slow down the movement of said carriage, a solenoid controlled cam actuated limit switch to start and stop said motor, means including a limit switch actuated by and in timed relation with the indexing movement automatically to slow down the movement of the carriage to a pre-set slow speed before it reaches indexed positions, a positioning switch to actuate said solenoid controlled cam actuated limit switch precisely to stop the carriages in an indexed position, and a mechanical safety stop positively to stop said carriages in case of failure of the electric switches.

34. In a crankpin grinding machine as claimed in claim 33, in combination with the parts and features therein specified, of a cam and a limit switch actuated by rearward movement of the wheel slide to facilitate by-passing the positioning switch, a main control lever, a switch actuated thereby which is connected to facilitate by-passing the outer pin slow down switch, a positioning switch to stop said carriage movement in change wheels position, a stop arm on one of said carriages and a pair of stop collars on the screw which are arranged positively to limit the indexing movement of the carriage.

35. In a crankpin grinding machine having a pair of spaced rotatable grinding wheels, a pair of independent spaced transversely movable wheel slides, a pair of spaced longitudinally movable carriages to support said slides, opposed aligned pot chucks to support and rotate a crankshaft to be ground, independent feeding mechanisms including a piston and cylinder to feed each of said slides relatively toward and from a crankshaft to be ground, an indexing mechanism including an electric motor simultaneously to index said carriages in opposite directions successively to position said grinding wheels relative to pairs of aligned crankpins to be ground, an independent electric work sizing gage on each of said wheel slides, means to support said gage so that it may be manually moved into operative engagement with a crankpin being ground, an independent solenoid valve actuated by each of said gages after a predetermined grinding operation to admit fluid under pressure to the feed cylinder to move the wheel slide to a rearward position and means including an independent piston and cylinder to move each of said gages to an inoperative position simultaneously with the rearward movement of the wheel slides.

36. In a crankpin grinding machine having a rotatable grinding wheel, a transversely movable wheel slide, opposed aligned pot chucks to support and rotate a crankshaft to be ground, a feeding mechanism including a piston and cylinder to feed said slide toward and from a crankpin to be ground, an electric work sizing gage on said wheel slide, means to support said gage so that it may be manually moved into operative engagement with a crankpin being ground, means including a piston and cylinder to remove said gage from the work, a solenoid valve actuated by said gage after a predetermined grinding operation to admit fluid under pressure to said latter cylinder to initiate movement of said gage to an inoperative position, and a port in said cylinder to by-pass fluid under pressure to a feed cylinder to cause a rearward movement of the grinding wheel after the gage has been removed out of engagement with the work.

37. In a crankpin grinding machine having a rotatable grinding wheel, a transversely movable wheel slide, opposed aligned pot chucks to support and rotate a crankshaft to be ground, a feeding mechanism including a piston and cylinder to feed said slide toward and from a crankpin to be ground, an electric work sizing gage on said wheel slide, means to support said gage so that it may be manually moved into operative engagement with a crankpin being ground, means including a piston and cylinder to remove said gage from the work, and a solenoid valve actuated by said gage after a predetermined grinding operation to admit fluid under pressure to the latter cylinder to initiate movement of said gage to an inoperative position, said latter piston and cylinder being arranged to initiate a slow rearward movement of the wheel slide and a simultaneous removal of the gage from the work.

38. In a crankpin grinding machine having a pair of spaced rotatable grinding wheels, a pair of independent spaced transversely movable wheel slides, a pair of spaced longitudinally movable carriages to support said slides, opposed aligned pot chucks to support and rotate a crankshaft to be ground, independent feeding mechanisms including a piston and cylinder to feed said slides relatively toward and from a crankshaft to be ground, independent control valves for each of said feeding mechanisms, a pair of independent solenoids for actuating each of said valves, a pair of independent manually controlled switches each arranged to energize one of said solenoids to shift said valve and thereby initiate an infeeding movement of said wheels, an electric work sizing gage on each of the wheel slides, means to support said gages so that they may be moved manually into operative engagement with crankpins to be ground, means including an independent piston and cylinder to remove each of said gages from the work, said gages being arranged to actuate said solenoids after a predetermined grinding operation to admit fluid under pressure to said latter cylinders to initiate movement of said gages to inoperative positions, and a port in said latter cylinders to by-pass fluid under pressure to the feed cylinders to cause a rearward movement of each of the grinding wheels simultaneous with removal of the gages from the work.

39. In a crankpin grinding machine having a pair of spaced rotatable grinding wheels, a pair of independent spaced transversely movable wheel slides, a pair of spaced longitudinally movable carriages to support said slides, opposed aligned pot chucks to support and rotate a crankshaft to be ground, independent feeding mechanisms to feed said slides relatively toward and from a crankshaft to be ground, an indexing mechanism including an electric motor simultaneously to index said carriages in opposite directions successively to position said grinding wheels relative to pairs of aligned crankpins to be ground, an electric work sizing gage on each of said wheel slides, means to support said gage so that it may be manually moved into operative engagement with a crankpin being ground, said gage serving to actuate said feeding mechanism when a crankpin has been ground to a predetermined size automatically to move the wheel slide to a rearward position, and automatic actuated means including a piston and cylinder to reset said gage after a grinding cycle has been completed.

40. In a crankpin grinding machine having a pair of spaced rotatable grinding wheels, a pair of spaced transversely movable wheel slides to support said wheels, a pair of longitudinally movable carriages to support said slides, means to feed said slides transversely, index means simultaneously to index said carriages longitudinally successively to position said grinding wheels in predetermined grinding positions, an independent rotatable longitudinal reciprocable truing tool to true the periphery of each of said wheels, independent manual means to initiate a truing operation on each of said grinding wheels, and an interlock mechanism to render said truing apparatus inoperative except when the grinding wheels are indexed to an outer or truing position.

41. In a crankpin grinding machine as claimed in claim 40, in combination with the parts and features therein specified of an independent nut and screw mechanism to feed said truing tools, an independent pawl and ratchet mechanism to actuate said nut and screw mechanisms, an electrically controlled hydraulically actuated mechanism to actuate said pawl and ratchet mechanism during a truing operation, a manually operable hand wheel to actuate said screw, and an adjustable pawl guard to adjust the effective stroke of said pawl, said guard serving to render said pawl inoperative so that the truing tool may be adjusted in either direction by manual rotation of the hand wheel to facilitate setting up the machine.

42. In a crankpin grinding machine having a pair of spaced rotatable grinding wheels, a pair of spaced transversely movable wheel slides to support said wheels, a pair of longitudinally movable carriages to support said slides, means to feed said slides transversely, indexing mechanism simultaneously to index said carriages longitudinally successively to position said grinding wheels in predetermined grinding positions, an independent rotatable longitudinally reciprocable truing tool to true the periphery of each of said wheels, an interlock mechanism to render said truing apparatus inoperative except when the grinding wheels are indexed to an outer pin or truing position, and an independent manual means including push button switches which are arranged to initiate a truing operation on said grinding wheels.

43. In a crankpin grinding machine having a rotatable grinding wheel, a transversely movable slide to support said wheel, a longitudinally movable carriage to support said slide, a pair of opposed aligned rotatable pot chucks to support and rotate a crankshaft to be ground, means including an electric motor synchronously to rotate said chucks, a feeding mechanism for said slide, means including an electric motor to index said carriage longitudinally to position the grinding wheel successively in predetermined positions for grinding crankpins on said shaft or to a truing position, a longitudinally reciprocable truing tool for said wheel, means including a piston and cylinder to reciprocate said truing tool, means automatically to feed said truing tool toward the grinding wheel after each pass across the grinding wheel face, and in interlock mechanism to render said truing apparatus inoperative except when the grinding wheels are indexed to a truing position.

44. In a crankpin grinding machine having a rotatable grinding wheel, a transversely movable slide therefor, a longitudinally movable carriage to support said slide, opposed aligned pot chucks including a hydraulically operated clamping jaw to support opposite ends of a crankshaft to be ground, means including an electric motor synchronously to rotate said chucks, means including a fluid pump to supply fluid under pressure to actuate said clamping jaws, a solenoid valve to control the admission to and exhaust of fluid from the pot chucks, an electrical interlock including a pressure actuated switch to deenergize said solenoid valve to lock fluid in said pot chucks in case the hydraulic pressure drops below a safe operating pressure, and a signal light visibly and automatically to indicate a drop in pressure below a safe operating pressure.

45. In a crankpin grinding machine having a pair of spaced rotatable grinding wheels, a pair of spaced independent transversely movable wheel slides therefor, a pair of spaced longitudinally movable carriages to support said slides, independent pistons and cylinders to feed said slides transversely, independent control valves for said cylinders, a pair of solenoids for actuating each of said valves to cause each a forward or rearward movement of said slides and grinding wheels, a pair of spaced aligned pot chucks to support the opposite end of a crankshaft having a pair of spaced aligned inner crankpins and a pair of spaced aligned outer crankpins to be ground, a carriage indexing mechanism simultaneously to index said carriages longitudinally in opposite directions simultaneously to position said grinding wheel in either an inner-pin or an outer-pin position, a longitudinally movable dog bar having a plurality of adjustable dogs actuated by and in timed relation with said carriages, a limit switch actuated by one of said dogs when the grinding wheels are moved beyond an out-pin position to render said solenoid valves inoperative and thereby to maintain the wheel slides in an inoperative rearward position, and cycle reset push button switch to render said limit switch inoperative so that the machine is in condition for the next cycle.

46. In a crankpin grinding machine having a pair of spaced rotatable grinding wheels, a pair of transversely movable wheel slides therefor, a pair of longitudinally movable carriages to support said slides, an independent hydraulic piston and cylinder to feed each of said slides, an indexing mechanism including a motor driven nut and screw simultaneously to index said carriages longitudinally, a main control lever, a pair of limit switches actuated thereby when the lever is moved in one direction to control said hydraulic feeding mechanism, limit switches actuated by said lever when moved in another direction to control the carriage indexing motor, and a normally open limit switch connected in series with the carriage indexing limit switches which is closed when the wheel slides are in a rearward position to facilitate an indexing movement of the carriages only when the wheel slides are in a rear position.

47. In a crankpin grinding machine having a rotatable grinding wheel, a transversely movable slide for said wheel, a longitudinally movable carriage for said slide, a pair of opposed aligned rotatable pot chucks to support and rotate a crankshaft to be ground, means including an electric motor synchronously to rotate said chucks, a feeding mechanism for said slide, means including an electric motor to index said carriage longitudinally to position the grinding wheel successively in predetermined positions for grinding crankpins on said shaft or to a truing position, a longitudinally reciprocable truing tool for said wheel, means including a piston and cylinder to reciprocate said truing tool, means including a piston and cylinder to feed said truing tool toward the grinding wheel after each pass of the truing tool across the face of the grinding wheel, hydraulic connections between said cylinders so that a feeding movement is imparted to the truing tool before the truing tool starts traversing across said wheel, and an interlock mechanism to render said truing apparatus inoperative except when the grinding wheel is indexed to a truing position.

48. In a crankpin grinding machine having a rotatable grinding wheel, a transversely movable slide to support said wheel, a longitudinally movable carriage to support said slide, a pair of opposed aligned rotatable pot chucks to support and rotate a crankshaft to be ground, means including an electric motor synchronously to rotate said chucks, a feeding mechanism for said slide, means including an electric motor to index said carriage longitudinally to position the grinding wheel successively in predetermined positions for grinding crankpins on said shaft or to a truing position, a longitudinally reciprocable truing tool for said wheel, means including a piston and cylinder to reciprocate said truing tool, a hydraulically actuated pawl and ratchet, a cam actuated by said pawl and ratchet which is intermittently actuated after each pass of the truing tool, means including a cam to stop said truing operation after the truing tool has completed a predetermined number of passes across the periphery of the grinding wheel, and an interlock mechanism to render said truing apparatus inoperative except when the grinding wheels are indexed to a truing position.

49. In a crankpin grinding machine having a rotatable grinding wheel, a transversely movable slide, a longitudinally movable carriage to support said slide, a pair of opposed aligned rotatable pot chucks to support and rotate a crankshaft to be ground, means including an electric motor synchronously to rotate said chucks, a feeding mechanism for said slide, means including an electric motor to index said carriage longitudinally to position the grinding wheel successively in predetermined positions for grinding crankpins or to a truing position, a longitudinally reciprocable truing tool for said wheel, means including a piston and cylinder to reciprocate said truing tool, a control valve therefor, means including a cam actuated pawl and ratchet mechanism, a feed screw actuated thereby to advance the tool toward the wheel, means to stop the reciprocation of the truing tool at a predetermined number of passes of the truing tool across the face of the grinding wheel, a cam actuated valve to slow down the traversing speed of the truing tool on one or more of the final passes of the truing tool, and an interlock mechanism to render said truing apparatus inoperative except when the grinding wheels are indexed to a truing position.

50. In a crankpin grinding machine having a rotatable grinding wheel, a transversely movable slide to support said wheel, a longitudinally movable carriage to support said slide, a pair of opposed aligned rotatable pot chucks to support and rotate a crankshaft to be ground, means including an electric motor synchronously to rotate said chucks, a feeding mechanism for said slide, means including an electric motor to index said carriage longitudinally to position the grinding wheels successively in predetermined positions for grinding crankpins or to a truing position, a longitudinally reciprocable truing tool for said wheel, means including a piston and cylinder to reciprocate said truing tool, means automatically to feed said truing tool toward the grinding wheel after each pass across the face of the grinding wheel, means to stop reciprocation of the truing tool after a predetermined number of passes of the truing tool, and an interlock mechanism to render said truing apparatus inoperative except when the grinding wheel is indexed to a truing position.

HERBERT A. SILVEN.
DON R. PERCIVAL.

REFERENCES CITED

The following references are of record in the file of this patent:

UNITED STATES PATENTS

| Number | Name | Date |
|---|---|---|
| 806,551 | Martin | Dec. 5, 1905 |
| 1,755,937 | Steiner | Apr. 22, 1930 |
| 1,816,750 | Steiner et al. | July 28, 1931 |
| 1,865,067 | Warsow | June 28, 1932 |
| 1,952,423 | Dall et al. | Mar. 27, 1934 |
| 1,997,551 | Romaine | Apr. 9, 1935 |

(Other references on following page)

UNITED STATES PATENTS

| Number | Name | Date |
|---|---|---|
| 2,003,334 | Belden et al. | June 4, 1935 |
| 2,014,768 | Klingele | Sept. 17, 1935 |
| 2,113,388 | Silven et al. | Apr. 5, 1938 |
| 2,131,233 | Ott et al. | Sept. 27, 1938 |
| 2,141,853 | Brown | Dec. 27, 1938 |
| 2,142,050 | Garside et al. | Dec. 27, 1938 |
| 2,151,669 | Wood et al. | Mar. 21, 1939 |
| 2,161,217 | Wood | June 6, 1939 |
| 2,220,490 | Ott et al. | Nov. 5, 1940 |
| 2,264,160 | Flygare et al. | Nov. 25, 1941 |
| 2,297,654 | Johnson | Sept. 29, 1942 |
| 2,313,482 | Rocks et al. | Mar. 9, 1943 |
| 2,322,727 | Cole et al. | June 22, 1943 |
| 2,419,170 | Silven | Apr. 15, 1947 |